United States Patent
Iijima et al.

(10) Patent No.: US 11,525,765 B2
(45) Date of Patent: Dec. 13, 2022

(54) PARTICLE DETECTION DEVICE AND PARTICLE DETECTION METHOD

(71) Applicants: TOSOH CORPORATION, Shunan (JP); NATIONAL UNIVERSITY CORPORATION CHIBA UNIVERSITY, Chiba (JP)

(72) Inventors: Kazuki Iijima, Ayase (JP); Toshinobu Toyoshima, Ayase (JP); Kotohiro Furukawa, Ayase (JP); Koji Katayama, Ayase (JP); Naotaka Jin, Chiba (JP); Minoru Seki, Chiba (JP)

(73) Assignees: TOSOH CORPORATION, Shunan (JP); NATIONAL UNIVERSITY CORPORATION CHIBA UNIVERSITY, Chiba (JP)

( * ) Notice: Subject to any disclaimer, the term of this patent is extended or adjusted under 35 U.S.C. 154(b) by 199 days.

(21) Appl. No.: 16/484,964

(22) PCT Filed: Feb. 13, 2018

(86) PCT No.: PCT/JP2018/004900
§ 371 (c)(1),
(2) Date: Aug. 9, 2019

(87) PCT Pub. No.: WO2018/147462
PCT Pub. Date: Aug. 16, 2018

(65) Prior Publication Data
US 2021/0285863 A1     Sep. 16, 2021

(30) Foreign Application Priority Data

| Feb. 10, 2017 | (JP) | JP2017-023255 |
| Jun. 1, 2017 | (JP) | JP2017-109508 |
| Dec. 26, 2017 | (JP) | JP2017-250029 |

(51) Int. Cl.
*G01N 15/12* (2006.01)
*G01N 15/00* (2006.01)
*G01N 15/10* (2006.01)

(52) U.S. Cl.
CPC . *G01N 15/1218* (2013.01); *G01N 2015/0019* (2013.01); *G01N 2015/0096* (2013.01); *G01N 2015/1081* (2013.01)

(58) Field of Classification Search
CPC ............ G01N 21/05; G01N 2015/149; G01N 2015/1493; G01N 2015/1486;
(Continued)

(56) References Cited

U.S. PATENT DOCUMENTS

| 5,888,370 A | 3/1999 | Becker et al. |
| 8,266,950 B2* | 9/2012 | Kaduchak .......... G01N 15/1404 73/61.75 |

(Continued)

FOREIGN PATENT DOCUMENTS

| JP | 2000-505545 A | 5/2000 |
| JP | 2005-205387 A | 8/2005 |

(Continued)

OTHER PUBLICATIONS

International Search Report dated May 22, 2018 issued in PCT/JP2018/004900.
(Continued)

*Primary Examiner* — Hoa Q Pham
(74) *Attorney, Agent, or Firm* — Sughrue Mion, PLLC

(57) ABSTRACT

The objective of the present invention is to provide a particle detection device and a particle detection method that can individually and continuously detect a wide range of particles. The objective is achieved by a particle detection device including: a particle separation channel through which particles are separated according to particle sizes in a
(Continued)

perpendicular direction to the flow of fluid; and two or more particle recovery channels that are connected to and branched from the particle separation channel, in which each of the particle recovery channels includes a particle detection unit that includes an aperture and an electric detector.

22 Claims, 50 Drawing Sheets

(58) Field of Classification Search
CPC ... G01N 2015/1006; G01N 2015/1254; G01N 2015/1081; G01N 15/12; G01N 15/1404; G01N 15/0205; G01N 15/02; G01N 2030/0025
USPC .............................. 356/335–343, 39, 73, 36
See application file for complete search history.

(56) References Cited

U.S. PATENT DOCUMENTS

| | | | |
|---|---|---|---|
| 2004/0109386 A1* | 6/2004 | Gold | G01N 1/31 366/336 |
| 2005/0210996 A1* | 9/2005 | Quinn | G01N 33/54366 73/861 |
| 2009/0042310 A1* | 2/2009 | Ward | G01N 21/645 436/154 |
| 2011/0134426 A1* | 6/2011 | Kaduchak | G01N 21/453 356/337 |

FOREIGN PATENT DOCUMENTS

| | | |
|---|---|---|
| JP | 2006-263693 A | 10/2006 |
| JP | 2015-058394 A | 3/2015 |
| JP | 2015-072135 A | 4/2015 |
| KR | 10-2011-0124076 A | 11/2011 |
| WO | 97/27933 A1 | 8/1997 |
| WO | 2015/151226 A1 | 10/2015 |

OTHER PUBLICATIONS

Bader, J. et al., "DNA transport by a micromachined Brownian ratchet device," PNAS (Proceedings of the National Academy of Sciences of the United States of America), Nov. 9, 1999, vol. 96, No. 23, pp. 13165-13169.

Yamada, M. et al., "Pinched Flow Fractionation: Continuous Size Separation of Particles Utilizing a Laminar Flow Profile in a Pinched Microchannel", Anal. Chem. 2004, 76, pp. 5465-5471.

Yamada, M. et al., "Hydrodynamic filtration for on-chip particle concentration and classification utilizing microfluidics", Lab on a Chip, The Royal Society of Chemistry 2005, 5, pp. 1233-1239.

Pamme, N. et al., "Continuous sorting of magnetic cells via on-chip free-flow magnetophoresis", Lab on a Chip, The Royal Society of Chemistry, 2006, 6, pp. 974-980.

Deblois R. et al., "Counting and Sizing of Submicron Particle by the Resistive Pulse Technique", The Review of Scientific Instruments, vol. 41, No. 7, Jul. 1970, pp. 909-916.

Takagi, J. et al., "Continuous particle separation in a microchannel having asymmetrically arranged multiple branches", Lab on a Chip, The Royal Society of Chemistry 2005, 5, pp. 778-784.

Yamada et al., "Classification of Particles Using Microfluidic Channels", J. Vac. Soc. Jpn. (vacuum), 2006, vol. 49, No. 7, pp. 404-408 (15 pages total).

* cited by examiner

FIG.1(b) ENLARGED VIEW OF 190

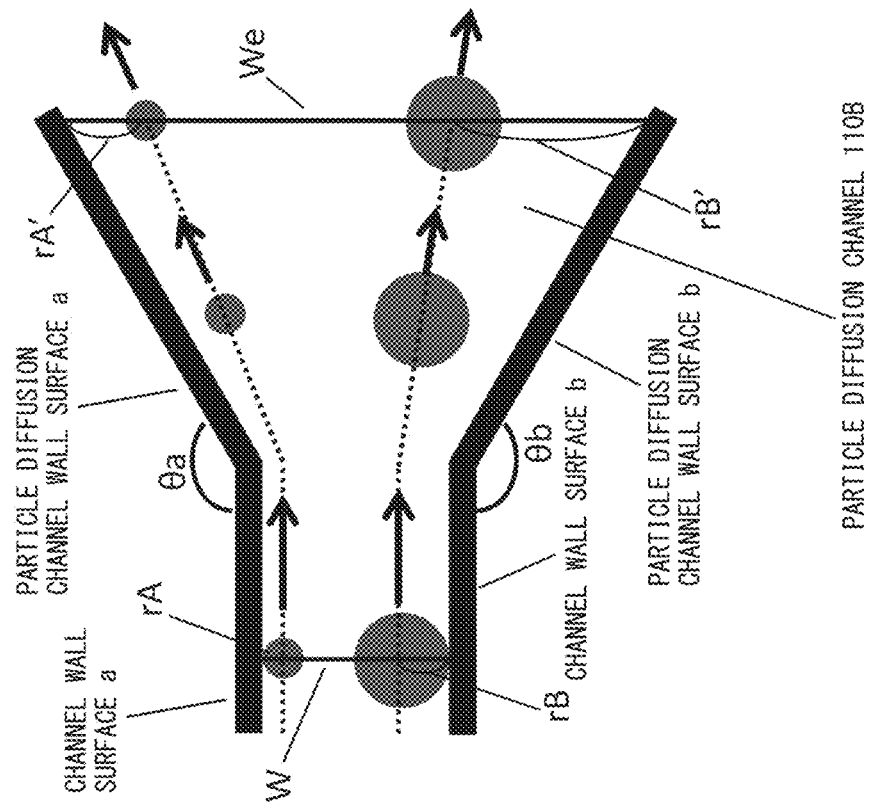
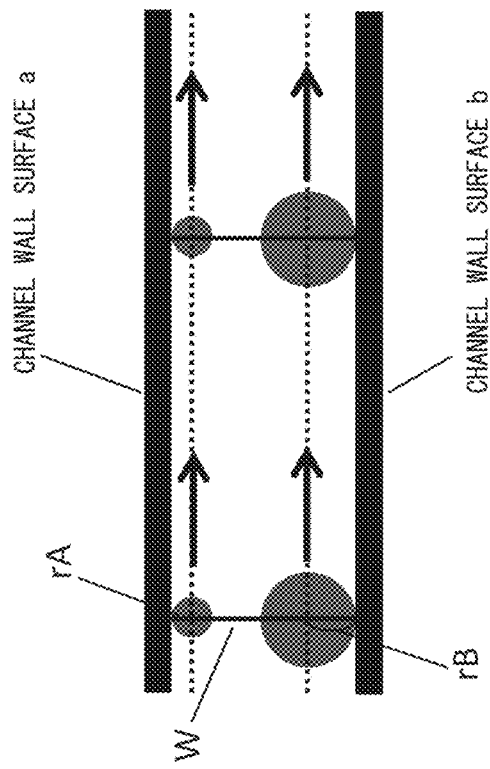
FIG.10(a)
FIG.10(b)

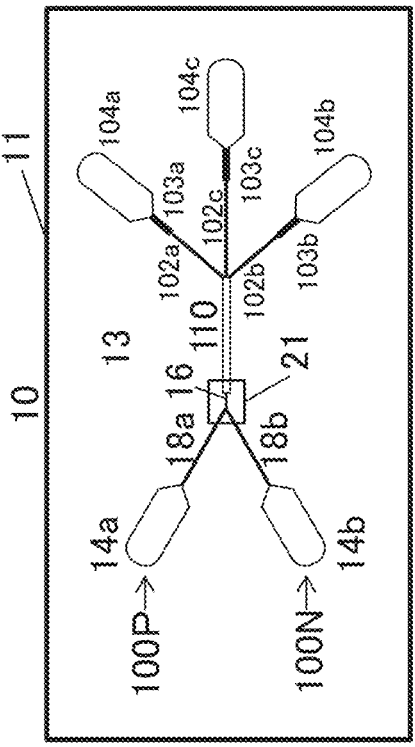
FIG.12(a)
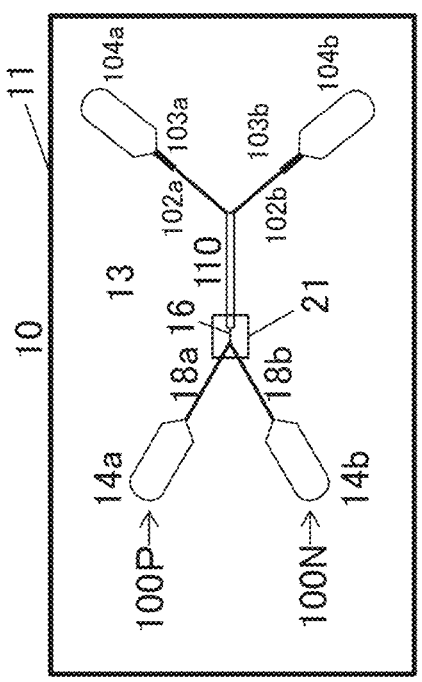
FIG.12(b)
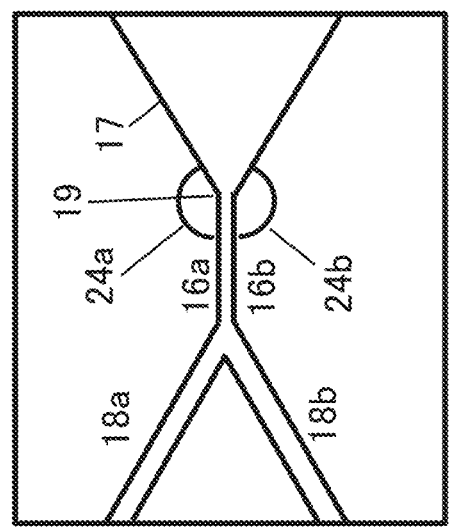
FIG.12(c) ENLARGED VIEW OF AREA 21

FIG.13(b) ENLARGED VIEW OF AREA 21

FIG.13(c) ENLARGED VIEW OF AREA 21

FIG.14(b) ENLARGED VIEW OF AREA 21

FIG.16(b) ENLARGED VIEW OF AREA 21

FIG.23(b) ENLARGED VIEW OF AREA 21

FIG.27(b) ENLARGED VIEW OF 103a', 103b', 103c'

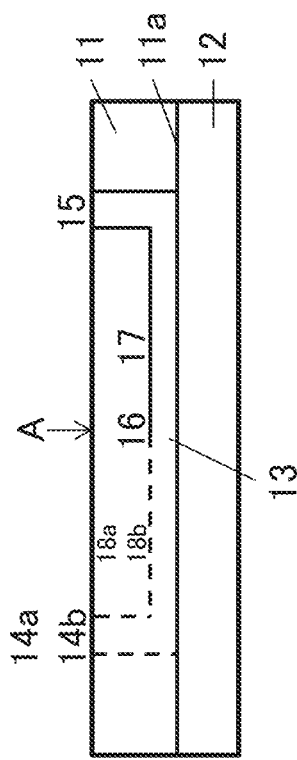
FIG.30(b)
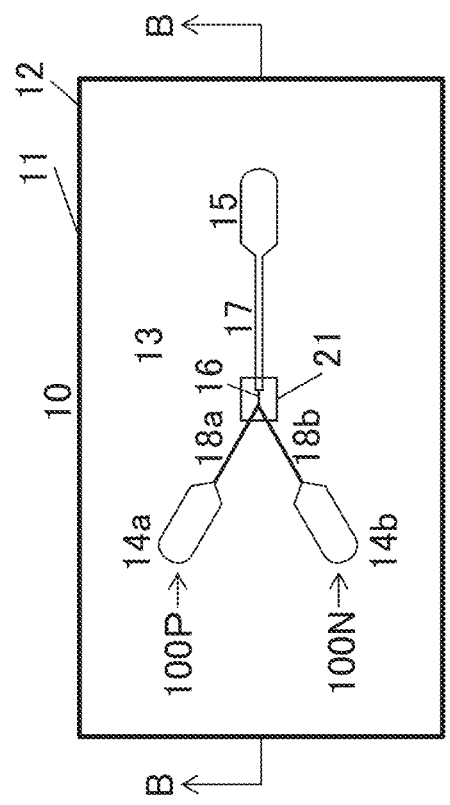
FIG.30(a)
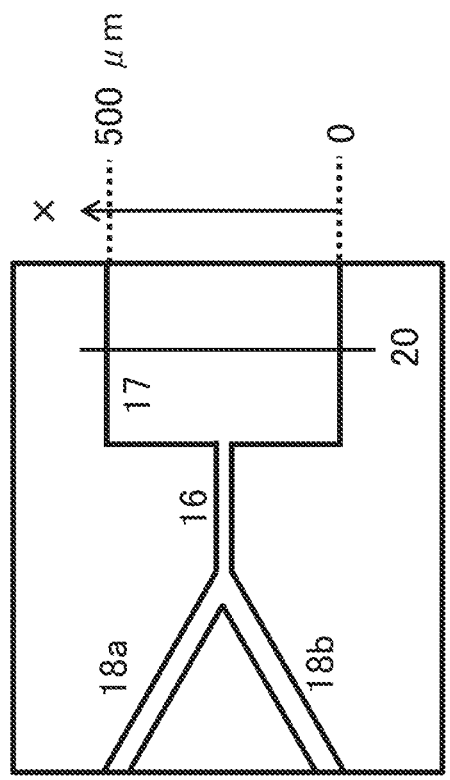
FIG.30(c) ENLARGED VIEW OF 21

FIG.32(c) ENLARGED VIEW OF AREA 21

FIG.33(c) ENLARGED VIEW OF AREA 21

FIG.34(c) ENLARGED VIEW OF AREA 21

FIG.35(c) ENLARGED VIEW OF AREA 21

FIG.36(c) ENLARGED VIEW OF AREA 21

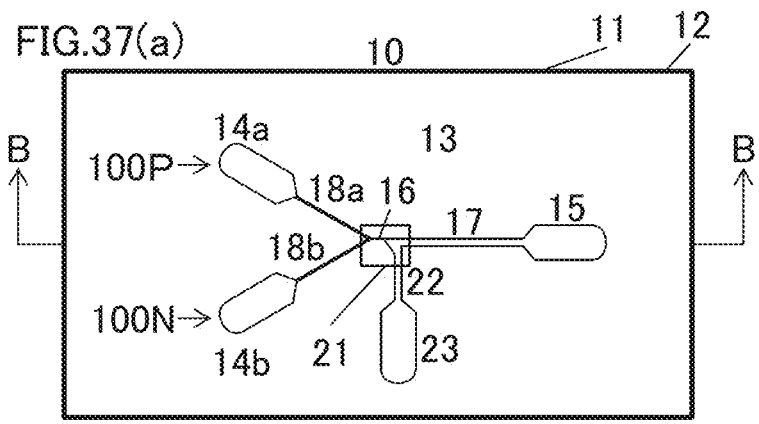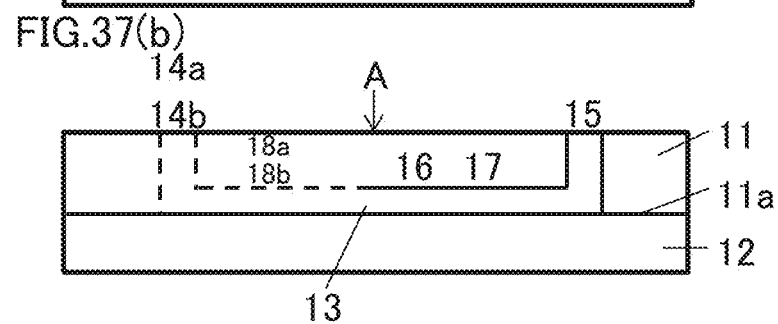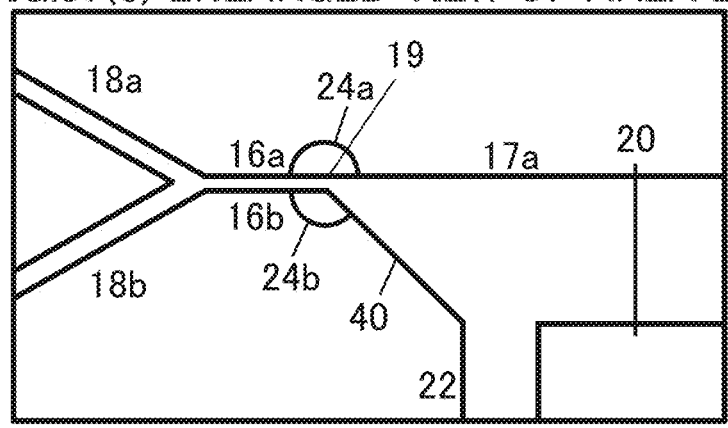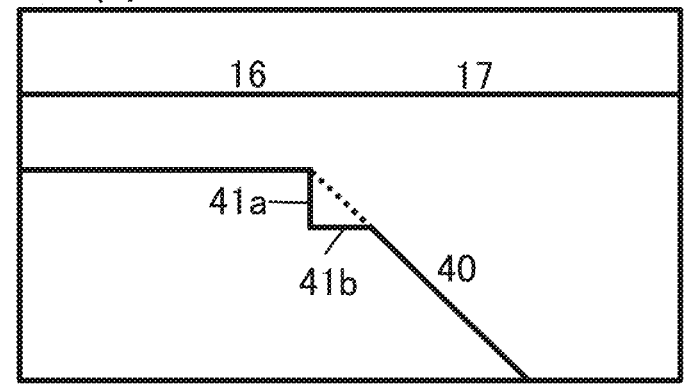

FIG.39(c) ENLARGED VIEW OF AREA 21

FIG.41(c) ENLARGED VIEW OF AREA 21

FIG.42(c) ENLARGED VIEW OF AREA 21

PARTICLE DETECTION DEVICE AND PARTICLE DETECTION METHOD

CROSS REFERENCE TO RELATED APPLICATIONS

This application is a National Stage of International Application No. PCT/JP2018/004900, filed Feb. 13, 2018, claiming priority based on Japanese Patent Application No. 2017-023255, filed Feb. 10, 2017, Japanese Patent Application No. 2017-109508, filed Jun. 1, 2017, and Japanese Patent Application No. 2017-250029, filed Dec. 26, 2017, the contents of all of which are incorporated herein by reference in their entirety.

FIELD

The present invention relates to a particle detection device and a particle detection method.

BACKGROUND

In situations where solid objects made of inorganic substances, organic substances, metals, or the like are applied as materials in a variety of industrial fields, they are provided, for example, in powders as primary raw materials, or in spherical particles or other shapes molded from the powders as products. These materials (solid objects) are designed in consideration of physical properties and the like to improve the performance of final products. Moreover, in many cases, spherical particles are applied as final products, including, for example, grinding balls for ball mills (alumina, zirconia, silica, etc.), LCD spacers (resin, silica, etc.), solid-phase for chromatography, adsorbents and the like. In general, uniformity in shape, size, and density of such particle products largely affects the characteristics of final products, thus, more uniform particles are required under the current circumstances.

There are two approaches for producing such particles: an approach of developing a technique of producing particles that are uniform when they are made, and an approach of retrieving particles of required size, density and shape from particles which exhibit an ununiformed distribution. The former is a relatively new technique and requires replacement of production facilities, while the latter can be relatively easily introduced into a production process since it can be added to existing facilities. Examples of the latter technique include a filter separation method (including sieve classification), a gravity classification method, a centrifugation method, and a cyclone separation method for particles of several tens of micrometers or larger size.

With the above-described separation or classification method, separation of particles of several tens of micrometers or less, particularly 10 μm or less, is extremely difficult. Furthermore, such separation or classification is, in general, a batch process, and has difficulty in continuous separation. In a batch process, since one-time processing amount is determined by a separation yield, relatively large facilities (a stock container of original raw materials, a supply facility, and a recovery container of unnecessary products) are required. For example, although a sieve classification method is suitable for large volume processing, the method is a batch process since the size of the openings of the sieve is required to be gradually changed. A gravity classification method is also, in principle, a batch process like the sieve classification method and requires a great amount of time for processing as the particle sizes become smaller. A centrifugation method and a cyclone separation method are suitable for high-speed processing, however, large machines are required and they are not suitable for continuous processing.

However, if continuous classification is enabled, the feed amount and the production amount of original raw materials can be minimized. Particle separation is also used in the medical field in a test using antigen-antibody reaction to test a minute amount of sample in a process called B/F (bound/free) separation for separating components that have not reacted with fluorescent substances that are adsorbed to particles. However, magnetic particles are used in most of particle separation in such processes, and particle separation and cleaning are performed using a magnet, which takes additional time.

Further, there is also a technique for separating finer particles (DNA, vaccine, etc.) called Brownian ratchet where micro-fabricated wedge-like projections are regularly arranged to split (separate) the target-size DNAs or vaccine from a mainstream trajectory using Brownian vibration of particles (NPL 1). However, this method has a problem in feasibility for reasons, such as: separation speed is low since a split stream is formed by Brownian vibration in a separation mode; separation takes time as the mainstream is formed by electrophoresis, particularly, separation requires a tremendous amount of time for particles of 1 μm or more in diameter; and disturbances during such a period affect the outcome.

Further, as a method of separating and classifying cells according to the sizes, a method using fluorescence-activated cell sorting (FACS) for measuring the sizes of cells by measuring forward scattered light from the cells and separating the cells is known. Although FACS can roughly separate target substances from a large amount of minute particles and cells, it has difficulty in accurately separating a small amount due to the influences of the sizes of the cells and refractive indexes, and target substances that are vulnerable to shock may be destroyed upon separation.

There are techniques and devices for separating particles of a certain size from particles of a variety of sizes, for example, a sieve classification method, a gravity classification method, a centrifugation method, and an electrophoresis method, each of which is suitable for batch processing, yet, not suitable for continuous separation processing.

Whereas, recently, studies have been reported that minute particles and cells are accurately separated using a minute channel structure (a micro channel) of several micrometers to several hundred micrometers in width, which is fabricated using micro processing technology (NPLs 2 to 4). In general, a stable laminar flow is formed in the micro channel, and the profile of the flow can be arbitrarily controlled in micrometer order, thus, minute particles and cells can be accurately and continuously separated using such characteristics.

For example, PTL 1 reports a technique called pinched flow fractionation (hereinafter, referred to as "PFF") that accurately and continuously separates cells and minute particles according to the sizes. The benefits of this technique are: that continuous separation of micro particles and cells is easily enabled without the need of complicated machines and devices of optical or information processing systems that are required by the above-described FACS; that separation into a plurality of fractions is possible using one separation factor. i.e., for example, when separation is performed by sizes, not only two-stage separation of large and small, but also separation into three or more groups by sizes is possible; and that, by parallelization of channels and the like, a large amount of minute particles and cells can be separated at high speed.

In PFF, fluid is introduced from a plurality of branches into a channel of which diameter is partly narrow (hereinafter, referred to as the "pinched channel") where particles are controlled with regard to the positions in a perpendicular direction to the flow, then, the particles flow into a channel with relatively wider diameter (hereinafter, referred to as the "expanding channel"). This technique was devised by focusing on the fact that the direction of force that the flow applies to the particles is different depending on the positions of the particles in the pinched channel, and this technique enables continuous and precise separation of particles. As described in PTL 1, PFF can be implemented by using a structure having two inlets, and, for example, by injecting liquid including target particles from one inlet and injecting liquid not including the target particles from the other inlet.

To separate particles more precisely in PFF, it is important to align particles along the wall surface of the pinched channel. To that end, it is important that the flow rate of transferring liquid including particles (hereinafter, referred to as the "sample liquid") is smaller than the flow rate of transferring liquid not including particles (hereinafter, referred to as the "sheath liquid"), as well as, the ratios of the flow rates, the width and length of the pinched channel, the width of the expanding channel, the ratios of the widths of the pinched channel and expanding channel, and the heights of the channels are adjusted.

As a technique that can accurately detect minority particle groups by measuring each particle one by one, a Coulter method that electrically detects particles is known (electrical sensing zone; hereinafter, ESZ) (for example, refer to NPL 5). This method can evaluate each particle and, thus, can also accurately measure particles of a small ratio, since the information (signals) acquired from each detection means corresponds one-to-one to each particle, however, the measurable particle size range (a dynamic range) is relatively narrow. For example, in ESZ, a particle size is calculated using electric signals generated when a particle passes through a small hole called an aperture, and the dynamic range is said to be, in general, 2 to 60% of the aperture diameter. In addition, in ESZ, if a larger particle than the aperture exists, the particle occludes the aperture and disables the following measurement, thus, the measurement should be performed after removing large particles using a filter of which opening diameter is the same or smaller than the aperture diameter. However, since not a small number of particles are adsorbed to the filter base in such a filtering operation, loss of some of the sample is concerned. Moreover, with the filtering, there is a less chance of getting a quantitative outcome, thus, the filtering operation is not desirable for accurately measuring a particle size distribution in the sample. Furthermore, the unit used for particle detection should be used repeatedly, and, in such a case, the unit should be cleaned after each measurement and controlled to make sure there is no sample carry-over, which makes the operation complicated.

CITATION LIST

Patent Literature

[PTL 1] Japanese Unexamined Patent Publication (Kokai) No. 2005-205387

Non Patent Literature

[NPL 1] Proceedings of the National Academy of Sciences of the United States of America, 96, 23, 13165-13169, 1999.
[NPL 2] Analytical Chemistry, 76, 5465-5471, 2004.
[NPL 3] Lab on a chip, 5, 1233-1239, 2005.
[NPL 4] Lab on a chip, 6, 974-980, 2006.
[NPL 5] R. W. De Blois. et al, The Review of Scientific Instruments, Volume 41, Number 7, pp 909-916 (1970)
[NPL 6] Lab on a chip, 5, 778-784, 2005.

SUMMARY

Technical Problem

The objective of the present invention is to provide a particle detection device and a particle detection method that can individually and continuously detect a wide range of particles.

Solution to Problem

In light of the above-described problems, the inventors have found that particle sample measurement with a wide range of particle distribution is made possible by separating particles according to particle sizes in a perpendicular direction to the flow of fluid before detecting the particles with a detector.

In other words, the present invention relates to a particle detection device including: a particle separation channel through which particles are separated according to particle sizes in a perpendicular direction to the flow of fluid; and two or more particle recovery channels that are connected to and branched from the particle separation channel, in which each of the particle recovery channels includes a particle detection unit that includes an aperture and an electric detector.

Further, in the present invention, a particle size range that can be detected by the aperture of the particle detection unit in each particle recovery channel may be different from one another, and a part of the particle size range that can be detected by the aperture may overlap one another.

Furthermore, in the present invention, at least one parameter among the number, the shape of a branch part, width, height, and length of the particle recovery channels is adjusted to form a channel structure where particles of a certain size or more are not mixed therein. In this way, occlusion of the aperture can be prevented. In addition, by adjusting these parameters, particles of particle sizes detectable by the aperture of each particle recovery channel can be flowed into the particle recovery channel.

In particle detection by ESZ, a cheaper particle detection device is required to be provided while maintaining quantitativity. In light of such a problem, the inventors have found producibility of a particle detection device that is cheaper and disposable while maintaining quantitativity, by connecting the particle detection unit configured as an electric detector having an aperture to a fluid discharge port on which an electrode is arranged. In short, the above-described particle detection device may also include a fluid discharge port downstream of the particle detection unit, and an electrode of the electric detector may be provided at the liquid discharge port.

Further, in the present invention, the particle separation channel may have a channel structure using the PFF principle. Specifically, a channel structure using the PFF principle can be formed as the particle separation channel. In this way, particles can be separated according to the particle sizes in a perpendicular direction to the flow of fluid. A particle separation channel that can separate particles with precision with a simpler method in PFF and a particle separation method using such a particle separation channel are required to be provided. In light of this problem, through examination, we have found that outward expansion of the channel wall can be suppressed by hardening the material of the channel, whereby precision of positions of flowing particles is increased instead of increasing accuracy of positions of flowing particles, as is generally assumed. Based on this finding, we have arrived at the invention of a particle separation channel that can more precisely separate particles in PFF, a particle detection device that includes the particle separation channel, and a method of separating or detecting particles using the particle separation channel and/or the particle detection device. Note that "accuracy" herein means the degree of divergence between a theoretical value and a measurement value of the position of a particle from the wall surface of the expanding area, and "precision" means the degree of reproductively when the position of a particle from the wall surface of the expanding area is measured for a plurality of times.

Hardness herein refers to durometer hardness (using a type A durometer), which is defined by the amount of deformation of a material when a constant load is applied, where the deformation is smaller when the hardness is larger.

In PFF, in a liquid transferring condition where particles are aligned along the wall surface of the pinched channel, the positions of particles in the expanding channel can be predicted based on the particle sizes, the pinched channel width, and the expanding channel width. However, in general, the inner wall surface of a micro channel in which fluid flows is constantly exposed to the shear force of the fluid, thus, force is applied in a direction in which the micro channel expands during liquid transferring. As such, expansion of each channel due to liquid transferring should be taken into account for prediction of the positions of particles in the expanding channel.

When the channel is made of an elastic silicone resin including polydimethylsiloxane (hereinafter, referred to as "PDMS"), expansion of each channel by liquid transferring, especially the width of the pinched channel, can be predicted to be easily affected. Thus, it can be said that, by using material that is hard to expand, i.e., changing the material to a resin with greater hardness, positions in the expanding channel are more accurately predicted. Note that there is no limitation to the depth direction of the channel, for which an expandable material may be used. The width of the pinched channel herein refers to the length of the channel in a perpendicular direction (hereinafter, referred to as the width direction) to the wall surface of the inner wall 16a of the pinched channel, the depth refers to the length of the channel in a perpendicular direction to the width direction (hereinafter, referred to as the depth direction). However, this method increases "accuracy" of the positions of particles, yet, does not lead to increase "precision" for flowing all the flowing particles to certain positions every time.

Nonetheless, in the present invention, it was found that precision in positioning flowing particles was improved by increasing the hardness of the channel. This can be considered because suppressing expansion of each channel can prevent nonuniformity of the flow velocity caused by expansion of the channel, whereby particles are aligned along the wall surface of the pinched channel with high precision.

As the result of various studies on the channel structure using the PFF principle, the inventors have found that in the particle separation channel, separation of particles of nanometer to micrometer sizes is possible with a structure where the channel width of the inner wall 17a of the expanding channel does not expand, with reference to the inner wall 16a of the pinched channel, toward the side of the wall surface along which particles flow smoothly. In other words, the present invention relates to a particle separation channel where the inner wall 17a of the expanding channel is configured not to expand, with reference to the inner wall 16a of the pinched channel, toward the side of the port 14a from which particle-containing sample liquid is introduced, a particle detection device including the particle separation channel, and a method of separating and/or detecting particles using the particle separation channel or the particle separation device.

Furthermore, particles can be separated more precisely when the inner wall 16a of the pinched channel that is the wall surface side along which particles flow smoothly and the inner wall 17a of the expanding channel on the same side (the wall surface side along which particles flow smoothly) are connected in a plane. Further, it was found that separation precision of particles was further improved by gradually increasing the channel width toward the wall surface side along which particles do not flow smoothly. i.e., by not making an edge between the wall surface of the pinched channel 16 and the wall surface of the expanding channel 17 to the extent possible.

In general, inside the micro channel is a space where viscous force dominates over inertial force and it is not easy for fluid to flow in a turbulent condition where the Reynolds number becomes 2300 or more, hence, the fluid flows in laminar in the micro channel, as a premise. This is because, when fluid flows in such a way that the Reynolds number becomes 2300 or more, the fluid is required to flow in the micro channel at a high flow velocity of several meters per second or more, and the pressure loss becomes a value that far exceeds several megapascals, raising problems, such as, pressure load to the liquid delivery pump, or channel breakage, which makes the fluid transferring difficult. Although the present invention is not intended to be limited to the theory, since fluid flows basically in laminar even in a channel using PFF, the effect of the present invention is deemed not to be caused by generation of turbulence in the micro channel.

Whereas, in PFF, when particles proceed from the pinched channel to the expanding channel, the width of the channel largely changes and the flow velocity distribution significantly changes at the pinched channel-side entrance of the expanding channel. Accordingly, the present invention focuses on a possibility that the significant change in the flow velocity distribution generates a swirling flow in the channel, especially in the vicinity of the wall surface around the entrance of the expanding area where the channel width changes. Thus, although the present invention is not intended to be limited to the theory, it is considered that, by mitigating this swirling flow to the extent possible, the diffusion of particles aligned in the vicinity of the wall surface is suppressed due to the swirling flow, and separation of finer particles is enabled.

Further, another mode of the present invention is a method for detecting particles included in fluid, including: separating the particles according to particle sizes in a perpendicular direction to the flow of the fluid; dividing the separated particles into two or more channels; and detecting the particles by an electric detector including electrodes that are disposed on both sides of an aperture equipped in the channel.

In the above-described method, a particle size range that can be detected by the electric detector may differ depending on a channel on which the electric detector is installed, and a part of the detectable particle size range may overlap one another depending on a channel on which the electric detector is installed. Further, particles may be divided into two or more channels, or particles may be separated using the PFF principle by adjusting at least one parameter among the number, the shape of a branch part, width, height, and length of the channels to form a channel structure where particles of a certain size or more are not mixed therein. The method of the present invention is implemented, for example, by driving the particle detection device of the present invention.

Advantageous Effects of Invention

According to the present invention, a sample with a wider particle size distribution range can be continuously detected with high precision and a large amount of particle samples can be measured compared with batch separation techniques.

BRIEF DESCRIPTION OF DRAWINGS

FIGS. 1(a) and 1(b) are diagrams illustrating an embodiment of the present invention, illustrating a microchip 10 including particle detection units 103a, 103b that detect particles that have been separated through a particle separation channel 110 by applying hydrodynamic filtration (HDF) to the channel. FIG. 1(a) is a top view of the microchip 10, and FIG. 1(b) is an enlarged view of an area 190 in FIG. 1(a).

FIG. 8(a) illustrates a mode of two particle recovery channels 102, FIG. 8(b) illustrates a mode of three particle recovery channels 102, and FIG. 8(c) illustrates a mode of three particle recovery channels 102 and a branch channel 105 added to the particle separation channel 110.

FIG. 10(a) is a diagram illustrating the flow of particles in a linear channel under a condition of laminar flow, and FIG. 10(b) illustrates a trajectory of the flow of particles in the particle diffusion channel 110B.

FIGS. 12(a) to 12(c) are diagrams illustrating an embodiment of the present invention, illustrating a mode where PFF is applied to a particle separation channel 110. FIG. 12(a) illustrates a mode of two particle recovery channels 102, FIG. 12(b) illustrates a mode of three particle recovery channels 102, and FIG. 12(c) illustrates an enlarged view of an area 21 in FIGS. 12(a) and 12(b).

FIGS. 13(b) and 13(c) are enlarged views of an area 21 in FIG. 13(a).

FIG. 14(b) illustrates an enlarged view of an area 21 in FIG. 14(a).

FIG. 16(b) illustrates an enlarged view of an area 21 in FIG. 16(a).

FIG. 19(a) illustrates electric signals of 0.5-μm and 1.0-μm particles, and FIG. 19(b) illustrates electric signals of 2.0-μm particles.

FIG. 23(b) illustrates an enlarged view of an area 21.

FIG. 26 illustrates microchips 10 of another mode for implementing the present invention.

FIG. 27 illustrates a microchip 10 of another mode for implementing the present invention. FIG. 27(b) illustrates an enlarged view of the particle detection unit.

FIG. 30 illustrates a microchip 10 including an embodiment of a particle separation channel for implementing a continuous particle separation method according to the present invention. FIG. 30(a) is a detail drawing view from A of FIG. 30(b), FIG. 30(b) is a cross section view along the line B-B in FIG. 30(a), and FIG. 30(c) is an enlarged view of an area 21 in FIG. 30(a).

FIGS. 32(a) to 32(c) illustrate a microchip 10 including an embodiment of a particle separation channel for implementing a continuous particle separation method according to the present invention. FIG. 32(a) is atop view of the microchip 10 and is a detail drawing view from A of FIG. 32(b). FIG. 32(b) is a cross section view along the line B-B in FIG. 32(a). FIG. 32 C is an enlarged view of an area 21 in FIG. 32(a).

FIG. 32(d) is an integrated fluorescence image of separated 0.2-μm fluorescent polystyrene beads, and FIG. 32(e) is an integrated fluorescence image of separated 0.5-μm fluorescent polystyrene beads. FIG. 32(f) is a graph plotting a fluorescence profile of the integrated fluorescence image of separated 0.2-μm fluorescent polystyrene beads at a detection line 20. FIG. 32(g) is a graph plotting a fluorescence profile of the integrated fluorescence image of separated 0.5-μm fluorescent polystyrene beads at a detection line 20.

FIGS. 33(a) to 33(c) illustrate a microchip 10 of a conventional technique, indicating a comparison with the microchip 10 of FIG. 32 according to the present invention. FIG. 33(a) is a top view of the microchip 10 and a detail drawing view from A of FIG. 33(b). FIG. 33(b) is a cross section view along the line B-B in FIG. 33(a). FIG. 33(c) is an enlarged view of an area 21 in FIG. 33(a).

FIG. 33(d) is an integrated fluorescence image of separated 0.2-μm fluorescent polystyrene beads and FIG. 33(e) is an integrated fluorescence image of separated 0.5-μm fluorescent polystyrene beads. FIG. 33(f) is a graph plotting a fluorescence profile of the integrated fluorescence image of separated 0.2-μm fluorescent polystyrene beads at a detection line 20, and FIG. 33(g) is a graph plotting a fluorescence profile of the integrated fluorescence image of separated 0.5-μm fluorescent polystyrene beads at a detection line 20.

FIGS. 34(a) to 34(c) illustrate a microchip 10 for comparison that is designed such that the expanding wall surface of the expanding channel is reversed compared with the microchip 10 of FIGS. 33(a) to 33(g) that includes an embodiment of a particle separation channel for implementing a continuous particle separation method according to the present invention. FIG. 34(a) is a top view of the microchip 10 and a detail drawing view from A of FIG. 34(b). FIG. 34(b) is a cross section view along the line B-B in FIG. 34(a), and FIG. 34(c) is an enlarged view of an area 21 in FIG. 34(a).

FIG. 34(d) is an integrated fluorescence image of separated 0.2-μm fluorescent polystyrene beads, and FIG. 34(e) is an integrated fluorescence image of separated 0.5-μm fluorescent polystyrene beads. FIG. 34(f) is a graph plotting a fluorescence profile of the integrated fluorescence image of separated 0.2-μm fluorescent polystyrene beads at a detection line 20, and FIG. 34(g) is a graph plotting a fluorescence profile of the integrated fluorescence image of separated 0.5-μm fluorescent polystyrene beads at a detection line 20.

FIGS. 35(a) to 35(c) illustrate a microchip 10 including an embodiment of a particle separation channel for implementing a continuous particle separation method according to the present invention. FIG. 35(a) is a top view of the microchip 10 and a detail drawing view from A of FIG. 35(b). FIG. 35(b) is a cross section view along the line B-B in FIG. 35(a). FIG. 35(c) is an enlarged view of an area 21 in FIG. 35(a). As illustrated in FIG. 35(c), the channel width of the expanding channel is configured to gradually expand.

FIG. 35(d) is an integrated fluorescence image of separated 0.2-μm fluorescent polystyrene beads, and FIG. 35(e) is an integrated fluorescence image of separated 0.5-μm fluorescent polystyrene beads. FIG. 35(f) is a graph plotting a fluorescence profile of the integrated fluorescence image of separated 0.2-μm fluorescent polystyrene beads at a detection line 20, and FIG. 35(g) is a graph plotting a fluorescence profile of the integrated fluorescence image of separated 0.5-μm fluorescent polystyrene beads at a detection line 20.

FIGS. 36(a) to 36(c) illustrate a microchip 10 for comparison that is designed such that the expanding wall surface of the expanding channel is reverse compared with the microchip 10 of FIGS. 35(a) to 35(g) that includes an embodiment of a particle separation channel for implementing a continuous particle separation method according to the present invention. FIG. 36(a) is a top view of the microchip 10 and a detail drawing view from A of FIG. 36(b). FIG. 36(b) is a cross section view along the line B-B in FIG. 36(a). FIG. 36(c) is an enlarged view of an area 21 in FIG. 36(a).

FIG. 36(d) is an integrated fluorescence image of separated 0.2-μm fluorescent polystyrene beads, and FIG. 36(e) is an integrated fluorescence image of separated 0.5-μm fluorescent polystyrene beads. FIG. 36(f) is a graph plotting a fluorescence profile of the integrated fluorescence image of separated 0.2-μm fluorescent polystyrene beads at a detection line 20, and FIG. 36(g) is a graph plotting a fluorescence profile of the integrated fluorescence image of separated 0.5-μm fluorescent polystyrene beads at a detection line 20.

FIGS. 37(a) to 37(d) illustrate a microchip 10 including an embodiment of a particle separation channel for implementing a continuous particle separation method according to the present invention. FIG. 37(a) is a top view of the microchip 10 and a detail drawing view from A of FIG. 37(b). FIG. 37(b) is a cross section view along the line B-B in FIG. 37(a). FIG. 37(c) is an enlarged view of an area 21 in FIG. 37(a). FIG. 37(d) is a further enlarged view of a connection point of the pinched channel 16 and the expanding channel 17 (an expansion start point). As illustrated in FIG. 37(d), a partial concave formed by channel wall surfaces 41a and 41b (both are 50 μm in length) is provided on a slope part 40.

FIG. 37(e) is an integrated fluorescence image of separated 0.2-μm fluorescent polystyrene beads, and FIG. 37(f) is an integrated fluorescence image of separated 0.5-μm fluorescent polystyrene beads. FIG. 37(g) is a graph plotting a fluorescence profile of the integrated fluorescence image of separated 0.2-μm fluorescent polystyrene beads at a detection line 20, and FIG. 37(h) is a graph plotting a fluorescence profile of the integrated fluorescence image of separated 0.5-μm fluorescent polystyrene beads at a detection line 20.

FIG. 38 is a diagram illustrating separation of 0.1-μm fluorescent polystyrene beads and 0.2-μm fluorescent polystyrene beads using a microchip 10 that is different from the microchip 10 of FIG. 35 only in the width of the pinched channel 16 and the depth of the channel 13.

FIG. 39 illustrates a microchip 10 that was improved to include a plurality of outlets 15a, 15b and 15c in the microchip 10 of FIGS. 32(a) to 32(g) that includes an embodiment of a particle separation channel for implementing a continuous particle separation method according to the present invention. FIG. 39(c) is an enlarged view of an area 21 in FIG. 39(a).

FIGS. 41(a) to 41(c) illustrate a microchip 10 for comparison that is designed such that the expanding channel wall surface 17a extends toward 17b side compared with the microchip 10 of FIGS. 32(a) to 32(g) including an embodiment for implementing a continuous particle separation method according to the present invention. FIG. 41(a) is a top view of the microchip 10 and a detail drawing view from A of FIG. 41(b). FIG. 41(b) is a cross section view along the line B-B in FIG. 41(a), and FIG. 41(c) is an enlarged view of an area 21 in FIG. 41(a).

FIG. 41(d) is an integrated fluorescence image of separated 0.2-μm fluorescent polystyrene beads, and FIG. 41(e) is an integrated fluorescence image of separated 0.5-μm fluorescent polystyrene beads. FIG. 41(f) is a graph plotting a fluorescence profile of the integrated fluorescence image of separated 0.2-μm fluorescent polystyrene beads at a detection line 20, and FIG. 41(g) is a graph plotting a fluorescence profile of the integrated fluorescence image of separated 0.5-μm fluorescent polystyrene beads at a detection line 20.

FIGS. 42(a) to 42(c) illustrate a microchip 10 for comparison that is designed such that the wall surfaces 17a, 1/7b of the expanding channel gradually expand compared with the microchip 10 of FIGS. 35(a) to 35(g) including an embodiment of a particle separation channel for implementing a continuous particle separation method according to the present invention. FIG. 42(a) is a top view of the microchip 10 and a detail drawing view from A of FIG. 42(b). FIG. 42(b) is a cross section view along the line B-B in FIG. 42(a), and FIG. 42(c) is an enlarged view of an area 21 in FIG. 42(a).

FIG. 42(d) is an integrated fluorescence image of separated 0.2-μm fluorescent polystyrene beads, and FIG. 42(e) is an integrated fluorescence image of separated 0.5-μm fluorescent polystyrene beads. FIG. 42(f) is a graph plotting a fluorescence profile of the integrated fluorescence image of separated 0.2-μm fluorescent polystyrene beads at a detection line 20, and FIG. 42(g) is a graph plotting a fluorescence profile of the integrated fluorescence image of separated 0.5-μm fluorescent polystyrene beads at a detection line 20.

DESCRIPTION OF EMBODIMENTS

The following will describe embodiments of the present invention in detail with reference to the drawings, provided, however, the present invention can be implemented in different embodiments without limitation to the following embodiments and examples.

<Particle Detection Device>

Figure 1A:
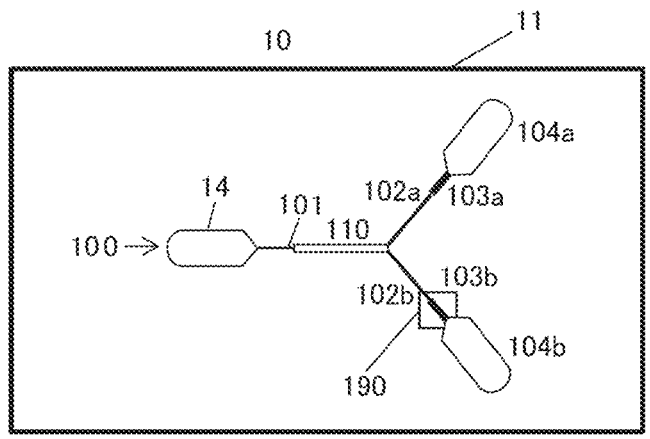
Figure 1A:
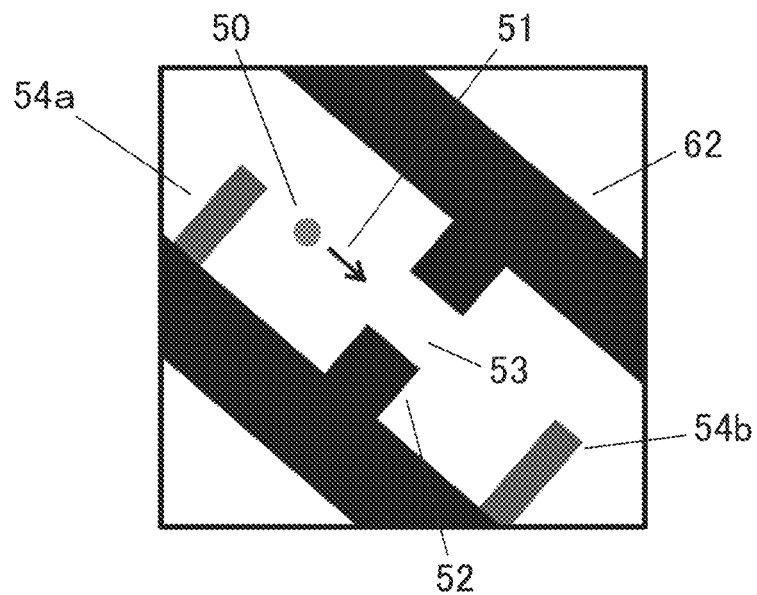

The detail of an embodiment of the present invention will be described with reference to FIG. 1 as schematic diagram illustrating an example of the device configuration of a particle detection device according to the present invention. Although the cross section of the channel of the microchip 10 is preferably a rectangle to facilitate fabrication of the channel structure, the cross section may be a circle, an oval, or a polygon, or may have a partly different shape than a rectangle. Further, although the channel height is preferably uniform to facilitate fabrication, the depth may be partly different. The particle detection device includes: a particle separation channel that enables separation of particles according to the particle sizes in a perpendicular direction to the flow of fluid; and two or more particle recovery channels that are connected to and branched from the particle separation channel.

This microchip 10 is a microchip for measuring particle sizes and a particle size distribution by separating particles according to the sizes and using an adequate detection system. The microchip 10 has, for example, a flat plate structure formed by two flat plate substrates 11 and 12 made of polymer material such as PDMS.

Note that as a technique used for fabricating the microchip 10, for example, a fabrication technique using a mold, such as molding and embossing, is preferable in that the channel structure can be accurately and easily fabricated, however, other fabrication techniques such as wet etching, dry etching, nano imprinting, laser processing, electron beam direct writing, and machining can also be used.

A sample including particles is introduced from an inlet 14 as a fluid introduction port, is transferred toward the downstream of the channel by a liquid delivery unit, passes through a particle introduction channel 101, a particle separation channel 110, a particle recovery channel 102a or 102b, a respective corresponding particle detection unit 103a or 103b, and flows out to an outlet 104a or 104b which is a fluid discharge port. In the particle separation channel 110, particles are separated according to the particle sizes in a perpendicular direction to the flow of the fluid, and the separated particles flow into the particle recovery channel 102a or 102b. After passing through the particle recovery channel 102a or 102b, the particles arrive at the particle detection unit 103a or 103b where the particles are electrically detected. At this point, the particle detection units 103a, 103b are filled with solution including electrolysis and are connected to the electrical measuring equipment 56 and the power supply 57 through a conductor 55 connected to the electrodes 54a and 54b. At the time of detection of particles, current of an arbitrary value flows from the power supply 57, and a closed circuit is formed through an aperture 53. The electrical measuring equipment 56 is further connected to an analysis unit 61 that calculates detected signals acquired from the electrical measuring equipment 56 and creates a particle size distribution.

The sample including particles is fluid including particles to be measured. The particles in the present invention are, for example, in the range of 1 nm to 100 µm in particle sizes, preferably, in the range of 10 nm to 10 µm, and the particles may be, for example, nucleic acids, proteins, vesicles, extracellular vesicles, inorganic powders, metal colloids, polymer particles, viruses, cells, cell masses, protein aggregates, and the like. In addition, fluid according to the present invention is conductive fluid, preferably an aqueous solution including electrolysis, however, conductive oil or other oil may also be used. Further, additives such as surfactants may be added to the aqueous solution.

The inlet 14 may take any structure that can retain a sample including particles, preferably a concave structure. The material may be less elutable material, such as metal, glass, or ceramics, while the inlet 14 may preferably be formed of polymer material for low cost production. The particle introduction channel 101 is formed between the inlet 14 and the particle separation channel 110. The particle introduction channel 101 is arranged to assist separation of particles by the particle separation channel 110, yet, may be omitted for downsizing the microchip 10.

The liquid delivery unit may use a method of transferring fluid by pressure gradient produced by a syringe pump, a peristaltic pump, a pressure pump, or the like, or an electroosmotic flow pump may be used to suppress an uneven velocity distribution in the cross section of the channel of the microchip 10. In such a case, a pipe connected to the pump is directly connected to the inlet 14 so as to apply pressure to the sample retained inside the inlet 14 to transfer the fluid. Alternatively, the pump may be connected to the outlet through a pipe and applies negative pressure to suck the fluid inside the channel of the microchip 10 to transfer the fluid. Furthermore, the fluid may be transferred by a fluid level difference by raising the fluid surface in the inlet 14 higher than the fluid surface in the outlet 104a or outlet 104b. In such a case, the liquid delivery unit is not required. For more quantitative measurement, particles are preferably transferred by pressure gradient, and a mode of transferring fluid by a pressure pump with less pulsation is the most preferable.

It is preferable to set the flow rate of the liquid delivery unit to an arbitrary value by adjusting the cross section area of the channel and the cross section area of the aperture, for example, preferably, between 0.1 µL/hour and 1 mL/hour.

<Particle Recovery Channel>

Figure 2A:
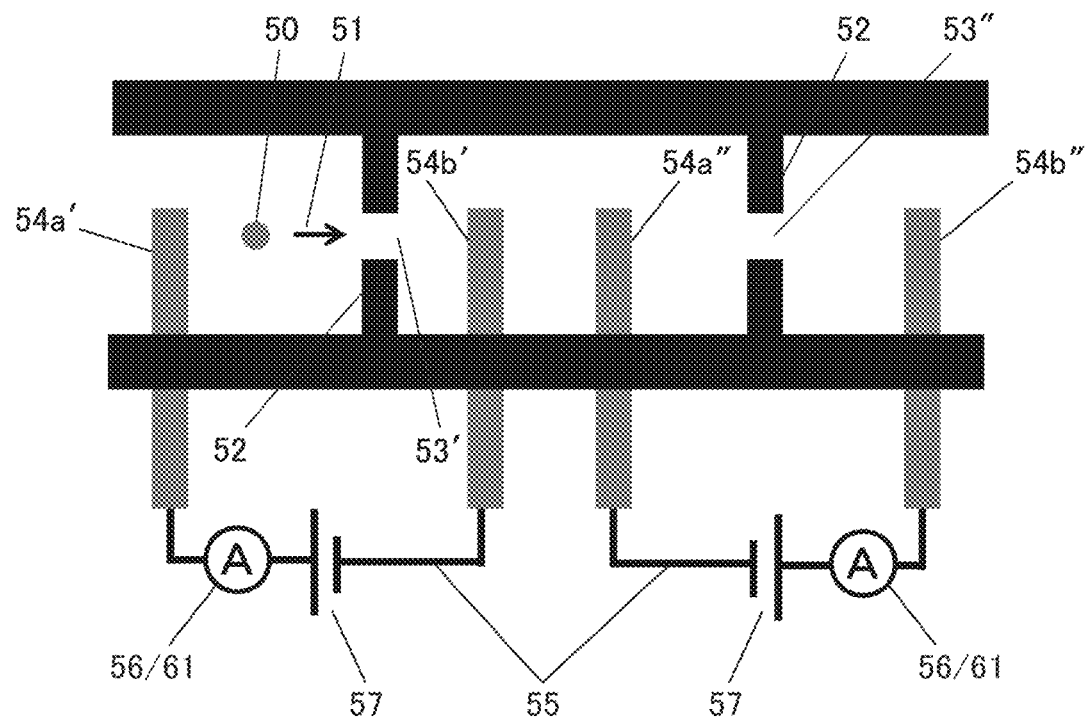
FIG. 2(a) is a diagram illustrating an embodiment of the present invention, illustrating a mode where two particle detection units 103 are arranged in series.
Figure 2B:
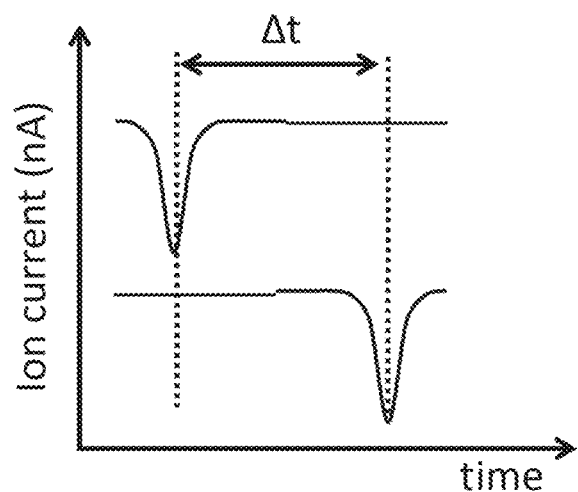
FIG. 2(b) is a diagram schematically illustrating a change in a measuring current value over time when one particle continuously passes through the two particle detection units 103; the upper graph is measured by a particle detection unit 103 on the upstream side, the lower graph is measured by a particle detection unit 103 on the downstream side. Although the vertical axes of the graphs of the two particle detection units 103 are shifted from each other for convenience, the current values as baselines are almost the same when no particle is passing.
Figure 3A:
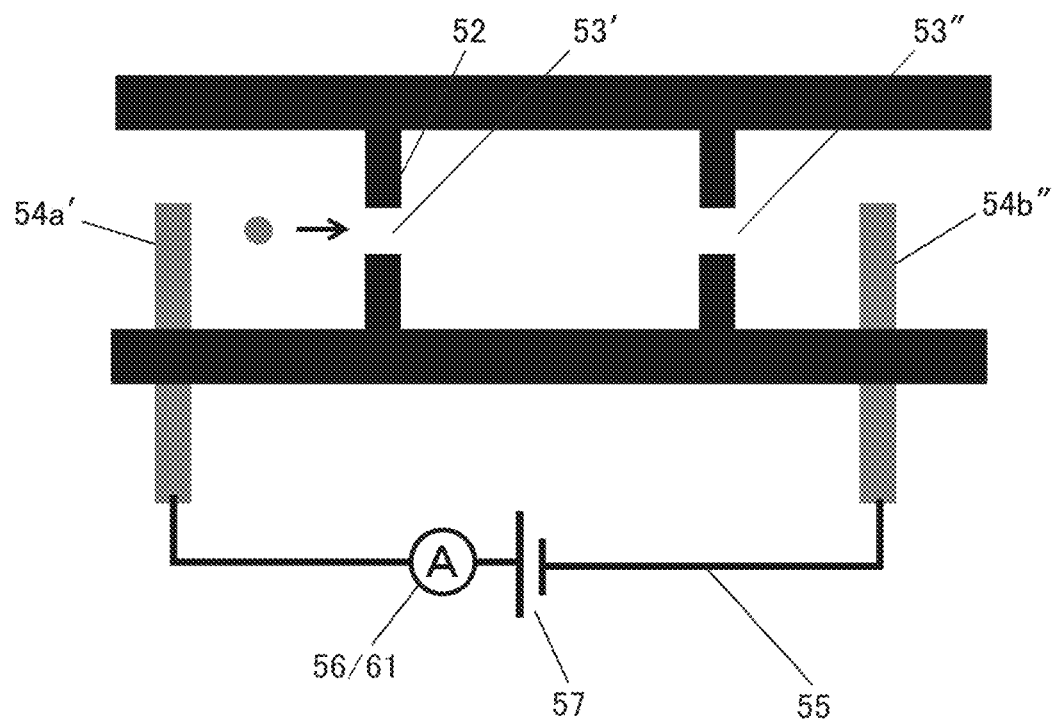
FIG. 3(a) is a diagram illustrating an embodiment of the present invention, illustrating a mode where two apertures are arranged in series, which is different from FIG. 2 in that only a pair of electrodes are used.
Figure 3B:
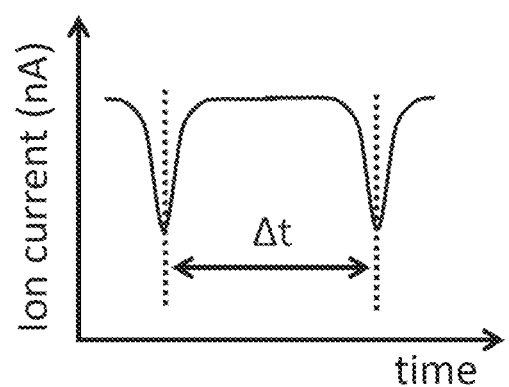
FIG. 3(b) is a diagram schematically illustrating a change in a measuring current value over time when one particle continuously passes through the two apertures.
Figure 4B:
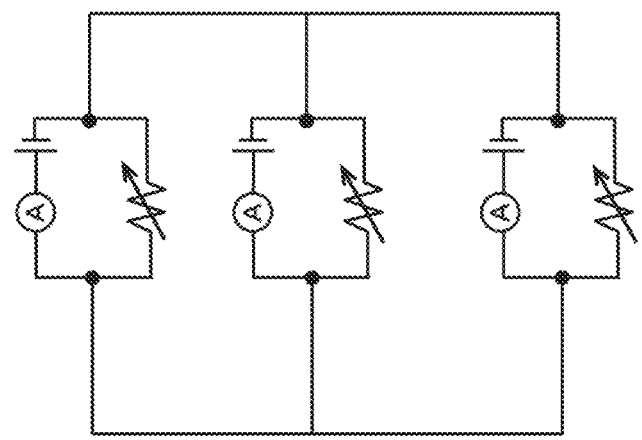
FIG. 4(b) illustrates an equivalent circuit of FIG. 4(a).
Figure 4A:
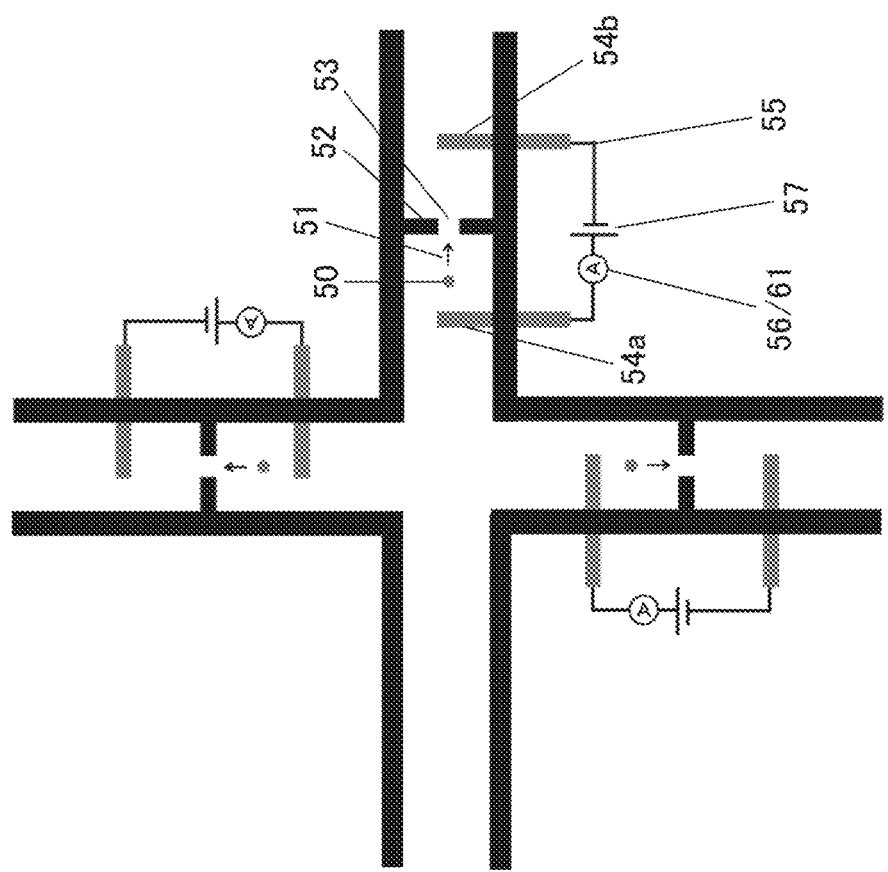
FIG. 4(a) is a diagram illustrating an embodiment of the present invention, illustrating a mode where a plurality of particle detection units 103 are arranged in parallel for one particle recovery channel 102.
Figure 5B:
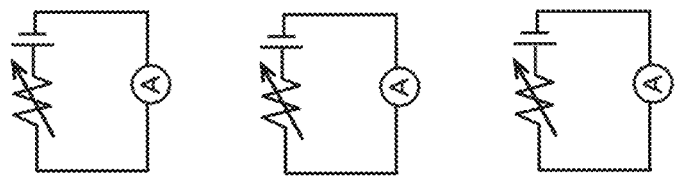
FIG. 5(b) illustrates an equivalent circuit of FIG. 5(a), indicating that a plurality of particle recovery channels 102 are independent from one another.
Figure 5A:
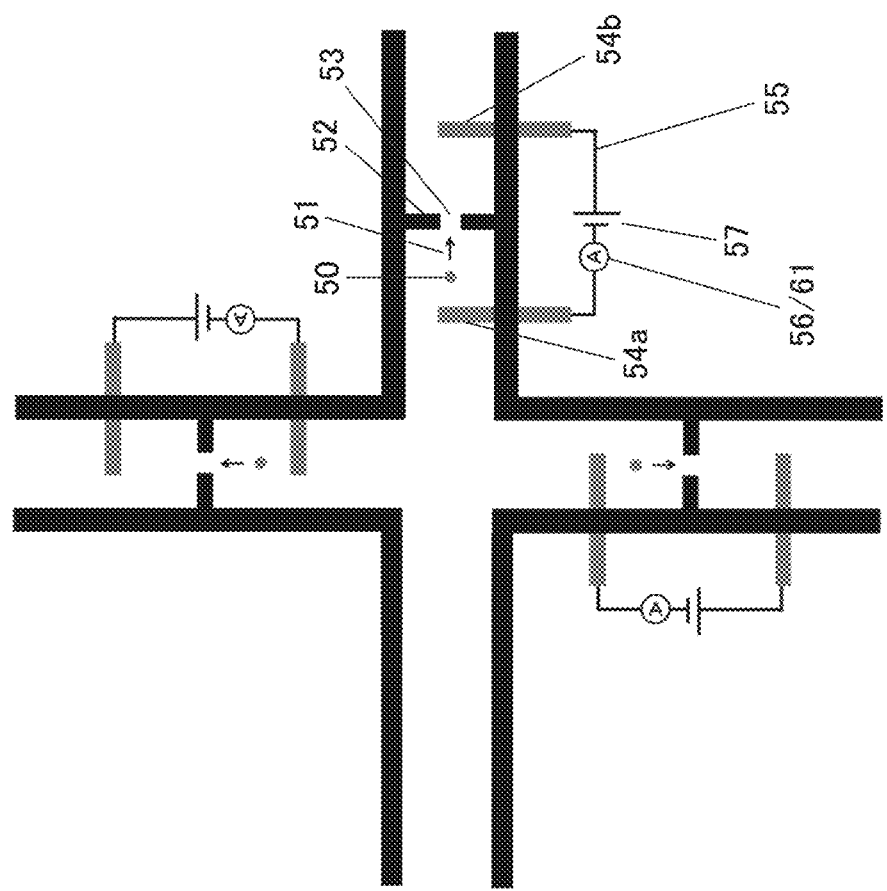
FIG. 5(a) is a diagram illustrating an embodiment of the present invention, illustrating a mode where a plurality of particle detection units 103 are arranged in parallel for one particle recovery channel 102, as well as, illustrating a mode where a plurality of particle detection units 103 fluidly apply voltage from electrodes on the downstream side to reduce electrical interference among the plurality of particle detection units 103.
Figure 6:
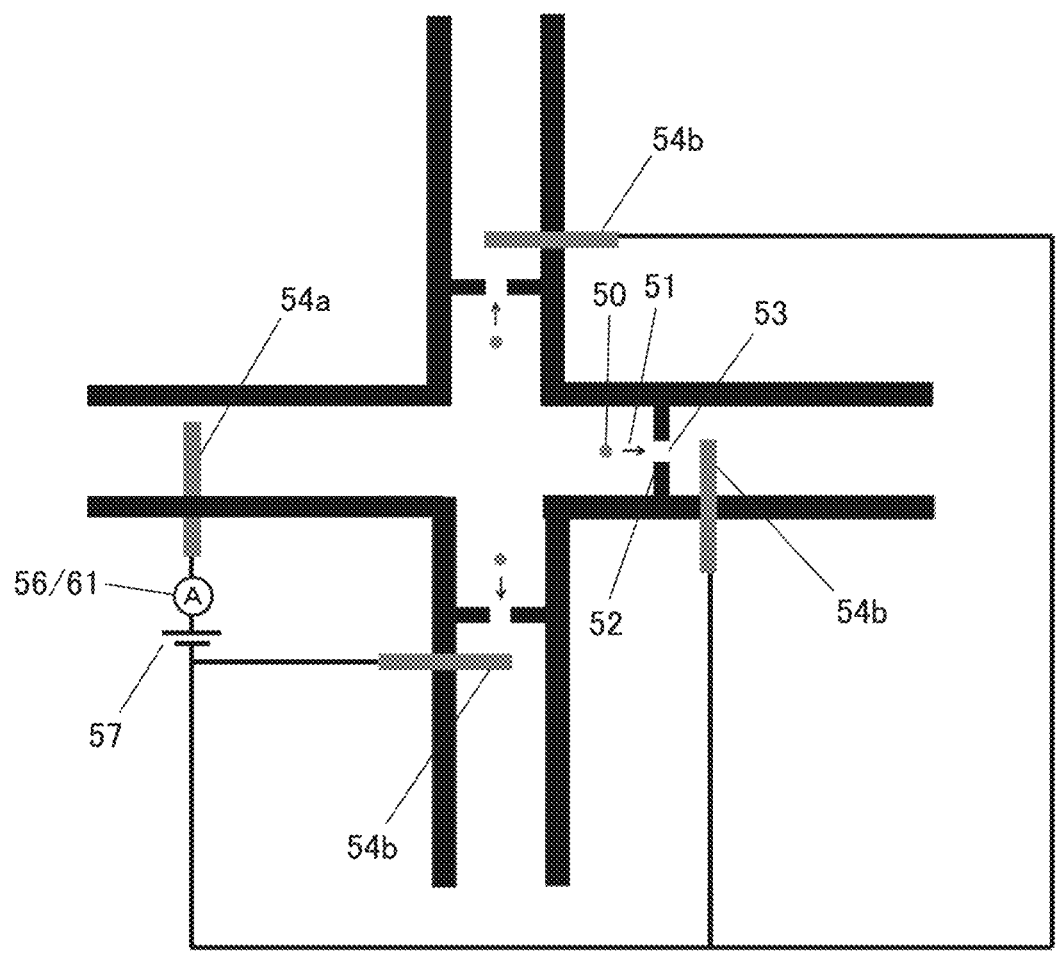
FIG. 6 is a diagram illustrating an embodiment of the present invention, illustrating a mode where a plurality of apertures are arranged in parallel for one particle recovery channel 102, which can be used as a lower cost device by arranging an electrode on the downstream side of each aperture and sharing an electrode on the upstream side.
Figure 7:
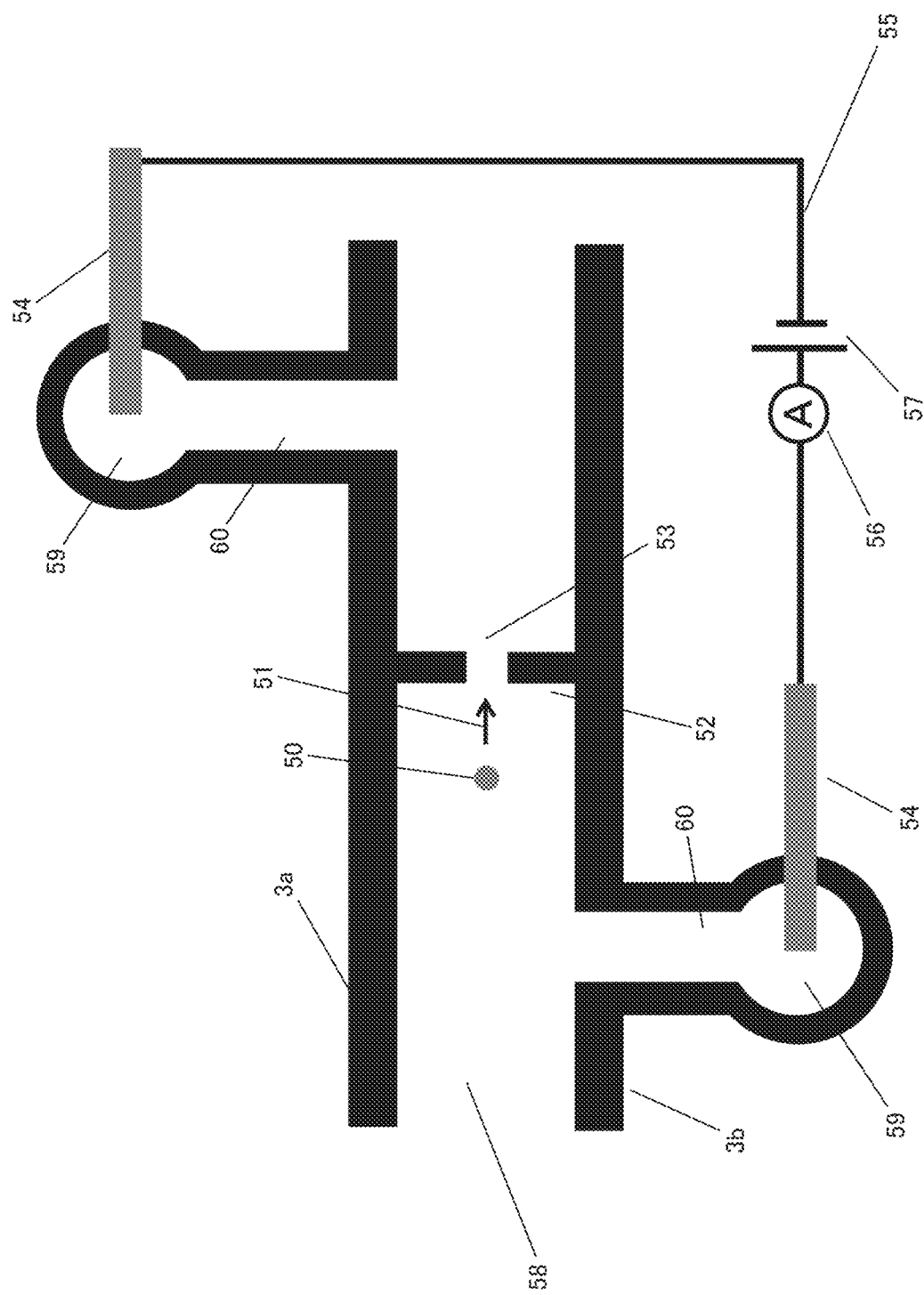
FIG. 7 illustrates a mode for fabricating a particle detection unit 103 with lower cost using a relay channel 60 and an electrode insertion port 59.

Two particle recovery channels 102 are provided in view of expanding the measurable particle size range (a dynamic range). A particle detection unit 103 is provided inside the particle recovery channel 102 or downstream thereof, and is used to detect particles flowing in the particle recovery channel 102. At least one particle detection unit 103 needs to be provided, or two or more particle detection units 103 may be provided, for one particle recovery channel 102 (FIGS. 2 to 6). When two or more particle detection units are provided for one particle recovery channel 102, the particle detection units may be provided in series on one particle recovery channel (FIGS. 2 to 3), or particle detection units may be provided in parallel on branched particle recovery channels (FIGS. 4 to 6). Moreover, a channel for recovering particles outside of the measurable particle size range may further be provided. In a mode where two or more particle detection units 103 are provided for one particle recovery channel 102, the above-described two or more particle detection units 103 may be arranged in series (FIGS. 2 to 3). For example, when two particle detection units 103 are arranged in series, the passing speed of particles in the channel can be calculated from an interval of signals generated from the same particle that passed through the two particle detection units 103, and, since the passing speed of particles is proportional to the flow rate of the recovery channel 102, the flow rate of fluid in the recovery channel can be estimated. In such a case, as illustrated in FIG. 2, voltage applied to the electrodes is preferably a mode where voltage is applied from an electrode on the upstream side of the upstream side aperture 53' and from an electrode on the downstream side of the downstream side aperture 53". When voltage is applied from the electrode 54b' on the downstream side of the upstream side aperture 53' or from the electrode 54a" on the upstream side of the downstream side aperture 53", a voltage drop occurs between the two electrodes, and the change in the current value of one aperture influences the current value of the other aperture, thus, measurement should be performed taking into account these influences. As such, when a particle detection unit 103 having two or more apertures is used, measurement may be performed using only an electrode 54a' on the upstream side of the upstream side aperture 53' and an electrode 54b" on the downstream side of the downstream side aperture 53" as illustrated in FIG. 3. Note that as illustrated in FIG. 7, electrode insertion ports 59 may be provided both upstream and downstream of the particle detection channel or both upstream and downstream of the aperture, which are fluidly and electrically connected to the aperture through relay channels 60, and particles may be detected by ESZ by immersing the electrodes 54 in the electrode insertion ports 59.

Alternatively, in a mode where two or more particle detection units 103 are provided for one particle recovery channel 102, the two or more particle detection units 103 may be arranged in parallel (FIGS. 4 to 6). With this mode, a significant effect that the processing volume increases in proportion to the number of the particle detection units 103 arranged in parallel, can be obtained. In such a case, measurement can be performed when the electrodes 54 for electrical detection are arranged on both sides of each aperture, and the number of the electrodes 54 are twice as many as the number of the particle detection units 103. On the other hand, as illustrated in FIG. 6, measurement can also be performed in a mode where one electrode is arranged on the upstream side of each aperture and electrodes of the same number as the number of the particle detection units 103 are arranged on the downstream side of the aperture, which mode is preferable in view of saving costs by reducing the number of electrodes. In a case where the particle detection units 103 are arranged in parallel and simultaneously apply voltage to the apertures, when voltage is simultaneously applied to a plurality of electrode pairs arranged on both sides of each aperture, as illustrated in FIG. 4, the equivalent circuit becomes complicated where a change in the current value of a certain aperture influences the current values of the other apertures, thus, these influences need to be taken into account. On the other hand, when voltage is individually applied to each aperture and detection is desired to be performed for each aperture, which is made possible by disconnecting an aperture that is not to be measured from a ground or chassis to form an open circuit state, whereby the above-described influence to other apertures is negated. In such a case, a switching circuit may be used between the electrode 54 and the power supply 57 to make the open circuit state, or a relay system or a photo MOS system may be used to make the open circuit state. The particle detection unit 103 is preferably configured as a measurement system that is minimally affected by electromagnetic noise during measurement. In this respect, the switching circuit is preferably configured as a system using photocurrent, such as a photo MOS sensor, rather than a relay system using an electromagnet. However, as illustrated in FIG. 5, when voltage is applied from the electrode on the downstream side of an aperture toward the one on the upstream side, a change in the current value of a certain aperture does not affect the current values of the other apertures. In such a case, this mode may also be used.

Figure 25:
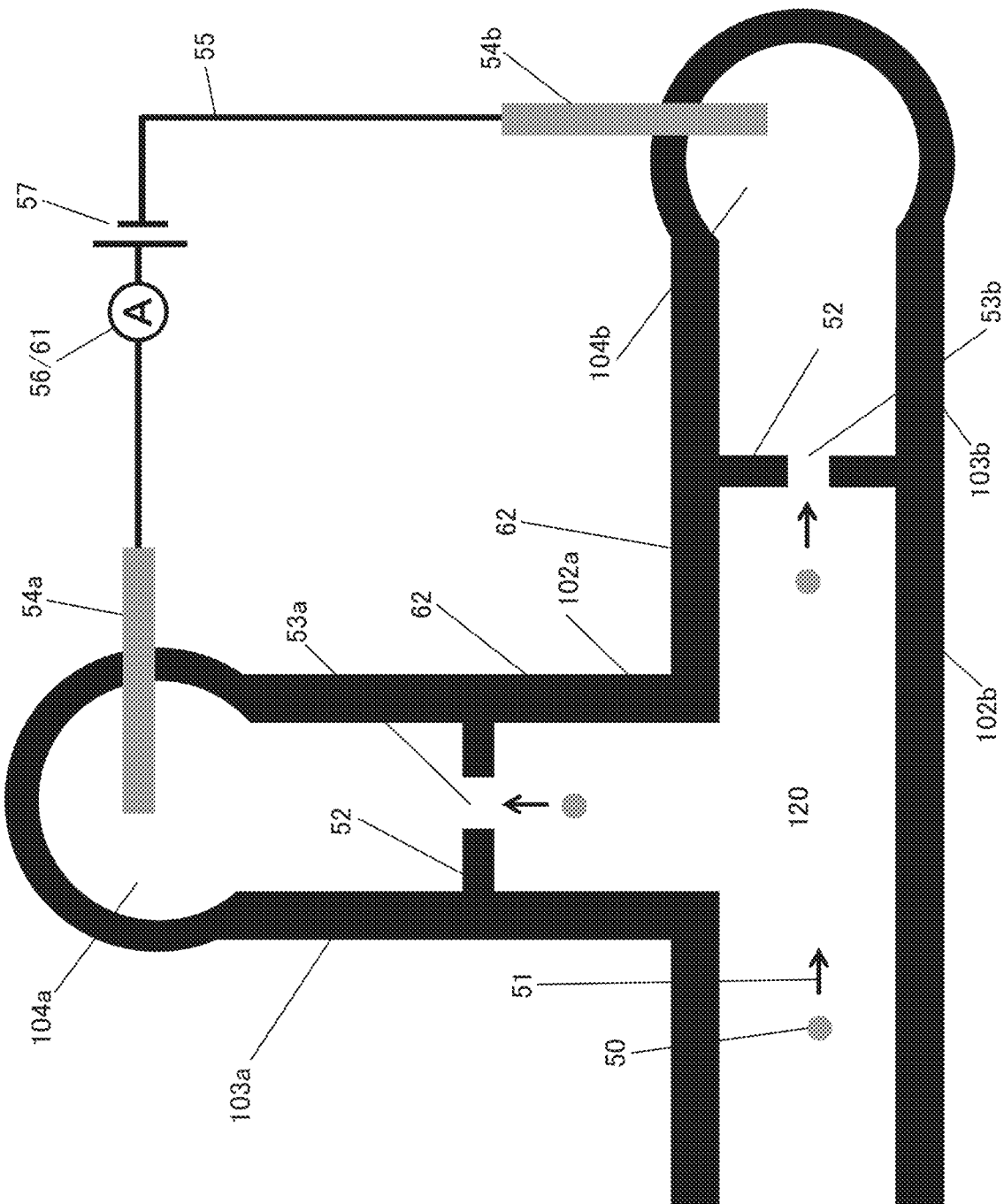
FIG. 25 is a diagram schematically illustrating the present invention, where a particle 50 flows into an aperture 53a or 53b, and the particle is detected by electrodes 54a and 54b arranged at two fluid discharge ports in accordance with the ESZ principle.

The particle detection unit 103 includes an aperture 53 and an electric detector. The aperture 53 refers to a hole formed inside the channel and smaller than the channel diameter, and is defined by a particle detection channel 62 and an aperture forming structure 52. The cross section shape of the aperture may take any of a variety of shapes according to the fabrication process, the shape may be a circle or an oval when processed by etching or laser irradiation, or may be a rectangle or a trapezoid when molded using polymer material, such as polydimethylsiloxane (hereinafter, referred to as PDMS), by photolithography and soft lithography. The cross section area of the aperture should be larger than the particles to be measured. In general, it is said that the particle size range that can be measured by ESZ is 2 to 60% of the cross section area of the aperture, thus, it needs to be designed according to the sizes of the particles that are assumed to be flowing in. Further, as illustrated in FIGS. 2, 3, 15, 25, and 27(b), a particle detection unit 103 may include two apertures. Moreover, as illustrated in FIGS. 4 to 6, a plurality of particle detection units may be provided in line with a plurality of apertures, the downstream of each aperture may be connected to an outlet, and each outlet may also function as an electrode insertion port 59. In such a case, when the volumes of the apertures are almost the same, signals obtained from each aperture are almost the same. In other words, all the particles flowing to the recovery channel in the upstream of each aperture can be detected, which is apparently a preferable mode in view of quantitative measurement of concentration. Alternatively, in a mode where at least two or more particle detection units 103 are arranged in parallel for one particle recovery channel 102, a fluid discharge port is connected to each end of the branched particle recovery channels (FIG. 25). In such a case, the electrodes 54a. 54b can be arranged such that the leading end is immersed in solution including electrolysis in the fluid discharge port, and electric current supplied from the power supply flows from one electrode 54a or 54b, passes through the aperture 53a or 53b, the branch part 110 and the other aperture, and reaches the other electrode. According to this mode, the number of electrodes can be reduced by arranging the electrodes only at the fluid discharge ports. Since the sensitivity in detecting particles by ESZ decreases in proportion to the channel resistance between the aperture and the electrodes, this decrease in signal needs to be taken into account to calculate the particle sizes from the obtained signals (refer to equation (1)). In the equation, L is the length of a channel in which an aperture is formed, de is the equivalent diameter of the aperture, L' is the length of the relay channel 60, and de' is the equivalent diameter of the relay channel 60. Consideration of the decrease in signal calculated by the equation (1) is preferably taken as necessary according to the channel structure, without limitation to an equation that completely matches the equation (1).

$$k = \frac{(L/d_e^2) + 2(L'/d_e'^2)}{L/d_e^2} \quad \text{[Math. 1]}$$

The electric detector of the particle detection unit 103 primarily includes electrodes 54, an electrical measuring equipment 56 that is connected to the electrodes 54 through a conductor 55, and a power supply 57. The two electrodes 54 are arranged on both sides of the aperture 53. The electrical measuring equipment 56 may be any equipment that detects electrical characteristics, such as, an amperometer, a voltage meter, a resistance meter, and a charge meter, where, an amperometer is the most preferable for measurement by ESZ. Moreover, detecting a subtle change in a current value by increasing gain using an IV amplifier after current/voltage conversion is preferable to detect finer particles. Furthermore, to detect particles passing through the aperture without overlooking any particles, a sampling time interval of the electrical measuring equipment 56 is preferably sufficiently shorter than the time required for a particle to pass through the aperture, and the sampling is preferably performed 10,000 times per second, more preferably 20,000 times per second.

When the cross section areas or volumes of apertures 53a, 53b of a plurality of particle detection units 103 are the same, signals obtained from both apertures are almost the same. In other words, all the particles flowing in both apertures can be similarly detected, which is preferable in view of quantitative measurement of concentration.

Figure 26A:
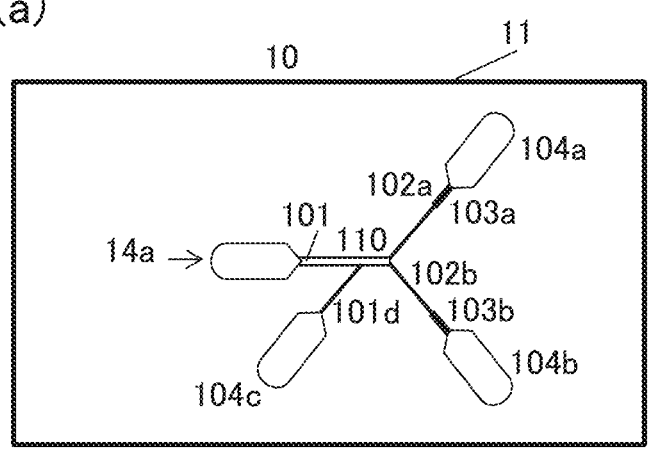
FIGS. 26(a) and 26(b) are top views of the microchips 10.
Figure 26B:
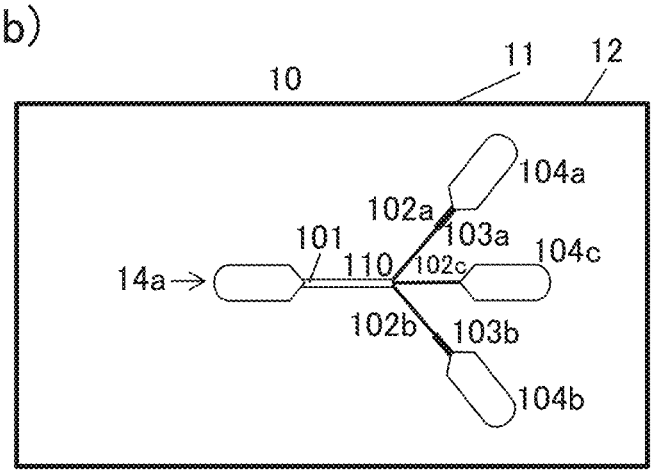
Figure 26C:
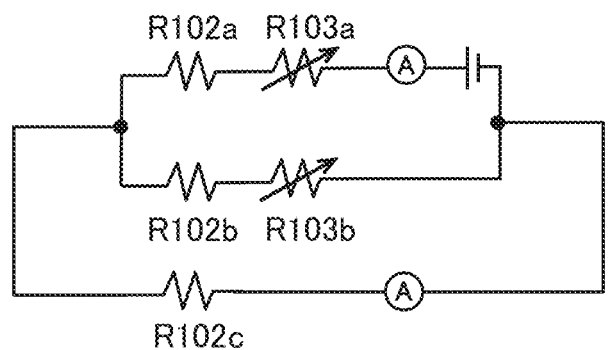
FIG. 26(c) illustrates the equivalent circuit thereof.
Figure 27A:
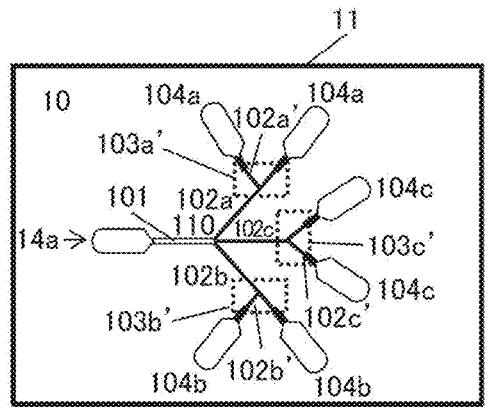
FIG. 27(a) is a top view of the microchip 10.
Figure 27A:
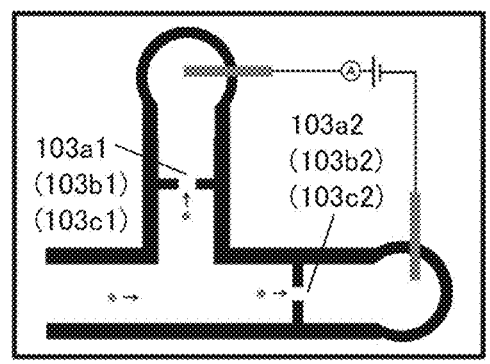
Figure 27C:
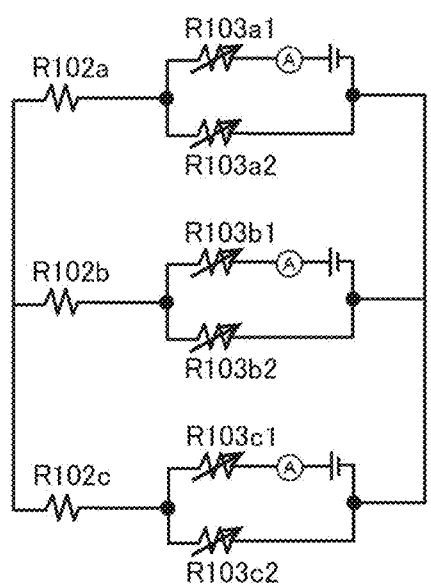
FIG. 27(c) illustrates the equivalent circuit thereof.

Further, a branch channel 101d may be provided on the particle introduction channel 101 as illustrated in FIG. 26(a), and three particle recovery channels (102a, 102b, 102c) may be provided and another electrode is arranged at the fluid discharge port 104c at the end of the channel as illustrated in FIG. 26(b). In such a case, the equivalent circuit becomes as illustrated in FIG. 26(c), and the added electrode is connected to the aperture 53a in series and the aperture 53b in parallel. As such, when a particle passes through the aperture 53a, the current value flowing to the added electrode decreases, while, when a particle passes through the aperture 53b, the current value flowing to the added electrode increases. Thus, by connecting another electrical measuring equipment 56' to the added electrode to measure electricity simultaneously with the electrical measuring equipment 56, it is possible to determine which aperture a particle passes through.

The power supply 57 may be either DC or AC power supply, preferably, the one unsusceptible to noise during measurement is selected, and, in terms of cost, a low-cost and low-noise DC power supply such as a battery is preferably used. Further, the material of the electrodes may be material with small electrical resistance without limitation, for example, metal, inorganic compound, or organic compound may be used, however, metal is preferable in terms of durability and costs.

The analysis unit 61 can include an arithmetic device for calculating measurement results and a recording medium for recording the measurement results or calculation results derived from the measurement results. Alternatively, these arithmetic device and recording medium may be integrated in the electrical measuring equipment 56 or may be an external device connectable to the electrical measuring equipment 56. The data to be recorded in the recording medium includes sampled current values, changes in current values generated when particles pass through the aperture, as well as, particle sizes, particle numbers, particle densities, and detection time or elapsed time from measurement start time, which are calculated from the changes in the current values.

<Particle Separation Channel>
<Hydrodynamic Filtration (HDF)>

Figure 8A:
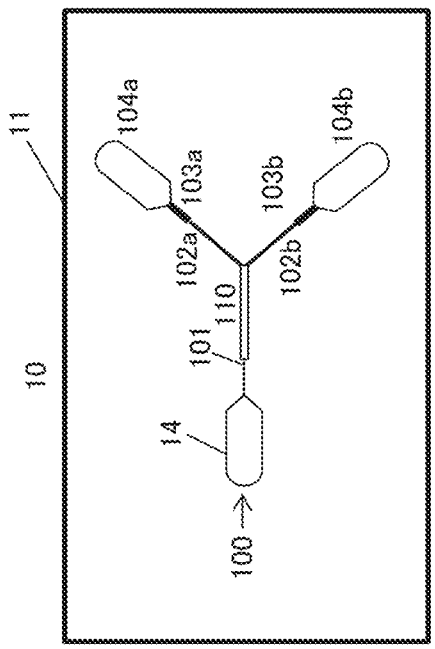
FIGS. 8(a) to 8(c) are diagrams illustrating an embodiment of the present invention, illustrating a mode where HDF is applied to a particle separation channel 110.
Figure 8B:
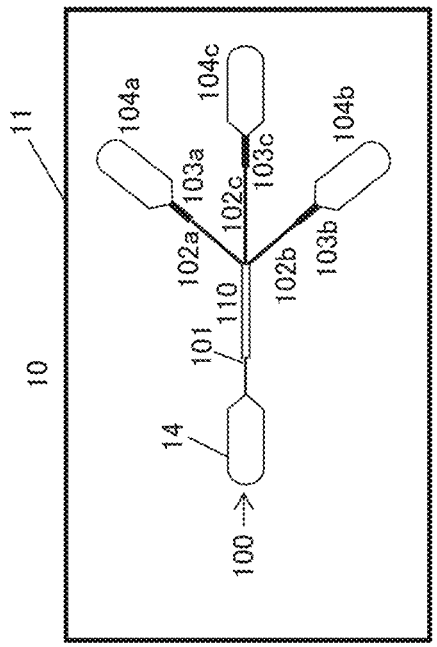

When hydrodynamic filtration (HDF) is used as a separation method used in the particle separation channel 110, the upstream end of the particle separation channel 110 may be connected to the particle introduction channel 101 and the downstream end, from which fluid flows out, may be connected to the particle recovery channel 102 through the branch part 110A (FIG. 8). In such a case, the branch part 110A needs to be fluidly connected to at least two or more particle recovery channels 102 to separate particles, and the cross section area and volume of each channel and aperture need to be set in consideration of hydrodynamic resistance of downstream including the particle recovery channels. For example, when three recovery channels 102 are provided as illustrated in FIG. 8(b) and FIG. 9, and the flow rates flowing in respective recovery channels are defined as Qa, Qb, Qc, the ratio of each flow rate is calculated from the width w, height h, length L of each channel, specifically, the flow rate in a linear channel is calculated by the following equation (2), based on the Hagen-Poiseuille equation:

$$Q = \Delta P \times \frac{D_r^2 wh}{32\mu L} \quad [\text{Math. 2}]$$

Q: FLOW RATE

ΔP: PRESSURE LOSS

Dr: HYDRAULIC DIAMETER w: CHANNEL HEIGHT

μ: VISCOSITY

L: CHANNEL LENGTH

Figure 9A:
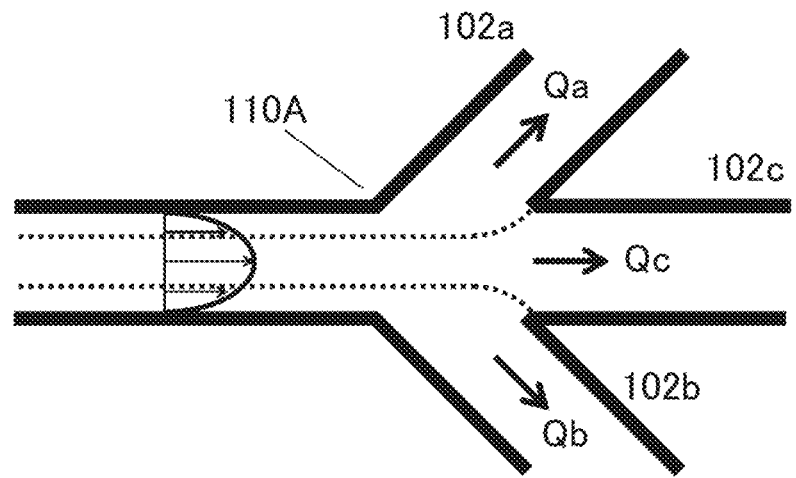
FIG. 9(a) is a diagram illustrating the flow of fluid at a branch part 110A of FIG. 8(b)
Figure 9B:
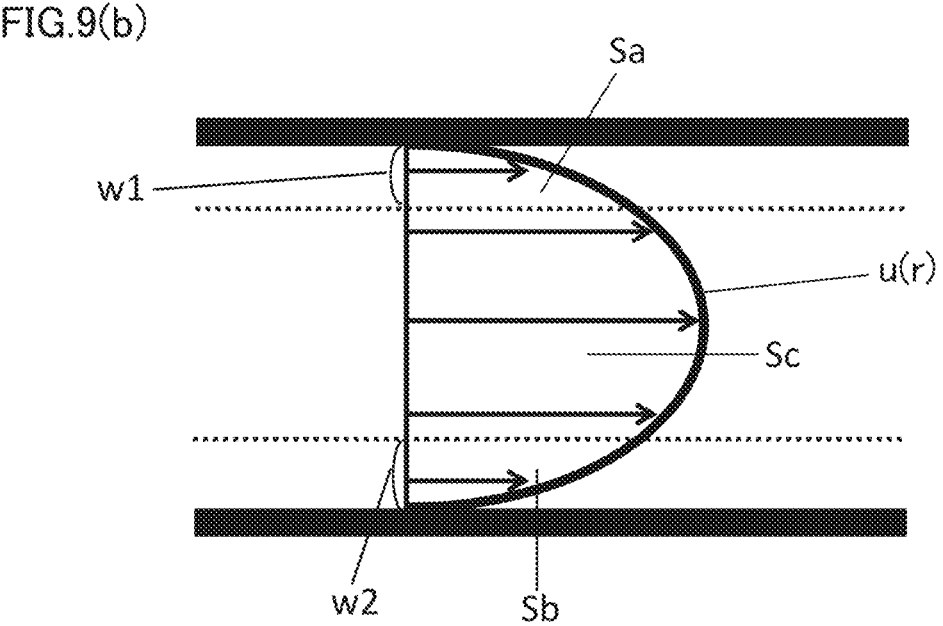
FIG. 9(b) is an enlarged view of a linear channel part of FIG. 9(a).

As illustrated in the enlarged view of FIG. 9(b), under a laminar flow condition, the velocity distribution in the microchip channel forms a parabola and, in general, is expressed by u(r) in the following equation (3) where w0 is the radius of a tube, r is a distance from the center of the tube, μ is the viscosity, L is the length of the tube, and ΔP is the pressure loss.

$$Q = \int_0^{w_0} u(r) \cdot 2\pi r dr = \int_0^{w_0} \frac{\Delta P}{4\mu L}(w_0^2 - r^2) \cdot 2\pi r dr \quad [\text{Math. 3}]$$

The ratios of areas Sa, Sb, Sc in the parabola, partitioned by arbitrary distances w1 and w2 from the channel wall surface are equal to the ratios of flow rates Qa, Qb, Qc flowing into respective recovery channels. Here, among particles present in the channel, particles of which center or center of gravity is positioned closer to the channel wall surface than w1 flow into the recovery channel 102a, particles of which center or center of gravity is positioned closer to the channel wall surface than w2 flow into the recovery channel 102b, and particles of which center or center of gravity is positioned between w1 and w2 flow into the recovery channel 102c. Accordingly, the radiuses of the largest particles that flow into the recovery channels 102a, 102b are respectively w1, w2, therefore, when the cross section shape of the aperture is a circle, the radius of the aperture needs to be w1 or w2 or larger, and, when the cross section shape of the aperture is an approximate circle or oval, the minimum radius from the center or center of gravity of the approximate circle or oval needs to be w1 or w2 or larger. Further, when the cross section shape of the aperture is a rectangle, the length between the two sets of opposing sides need to be a length twice or more of w1 or w2. In addition, when the cross section shape of the aperture is a polygon, the radius of the inscribed circle needs to be w1 or w2 or larger.

Figure 8C:
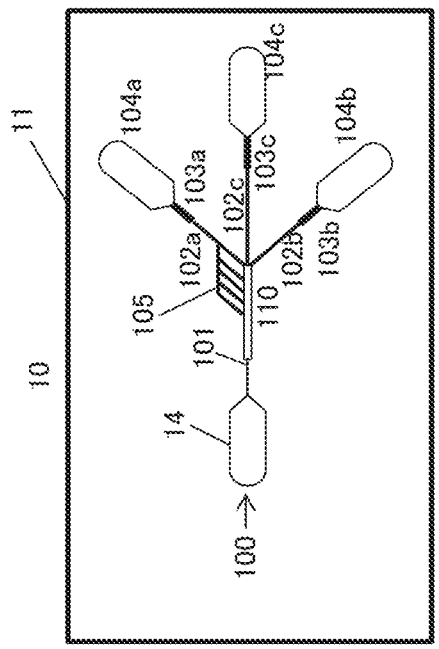

A plurality of branch parts 110A may be provided at other positions than the end of the particle separation channel 110 (not illustrated in FIG. 8), and one or more branch channels 105 may be provided (FIG. 8(c)). The branch channels 105 may be provided only on one side of the channel wall surface or on both sides of the channel wall surface. Further, one or more branch channels 105 may simultaneously join at a downstream recovery channel 102 or may gradually join.

Moreover, a particle diffusion channel 110B (FIG. 10(b)) may be formed on the fluidly upstream side of the branch part 110A of the particle separation channel 110 (not illustrated in FIG. 10). The fluidly upstream side of the particle diffusion channel 110B is connected to the particle introduction channel 101, and the fluidly downstream side is connected to the branch part 110A. Moreover, in a mode where the particle introduction channel 101 is not used, the fluidly upstream side of the particle diffusion channel 110B is directly connected to the inlet.

The particle diffusion channel 110B preferably has a structure where the width or height of the channel or both of them expand from the fluidly upstream side toward the fluidly downstream side. A preferable mode is different depending on whether a plurality of particle recovery channels exist in the channel width direction of the particle diffusion channel 110B or in the height direction thereof. When general photo lithography and soft lithography are used as a technique for forming the microchip channel, the structure of expanding the channel width is preferable in view of facilitating fabrication thereof.

In this particle diffusion channel 110B, based on the fact that the Brownian motion of a particle per unit time, i.e., a diffusion distance, is inversely proportional to the square root of the particle size, when particles flow through the particle diffusion channel 110B, the particles diffuse in the expanding direction of the channel according to the particle sizes. Thus, the existence probability of particles of small particle sizes becomes higher around the expanded channel wall surface, and the concentration effect is obtained. The angle $\theta a$ at which the channel wall surface a and the particle diffusion channel wall surface a are connected, as well as, the angle $\theta b$ at which the channel wall surface b and the particle diffusion channel wall surface b are connected in FIG. 10, are points from which the channel width starts to expand, and the angles need to be less than 180°. Moreover, under a high flow rate condition where the flow velocity in the channel enclosed by the channel wall surface a and the channel wall surface b is 1 m/second or more, generation of a swirling flow is concerned at the expanding part, thus, fluid is preferably transferred under a relatively lower flow rate condition of less than 1 m/second, or the angles $\theta a$, $\theta b$ are preferably more than 90°. Whereas, when particles are flowing in the particle diffusion channel 110B, the particles receive inertial force from the direction the particles have flowed according to the weights (toward a fluidly downstream direction where the branch part 110A exists). In other words, when the densities of the particles are the same, particles of larger particle sizes receive inertial force in a direction toward the channel center, thus, the abundance ratio of particles of smaller particles sizes becomes higher at around near the channel wall surface, contributing to further improvement of separation ability in HDF. Further, the angles $\theta a$, $\theta b$ may be asymmetry, such as, one wall surface may be connected to form an approximate straight line, and only the other opposing wall surface may be connected to expand with an angle of less than 180°.

When HDF is used as a separation method used in the particle separation channel 110, the particle size ranges that can be detected by the particle detection units 103a and 103b in FIG. 8 may be completely the same, however, the particle detection units 103a and 103b are preferably set to measure different particle size ranges so as to measure samples with wide particle size ranges, more preferably, parts of the particle size ranges overlap each other to detect particles that could not be separated, in view of providing more robust outcome. As illustrated in FIG. 8(a), when there are two particle recovery channels 102, of the particle size ranges that can be detected by the particle detection units 103a, 103b, the particle detection unit 103a may be set to measure a larger particle size range, and the particle detection unit 103b may be set to measure a smaller particle size range, or vice versa. However, based on the HDF theory, the aperture needs to be set so that particles do not occlude the aperture.

In concentration conversion from the count of the particles, the flow rate flowing in each particle recovery channel 102 is calculated using the set flow rate of the liquid delivery unit and equation (2) or (3), and the particle concentration is calculated by dividing the count of particles per measurement time by the flow rate. Further, since the center or center of gravity of a particle in the channel cannot be located closer to the channel wall surface than the radius of the particle, the particle concentration near the channel wall surface becomes relatively lower. Thus, the concentration may be corrected according to the particle sizes in consideration of the portion of the particle radius from the wall surface. In such a case, the flow rate of the portion from the wall surface to the particle radius may be calculated using equation (3), the ratio of the flow rate to the flow rate flowing into each particle recovery channel 102 may be calculated, and the concentration may be corrected based on the calculated ratio.

<Pinched Flow Fractionation (PFF)>

FIG. 12 illustrates example configurations of a case where a channel utilizing the principle of the pinched flow fractionation (PFF) is used in the particle separation channel 110 of the particle detection device of the present invention. When a channel utilizing the PFF principle is used, the particle separation channel 110 includes a branch channel 18a, a branch channel 18b, a pinched channel 16, and an expanding channel 17. An inlet 14a retaining fluid 100P including particles and an inlet 14b retaining fluid 100N not including particles are respectively fluidly connected to the branch channel 18a and the branch channel 18b. The branch channel 18a and the branch channel 18b join downstream and fluidly connect to the upstream side of the pinched channel 16. Then, in accordance with the PFF principle, the particles are separated in the expanding channel 17 that is connected to the downstream of the pinched channel 16. The channel width of the expanding channel 17 becomes constant at a certain position, the particles are recovered by recovery channels 102a, 102b that are fluidly connected to the downstream of the expanding channel 17, and the particles are detected by detection units 103a. 103b that are connected to the recovery channels at the downstream thereof. Although any number of recovery channels may be installed, five or less recovery channels are preferable, and three or less recovery channels are the most preferable, in view of downsizing the channels and lowering costs.

Figure 11:
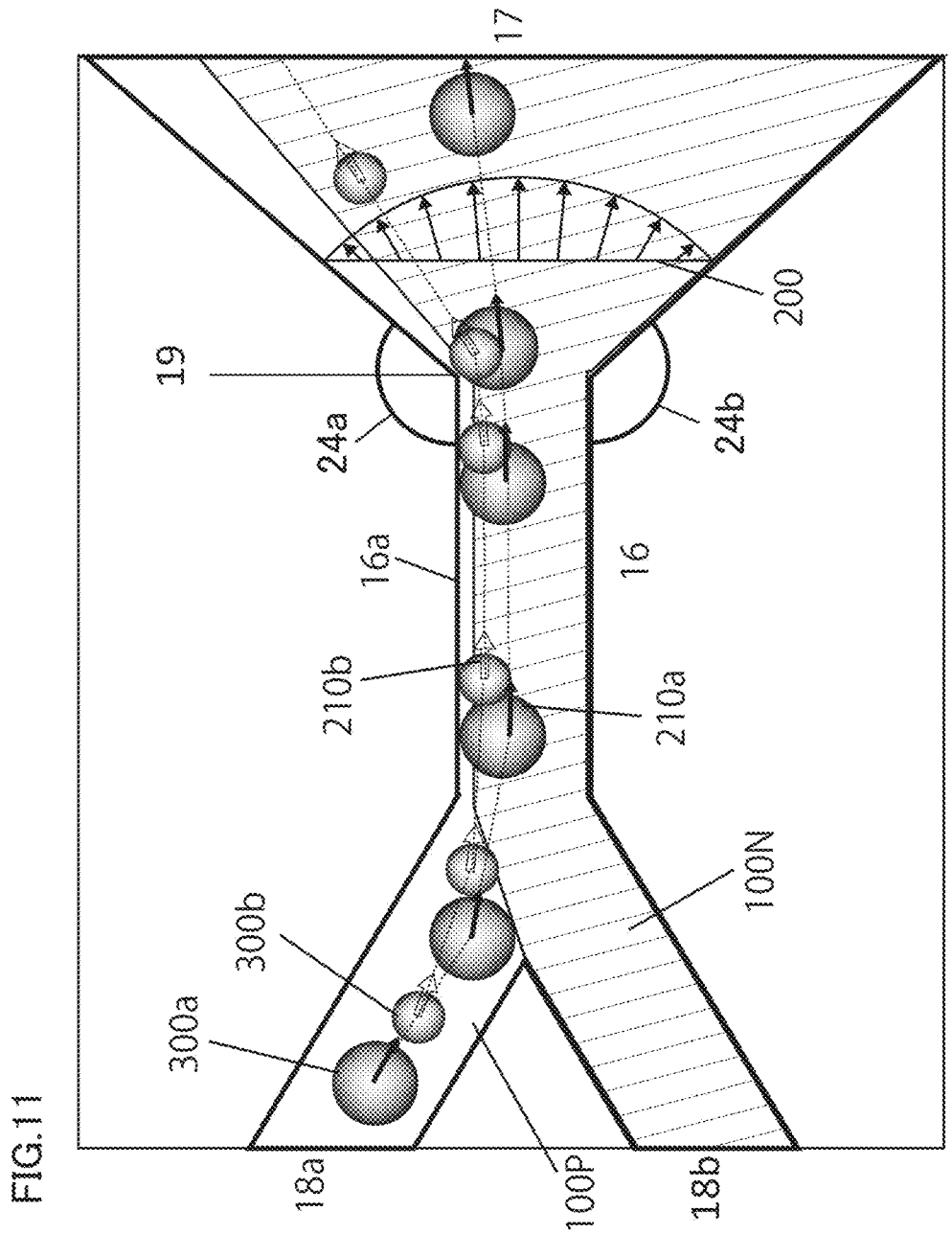
FIG. 11 is a diagram schematically illustrating the PFF principle, illustrating the behavior of fluid introduced from two branches and separation of particles.

FIG. 11 illustrates an example of a pinched channel that is formed by joining channels and an expanding channel, in the microchip of FIGS. 12 to 14, 30, 32 to 37, 39, 41 and 42. Specifically, FIG. 11 is an enlarged view of the area 21 in FIG. 12(a). Fluid 100P is fluid that includes particles and fluid 100N, which is shaded, is fluid that does not include particles, while a particle 300a indicates a relatively larger particle and a particle 300b indicates a relatively smaller particle.

Moreover, in FIG. 11, arrows 200 indicate a streamline profile at the boundary between the pinched channel 16 and the expanding channel 17, an arrow 210a indicates the motion vector of the larger particle 300a and an arrow 210b indicates the motion vector of the smaller particle 300b.

First, the fluid 100P including particles and the fluid 100N not including particles are continuously supplied using a syringe pump or the like respectively from the two inlets 14a and 14b. At this time, respective fluid flows through the channel 13 while maintaining a stable laminar flow.

Then, by adjusting the flow rates of the fluid 100P including the particles and the fluid 100N not including the particles, the width of the fluid 100P in the pinched channel 16 (a distance from the channel wall surface to the interface between the fluid 100P and the fluid 100N) becomes smaller than the particle size of the smallest particles to be separated. Through this operation, all the particles to be separated flow along the inner wall 16a of the pinched channel, and the positions of particles in a perpendicular direction to the wall surface of the inner wall 16a of the pinched channel can be constant according to the sizes of the particles.

Then, at the boundary of the pinched channel 16 and the expanding channel 17, the streamlines expand as indicated by the profile 200, thus, a distance between arbitrary streamlines in the pinched channel 16 expands in the expanding channel 17.

As such, since the positions of particles in a perpendicular direction to the flow of the pinched channel 16 differ according to the sizes of the particles, a difference is generated in the directions between the motion vector 210a of the larger particle 300a and the motion vector 210b of the smaller particle 300b at the boundary between the pinched channel 16 and the expanding channel 17, and, in the following expanding channel 17, the positional differences according to the sizes of the particles expand, whereby classification becomes possible.

Note that the particle sizes of particles and a particle size distribution of particle groups can be studied by observing separated particles using an appropriate detection system along the detection line 20 of the expanding channel 17.

When a particle separation channel 110 based on the PFF principle is used, the channel wall of the particle separation channel is preferably made of material that does not easily expand outward. Thus, as material for fabricating the microchip 10 including a particle separation channel, material that does not easily expand the channel wall surface is preferable, or at least the channel wall surface is preferably made of material that does not easily expand in the width direction of the channel. More specifically, the channel wall surface is preferably made of material of durometer hardness 40 or more, more preferably, material of durometer hardness 60 or more. As usable material, PDMS, various polymer materials such as acrylic resin, glass, silicone, ceramics, a variety of metals such as stainless steel can be used. Preferably, PDMS, various polymer materials such as acrylic resin, glass, silicone, ceramics, stainless steel of durometer hardness 40 or more, more preferably, durometer hardness or more 60, can be used. Among these materials, arbitrary two kinds of materials can be used in combination. However, to provide a disposable device by fabricating the channel at low costs, at least partly polymer material is preferably used, more preferably, the whole device is made of polymer material. Such material may preferably be PDMS, acrylic resin, and the like of durometer hardness 40 or more, more preferably, durometer hardness 60 or more.

The depth direction of the channel may be made of expandable material. Since it is complicated to change the degrees of expansion in the width direction and in the depth direction of the channel in fabrication of the channel, although the above-described microchip 10 was made of PDMS of hardness 30, 44, 60, or 70, the hardness can be set to an arbitrary value, preferably material of hardness of 40 or more, more preferably, hardness of 60 or more, may be used. As described above, the hardness herein refers to durometer hardness (type A durometer is used), which is defined by the deformation amount of a material when a constant weight is applied to the material, which deformation amount is smaller as the hardness is larger.

The hardness test is evaluated in JIS K 6253-5 (a durometer hardness test) in accordance with the JS K 6249 standard. In the test, a Type A durometer hardness tester is preferably attached to an indention depth measurement device configured by a length measurement instrument with a measurement range of indention depth 0.000 to 2.500 mm and a displacement device, where a micrometer is preferably used as a length measurement system. The length measurement instrument (the spindle tip of the micrometer) is fixed to vertically coaxially contact the pressing needle, and the spindle is moved to provide a displacement to the pressing needle. The pressing needle of the hardness tester is displaced from 100 to 0 in accordance with the indications, or the indication value of the hardness tester with reference to a known indention depth value is examined. Examination of the indention depth is preferably performed at least at four positions including the indication values 100 and 0.

The microchip 10 equipped with the particle separation channel 110 based on the PFF principle is configured by forming the channel 13 on the bottom side 11a of the substrate 11 and, then, the substrate 11 is attached on a bottom side substrate 12. The depth of the channel can be set to an arbitrary value in the range of 10 nm to 1 cm, preferably, a value in the range of several micrometers to several tens of micrometers in view of facilitating the fabrication thereof.

The channel 13 has the inlets 14a, 14b and the outlet 15, where the inlets 14a and 14b are respectively fluid introduction ports of fluid including particles and fluid not including particles, and the outlet 15 is an exit of the fluid.

The one end of the channel 13 has at least two branch channels (18a, 18b), and, the channel 13 further includes two channels of different shapes: the pinched channel 16 and the expanding channel 17. The connection part of the pinched channel 16 and the expanding channel 17 can be considered as an expansion start point, at which the channel width changes as illustrated in FIG. 12(c). The expanding channel 17 may be of an arbitrary shape with the channel width larger than the pinched channel 16. The branch channels 18a, 18b are respectively connected to the inlets 14a, 14b, and the expanding channel 17 is connected to the outlet 15.

Note that the whole length of the channel 13, i.e., the length from one end where the inlets 14a, 14b exist to the other end where the outlet 15 exists can be set to an arbitrary value of 1 μm or more, preferably set in the range of several micrometers to several tens of micrometers in view of facilitating fabrication of the channel and pressure loss.

The lengths of the pinched channel 16 and the expanding channel 17 can be set to arbitrary values of 10 nm or more, preferably set to submicrons to several tens of micrometers in view of facilitating fabrication of the channel and pressure loss. Further, in view of achieving alignment of particles, the lower limit of the length of the pinched channel 16 is preferably 1 μm or more, more preferably 10 μm or more, and the upper limit of the length of the pinched channel 16 is preferably 500 µm or less, more preferably 100 µm or less.

The width of the pinched channel 16 refers to the length of the channel in a perpendicular direction to the wall surface of the inner wall 16a of the pinched channel. The width of the pinched channel 16 can be set to an arbitrary value of 10 nm or more as long as the width satisfies a condition of less than the width of the expanding channel 17. Further, in view of achieving alignment of the particles, the lower limit of the width of the pinched channel 16 is preferably 1 µm or more, more preferably, 10 µm or more, and the upper limit of the width is preferably 100 µm or less, more preferably, 20 µm or less.

Note that a plurality of exit ports 15 may be provided for the expanding channel 17, and separation ability can be improved by flowing a large volume of fluid into some exit ports, based on the principle of "asymmetric pinched flow fractionation (AsPPF)" (NPTL 6). More specifically, the principle is that, by appropriately designing the resistance value of the channel and by considering a relationship between the channel width of the pinched channel 16 and particle sizes, particles of certain size can be introduced to only a specific exit port.

Note that, in a continuous particle separation device having a plurality of outlets and a method thereof, arbitrary flow rate distribution ratios can be achieved by appropriately designing the channels by considering the channel network as a whole as analogy of a resistance circuit, thus, designing is preferably performed based on such a perspective.

As a method of adjusting the introduction amount of fluid for achieving a desirable flow rate condition in the channel, introducing solution using a syringe pump, etc. from an introduction port is preferable in terms of simplifying the operation, however, other fluid transferring methods, such as a method of using a different pump such as Perista Pump, a constant pressure fluid transferring method using a cylinder, a pressure device, etc., a fluid transferring method using electroosmotic flow, centrifugal force, etc. may also be used. Alternatively, a pressuring device that applies negative pressure from the outlet may also be used. Note that the fluid transferring pressure is preferably in such a range that a constant fluid transferring is made possible, and preferably 20 MPa or less in view of durability of the channel or the liquid delivery pump itself.

Note that, to achieve stable and efficient separation of particles, a stable laminar flow is preferably maintained in the channel, more specifically, the fluid transferring operation is preferably performed under a condition where the Reynolds number becomes 1000 or less. However, when a channel structure with the diameter of 1 mm or less is used, a turbulent flow is relatively hardly formed, and achieving such a condition becomes easy.

Although we used the branch channels 18a, 18b of 100 µm in width, this value can be set to an arbitrary value of 10 nm or more.

Note that the fluid including particles and the fluid not including particles may be configured as the same fluid, or as two or more kinds of different fluids.

The particles introduced in the channel 13 move toward downstream along the flow, where, by appropriately adjusting the flow rates of fluid introduced from the two inlets 14a, 14b, the positions of the particles in a perpendicular direction to the wall surface of the inner wall 16a of the pinched channel can be adjusted according to the sizes of the particles in the pinched channel 16 of the channel 13. Here, to align the particles in a sample liquid along the wall surface of the pinched channel, the ratio of the flow rate of sheath liquid to the sample liquid is preferably 1 or more, more preferably 10 or more, most preferably 50 or more. Note that the sum of the flow rates of the sample liquid and sheath liquid is preferably set such that the fluid transferring pressure does not become too large, and the flow velocity of the pinched channel is preferably 10 m/second or less, most preferably, 2 m/second or less.

<Asymmetric Pinched Flow Fractionation (AsPFF)>

Figure 13A:
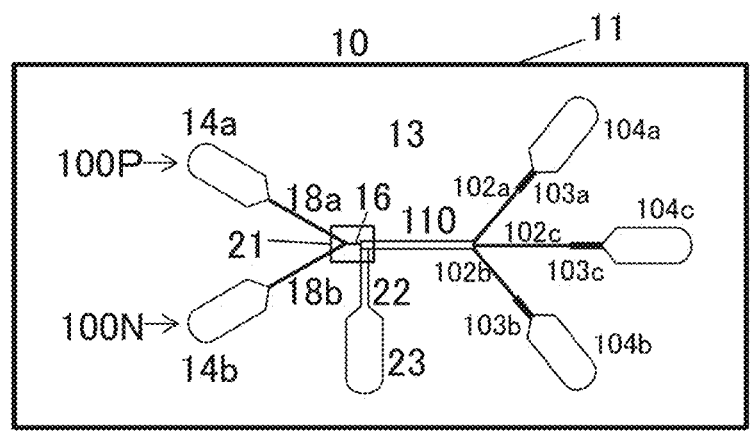
FIG. 13(a) is a diagram illustrating an embodiment of the present invention, illustrating a mode where AsPFF is applied to a particle separation channel 110.
Figure 13A:
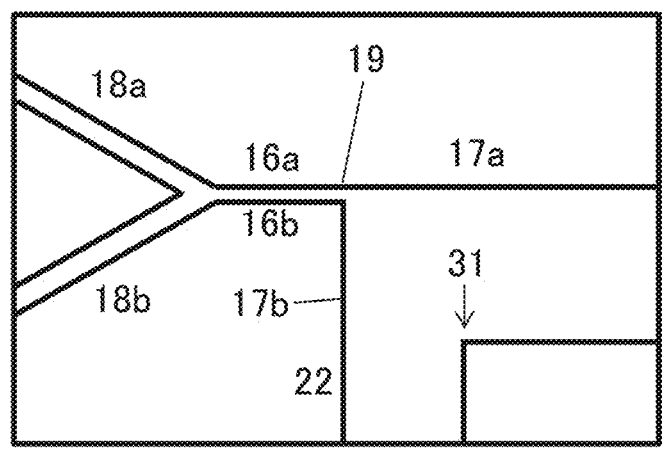
Figure 13A:
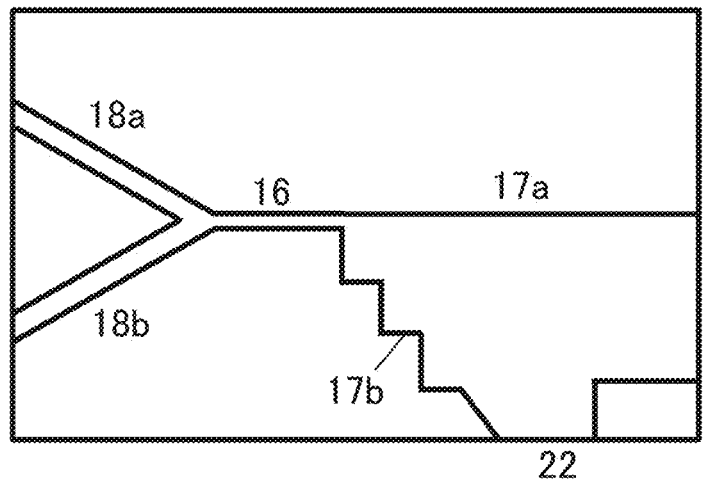
Figure 14A:
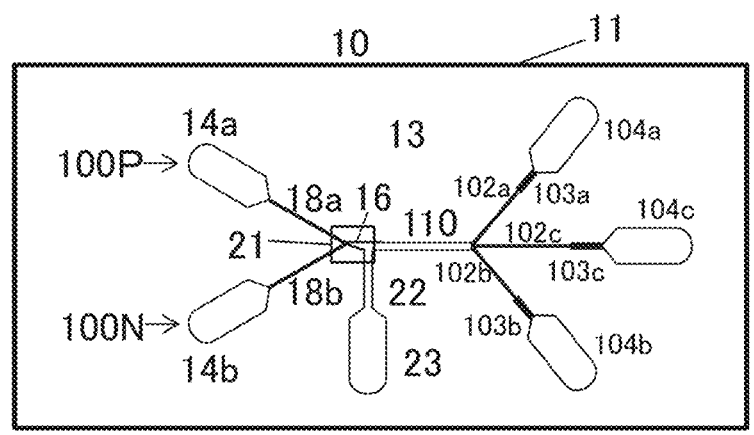
FIG. 14(a) is a diagram illustrating an embodiment of the present invention, illustrating a mode where AsPFF is applied to a particle separation channel 110 and the wall surface of the expanding channel 17 on the pinched channel wall surface 16b side gradually expands.
Figure 14A:
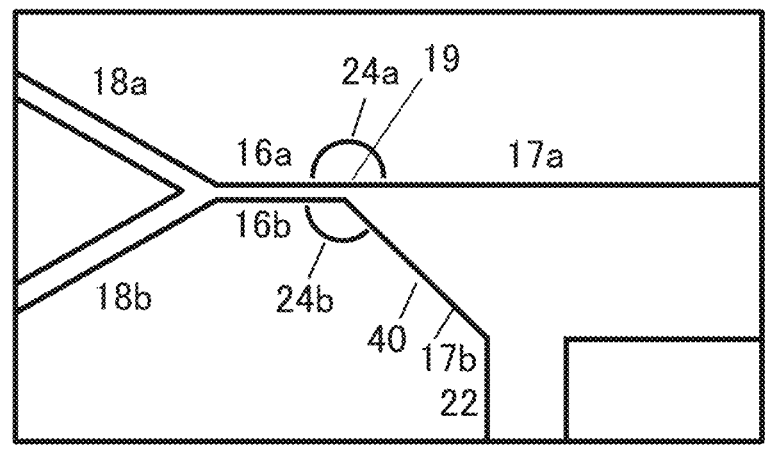
Figure 15:
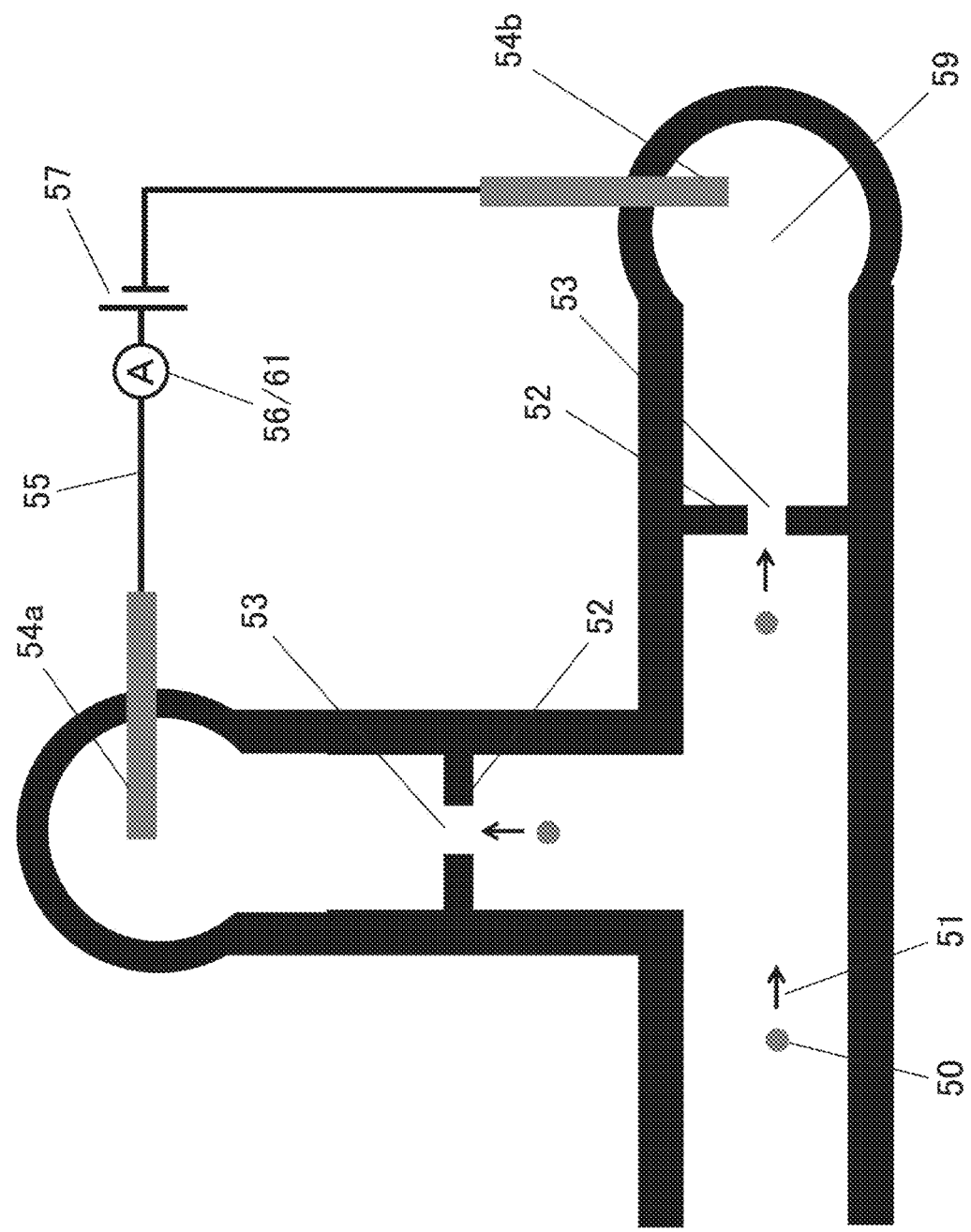
FIG. 15 is a diagram illustrating an embodiment of the present invention, illustrating a mode where a particle detection unit 103 includes two apertures, the downstream of each aperture is connected to an outlet, and each outlet also functions as an electrode insertion port 59.

The particle detection device of the present invention may include an expanding channel 17 in the particle separation channel 110 in accordance with the principle of AsPFF. In such a case, as illustrated in FIGS. 13 and 14, a drain channel 22 may be equipped on the expanding channel 17. Such a mode is more preferable in terms of improving particle separation ability. The drain channel 22 is connected to an outlet 23, from which fluid is discharged or recovered. The drain channel is preferably designed so that 50% or more fluid flows through the drain channel, more preferably, 70% or more fluid flows through the drain channel.

Figure 40A:
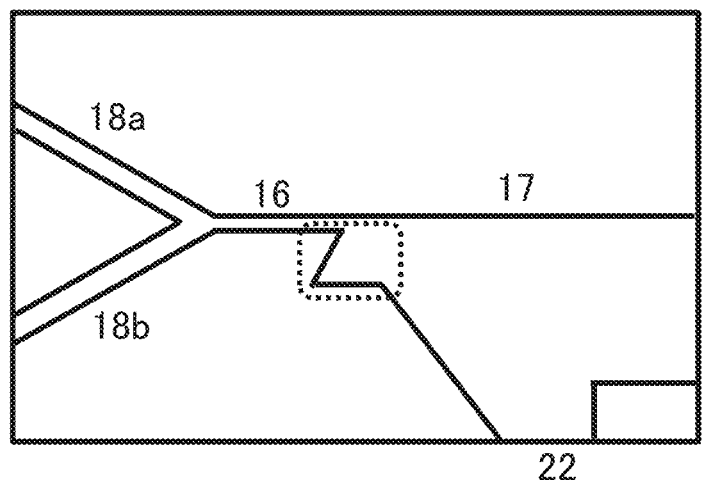
FIGS. 40(a) to 40(c) illustrate microchips 10 that have changes, which are deemed as not influencing separation ability, in the expanding channel of the microchip 10 of FIGS. 35(a) to 35(g) that includes an embodiment of a particle separation channel for implementing a continuous particle separation method according to the present invention.
Figure 40B:
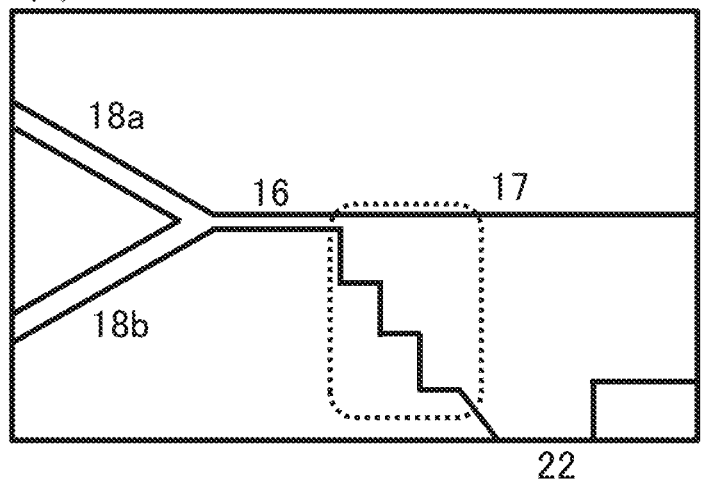
Figure 40C:
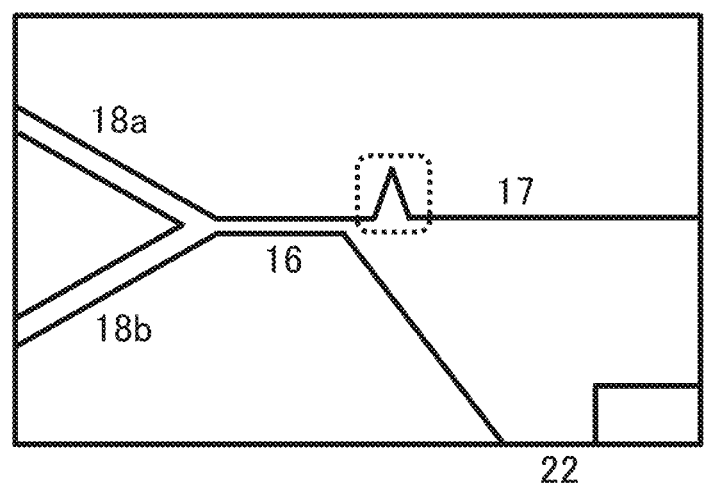

The structure where the pinched channel 16 and the expanding channel 17 are connected may be configured so that the channel width may expand in steps at the expansion start point as illustrated in FIGS. 13(b) and 13(c), or the channel width may gradually expand as illustrated in FIGS. 12(c) and 14(b). When the channel width gradually expands, the wall surface 17b of the expanding channel may expand as if it draws a straight line and form a slope 40, or may expand as if it draws a curve. When the channel width of the expanding channel 17 expands in steps or linearly, the expanding channel can be defined by angles 24a, 24b respectively between the wall surfaces 16a, 16b of the pinched channel and the wall surfaces 17a, 17b of the expanding channel 17 that are continuous from the wall surfaces of the pinched channel. For example, when the expansion is in steps, the angles 24a, 24b are 90°. When the wall surfaces of the expanding channel 17 gradually and linearly expand, the angles 24a, 24b are represented as 90° to 180°. The wall surfaces of the expanding channel may only be expanded relative to the channel width of the pinched channel. When the wall surface 17b expands in steps or the angle 24b is close to 90°, the angle 24a may exceed 180°, for example 210° or 225° (FIG. 41). In a mode, the angles 24a. 24b of the wall surfaces of the expanding area may independently take arbitrary angles between 90° and 180°, for example 120°, 135°, 150°, or 180°. However, even when the angle 24b of the expanding channel wall surface 17b with reference to the pinched channel wall surface 16b is 90° or less, as long as this structure is partial and the channel substantially gradually expands, most of the fluid gradually flows towards the outlet 23 without being much affected by influences of swirling flow or particle diffusion. Thus, such a structure may also be used (refer to FIGS. 40(a) to 40(c)). When the wall surface 17b of the expanding channel expands as if it draws a curve, the tangent plane at the expansion start point preferably coincides with the wall surface of the pinched channel in view of preventing a swirling flow.

In another mode of the present invention, in the particle separation device of the above-described microchip 10, etc., with regard to the wall surfaces of the expanding channel 17, the channel width does not expand toward the wall surface 16a side of the pinched channel 16 along which particles flow smoothly, while the channel width expands toward the wall surface 16b side of the pinched channel 16 along which particles do not flow smoothly. In view of the channel width not expanding toward the wall surface side along which particles flow smoothly, with regard to the angles 24a, 24b, the angle 24a of the wall surface side along which particles flow smoothly is 180° or more (2700 at maximum or less), preferably 180°, while the angle 24b of the other wall surface is an arbitrary angle in the range of 90° to 180°, for example 120°, 135°, 150°, or 180°. With such a configuration, the influence of lowered separation ability caused by generation of a swirling flow or particle diffusion at the exit part of the pinched channel and the entrance part of the expanding channel can be suppressed.

Even when the wall surfaces 17a and 17b of the expanding channel are not even in a perpendicular direction to the wall surfaces 17a and 17b, as illustrated by the dashed line in FIGS. 37(d), 40(a) to 40(c), as long as the unevenness does not significantly influence the flow of particles in fluid, the unevenness does not influence separation. Further, even the channel has an irregular shape as if as a defect in fabrication of the microchip 10, as long as the irregularity does not significantly influence the flow of particles in fluid, such a structure may not cause a problem and such a structure is not eliminated from the invention.

The wall surface 16a of the pinched channel 16, along which particles flow smoothly, may be referred to as the wall surface 16a of the sample liquid-side pinched channel, and the wall surface 16b of the pinched channel 16, along which particles do not flow smoothly, may be referred to as the wall surface 16b of the sheath liquid-side pinched channel. Likewise, the expanding channel wall surface on the side of the sample liquid-side pinched channel wall surface 16a may be referred to as the sample liquid-side expanding channel wall surface 17a, and the expanding channel wall surface on the side of the sheath liquid-side pinched channel wall surface 16b may be referred to as the sheath liquid-side expanding channel wall surface 17b.

Further, although FIG. 11 illustrates that the pinched channel wall surface and the expanding channel wall surface are both linear and connected, either or both may be curved. However, although the connection structure of the pinched channel wall surface and the expanding channel wall surface is sufficiently effective at both sample liquid side wall surface and sheath liquid side wall surface, as can be inferred from the PFF principle that aligns particles on the sample liquid side, particles can be more precisely separated when the wall surface along which the particles flow smoothly is linearly connected, and, by improving the structure of the sheath liquid-side wall surface as described above, separation precision of particles is further improved.

The drain channel 22 may be used for separating particles by AsPFF, and the width, height, length of the drain channel is preferably designed so that at least part of the fluid flowing in the expanding channel 17 flows in the drain channel 22. More preferably, the drain channel 22 is designed so that approximately the same amount of fluid as that flowing in the expanding channel 17 flows in the drain channel 22, most preferably, twice as much of or more fluid flows in the drain channel 22.

Further, although the drain channel 22 illustrated in FIG. 32 is designed in a perpendicular direction to the direction in which fluid flows in the pinched channel 16, the drain channel 22 may be designed in a parallel direction or at an arbitrary angle. When the drain channel is designed on the sheath liquid-side wall surface 17b which is in a perpendicular direction to the fluid flowing direction in the pinched channel 16, the drain channel may be arranged at the expansion start point of the expanding channel (FIG. 32(c)), or the drain channel may be arranged apart from the expansion start point (FIG. 35(c)). When the drain channel is designed in a parallel direction, particles flowing at high flow velocity in the pinched channel 16 abruptly changes its velocity to low flow velocity in the expanding area, thus, the particles receive force according to the masses of themselves due to the influence of inertial force. In such a case, the positions of the particles that are supposed to be aligned vary due to the inertial force, and the precision of separation is degraded. As such, the drain channel 22 is more preferably designed in a perpendicular direction to the fluid flowing direction in the pinched channel 16.

A plurality of particle recovery channels 102 that are connected to the downstream of the expanding channel 17 need to be at least two particle recovery channels 102, and the number may be arbitrarily increased according to the particle size range that is desired to be measured. Each particle recovery channel 102 may have at least one particle detection unit 103 or may have a plurality of particle detection units 103.

The expanding channel 17 may also have a function as the particle diffusion channel 110B, as described in the section of HDF, to further gain a function of promoting particle separation ability. In such a case, the length of the expanding channel needs to be a sufficient length so that particles can diffuse, provided that the length needs to be at least 1 µm or more. The channel length of the expanding channel 17 is determined as an arbitrary value according to the expanding channel width and the angles 24a, 24b.

Alternatively, a plurality of particle recovery channels 102 may be directly provided downstream of the pinched channel 16 without using the expanding channel.

When a channel utilizing the PFF principle is used for the particle separation channel 110, particles with larger diameter may exist on the pinched channel wall surface 16b side than the 16a side. Thus, for example, in the case of FIG. 12(a), it is preferable to set the cross section area of the aperture so that the particle detection unit 103a detects small particles and the particle detection unit 103b detects large particles. Likewise, in the case of FIG. 12(b), it is preferable to set the cross section area of the aperture so that the particle detection unit 103a detects small particles, the particle detection unit 103c detects middle-sized particles, and the particle detection unit 103b detects large particles. In short, it is preferable to set the cross section area of the aperture so that the particle detection unit 103 that is closer to the pinched channel wall surface 16a can detect smaller particles. For example, when particles in the range of 0.1 to 2.0 µm are to be detected, in the cases of FIGS. 12(b), 13(a), and 14(a), the cross section area of the aperture may be set to 0.4 µm$^2$ (a rectangle with 1 µm in width and 0.4 µm in height, or a circle with 0.36 µm in radius) at the particle detection unit 103a so as to detect particles of diameters in the range of 0.1 to 0.3 µm, the cross section area of the aperture may be set to 2 µm$^2$ (a rectangle with 2 µm in width and 1 µm in height, or a circle with 0.8 µm in radius) at the particle detection unit 103c so as to detect particles of diameters in the range of 0.2 to 0.8 µm, and the cross section area of the aperture may be set to 14 µm$^2$ (a rectangle with 3.5 µm in width and 4 µm in height, or a circle with 2.1 µm in radius) at the particle detection unit 103b so as to detect particles of diameters in the range of 0.4 to 2.0 µm.

Moreover, when the particle separation channel 110 uses a channel utilizing the PFF principle, the flow rate set by the liquid delivery unit is preferably between 0.1 µL/hour and 1 mL/hour, and the flow rate of fluid 100N not including particles is preferably set twice as much as that of fluid 100P including particles. The preferable number of times more flow rate of the fluid 100N not including particles compared with the flow rate of the fluid 100P including particles, depends on the channel width of the pinched channel 16 and the diameter of particles desired to be separated. For example, when the diameter of particles desired to be separated is a quarter of the channel width of the pinched channel 16, the flow rate of the fluid 100N not including particles is preferably not less than three times as much as the flow rate of the fluid 100P including particles. When the diameter of particles desired to be separated is a tenth of the channel width of the pinched channel 16, the flow rate of the fluid 100N not including particles is preferably not less than nine times as much as the flow rate of the fluid 100P including particles. In short, when the channel width of the pinched channel 16 is N times as much as the diameter of particles desired to be separated in accordance with the PFF principle, the flow rate of the fluid 100N not including particles is preferably N−1 times as much as the fluid 100P including particles. With such a flow rate ratio, the particles desired to be separated flow smoothly along the wall surface 16a of the pinched channel, enabling particle separation based on the PFF principle.

Further, when a channel utilizing the PFF principle is used in the particle separation channel 110, not all particles included in fluid 100P including particles need to flow smoothly along the pinched channel wall surface 16a, and only particles that have relatively large particle sizes may flow smoothly along the pinched channel wall surface 16a. For example, in the case of FIGS. 12(b), 13(a), 14(a), when particles, of which particle size is not more than the maximum particle size detectable by the particle detection unit 103a for detecting small particles, flow smoothly along the pinched channel wall surface 16a, even if the particles, of which particle size is not more than the maximum particle size, do not align along the pinched channel wall surface 16a, the particle detection unit 103a can generate the distribution based on the ESZ principle. In other words, even if there are particles that could not be separated by PFF, the particle detection unit can generate a particle size distribution of the particles, which provides a significant effect of ESZ compensating the separation ability of PFF.

Even under a flow rate condition where only particles of which particle sizes are not less than the maximum particle size detectable by the particle detection unit 103a for detecting small particles can flow smoothly into the pinched channel wall surface 16a, by setting a channel resistance that prevents the particles of particle sizes that may occlude the aperture of the particle detection unit 103a from flowing in the channel, based on the above-described HDF theory, measurement of a sample having a wide range of particle size distribution, which is the objective of present invention, becomes possible. In other words, middle-size particles and large-size particles are separated by PFF, small size particles are separated by HDF, and a precise particle size distribution is generated by ESZ, whereby a significant effect of enabling measurement of a sample with a wide range particle size distribution can be obtained. In such a case, the expanding channel 17 in PFF also plays a roll of the above-described particle diffusion channel 110B, thus, a significant effect of promoting separation of small size particles with large diffusion distances per unit time can be obtained. Further, in this mode, since small-size particles also flow into the particle detection unit 103c, and into the particle detection unit 102b in some cases, the small-size particles flowing into the particle detection unit 103a are part of the fluid 100P including the particle sample. When the length of the expanding channel 17 that plays a roll of the particle diffusion channel 110B is a sufficient distance for diffusing small-size particles, the inflow rate is proportional to the flow rate calculated from the particle recovery channel 102a and the channel structure downstream of the particle recovery channel 102a, thus, the inflow rate can be quantified from the calculated value. "A sufficient distance for diffusing small-size particles" with regard to the length of the expanding channel 17 is preferably 1 µm or more when the sum of the flow rate of the fluid 100N not including particles and the flow rate of the fluid 100P including particles is within the range of 0.1 µL/hour to 1 mL/hour, more preferably, 100 µm or more.

Figure 39A:
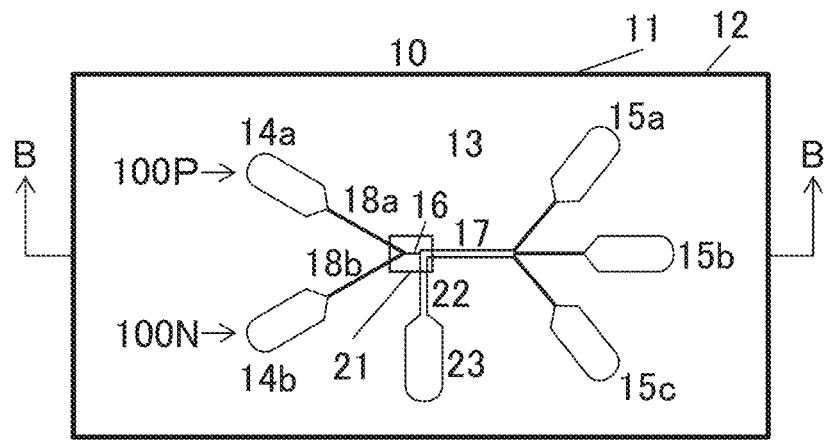
FIG. 39(a) is a top view of the microchip 10 and a detail drawing view from A of FIG. 39(b).
Figure 39B:
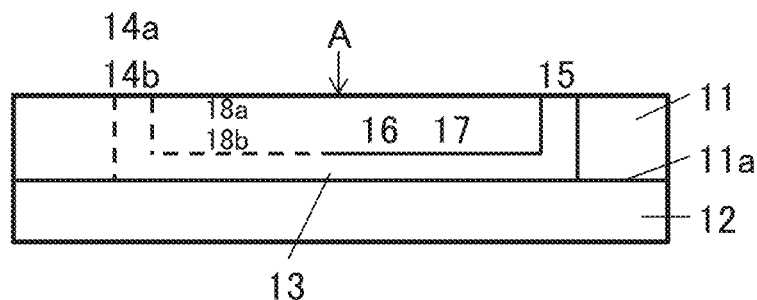
FIG. 39(b) is a cross section view along the line B-B in FIG. 39(a)
Figure 39B:
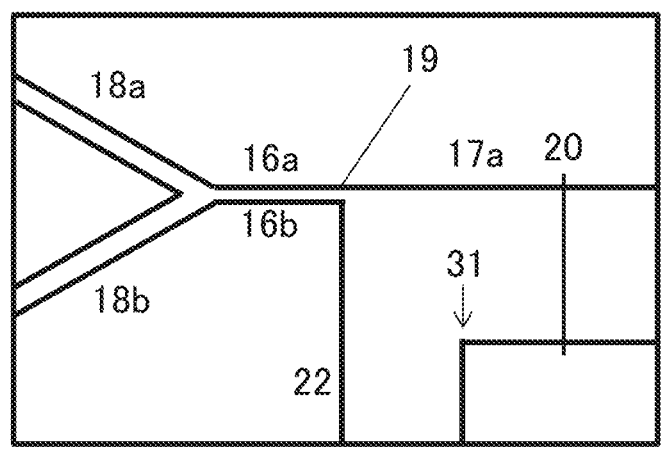

In the case of a continuous particle separation device having a plurality of outlets and a method thereof, arbitrary flow rate distribution ratios can be achieved by appropriately designing the channels by considering the channel network as a whole as analogy of a resistance circuit, thus, designing is preferably performed based on such a perspective. For example, based on the above-described AsPFF principle, as illustrated in FIGS. 32 and 33, a drain channel 22 may be designed on part of the expanding channel 17 and an outlet 23 for drainage may be provided so that most of the fluid flows. In such a case, a target substance may be recovered from the outlet 15, or from an arbitrary outlet among a plurality of outlets 15a, 15b, 15c provided as illustrated in FIG. 39(a). Particularly, to separate and recover particles of a specific size from a sample including substances of multiple sizes, the number of the outlets 15 is set to an arbitrary number according to the purpose, however, the number is preferably set to at least two or more in view of recovering the particles. On the other hand, for example, when separated particles only need to be detected without being recovered after separation, the particles may be detected at the detection line 20 using a fluorescent or bright field image detection system, etc., and, in such a case, there may be only one outlet.

FIG. 32 illustrate a microchip 10 including an embodiment of a continuous classification method according to the present invention. FIG. 32(a) is a detail drawing view from A of FIG. 32(b), and FIG. 32(b) is a cross section view along the line B-B in FIG. 32(a). The channel 13 of the microchip 10 in FIG. 32 has a rectangular cross section shape at any point, and the channel depth is uniform. In this way, the cross section shape is preferably a rectangle to separate particles according to the sizes in the cross section, as well as, to facilitate fabrication of the channel structure, however, the cross section may be a circle, an oval, or a polygon, or may have a partly different shape than a rectangle. The wall surface of the pinched channel along which particles flow smoothly is preferably planar in view of allowing the particles to flow smoothly along the wall surface. Likewise, the depth of the channel structure is preferably constant to facilitate fabrication thereof, however, the channel structure may have partly different depth.

EXAMPLES

Production Example: Production of the Particle Detection Device

The microchip 10 including an embodiment of the particle detection device according to the present invention, was fabricated using general photolithography and soft lithography. A specific procedure will be described as follows:

After dropping photoresist SU-8 3005 (MicroChem Corp.) on a 4-inch bare silicon wafer (Philtech Inc.), a photoresist thin film was formed using a spin coater (Mikasa Co., Ltd.). At this time, according to the targeted film thickness, Cyclopentanone (Tokyo Ohka Kogyo Co., Ltd.) as diluent was added to the SU-8 3005. Subsequently, using a mask aligner (USHIO INC.) and a chrome mask forming an arbitrary pattern, a channel pattern was formed on the photoresist film, and the channel pattern was developed using SU-8 developer (MicroChem Corp.), whereby a mold for a desired channel was fabricated.

Next, uncured LSR 7070 FC (Momentive Performance Materials Inc.) was poured into the fabricated mold, and heated at 80° C. for two hours to fabricate polydimethylsiloxane (PDMS) on which the shape of the channel was transferred. After carefully peeling the cured PDMS from the mold and forming it into an arbitrary size with a cutter, the inlets and outlets of the channel were formed using a puncher. After surface treatment of the peeled PDMS and slide glass (Matsunami Glass Ind., Ltd.) with an oxygen plasma generator (Meiwafosis Co., Ltd.), the PDMS and the slide glass were pasted together, whereby the microchip 10 was fabricated.

Electrical Detection Example: Electrical Detection of Particles by ESZ

The fabricated microchip 10 was placed on a substrate, and electrodes were connected to a plurality of particle detection units 103 in the microchip 10. The electrodes were made of a pair of platinum wires, one electrode was connected to a programmable current amplifier CA5350 (NF Corporation) through a conductor, which was further connected a PC through an A/D converter, where transmitted digital signals were analyzed by LabView. Further, the other electrode connected to the particle detection units 103 was connected to a 9-volt battery through a conductor.

Each inlet was connected to a pressure pump P-Pump Basic (The Dolomite Centre Ltd.) through a Teflon tube and liquid was transferred at a constant flow rate.

Sample Preparation Example: Using Standard Particles

Standard particles were used as particles included in fluid 100P including particles to be separated: polystyrene standard particles 3100A (Thermo Fisher Scientific Inc.) were used as 0.1-μm particles; polystyrene standard particles 3200A (Thermo Fisher Scientific Inc.) were used as 0.2-μm particles; polystyrene standard particles 3500A (Thermo Fisher Scientific Inc.) were used as 0.5-μm particles; polystyrene standard particles 4009A (Thermo Fisher Scientific Inc.) were used as 1.0-μm particles; and polystyrene standard particles 4202A (Thermo Fisher Scientific Inc.) were used as 2.0-μm particles. As fluid 100P including particles to be separated, 1×PBS solution (phosphate buffer) including 0.05% (v/v) Tween 20 was used. The 1×PBS solution including 0.05% (v/v) Tween 20 was used after removing foreign objects with a syringe filter with 0.1 μm in pore size (made by Merck Millipore Limited) before the test.

Sample Preparation Example: Using Antibody Aggregate

In-house mouse monoclonal antibody was mixed in 1×PBS solution including 0.05% (v/v) Tween 20 at 0.66 mg/mL, and an antibody aggregate was artificially made by heating the solution for 15 minutes at 90° C. in a dryer.

Particle Separation and Detection Method

Figure 16A:
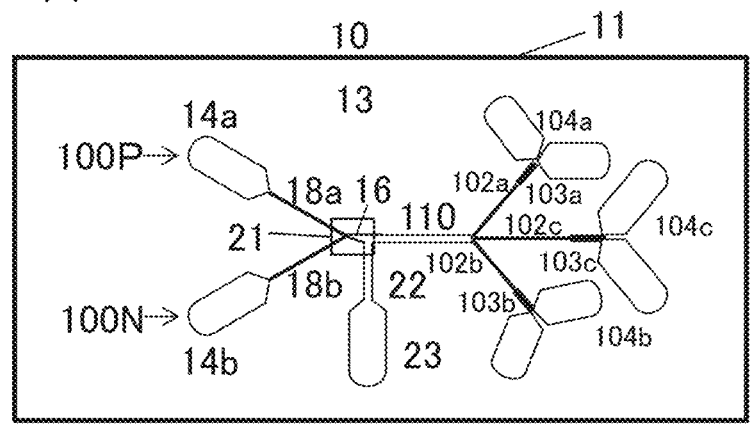
FIG. 16(a) illustrates a schematic view of the microchip 10 used in Example 1.
Figure 16A:
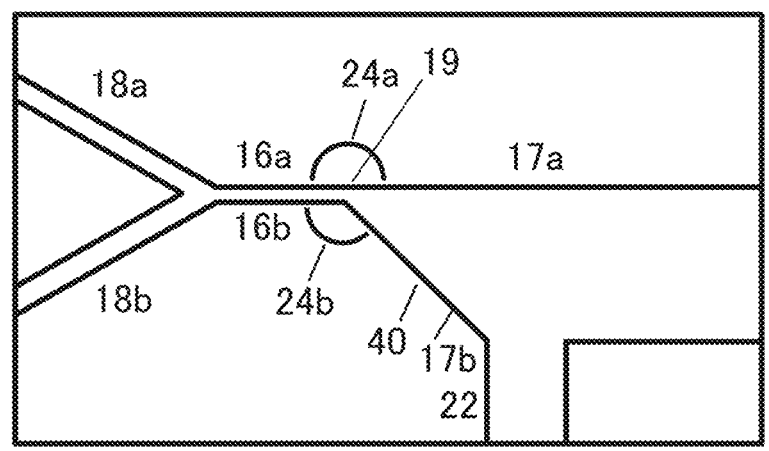

Example 1: Detection of a Sample Including a Mixture of 0.1, 0.2, 0.5, 1.0, 2.0-μm Standard Particles after Separation of Particles by AsPFF, by a Particle Detection Device that Detects Particles Using Three Particle Recovery Channels and Two Particle Detection Units Provided for Each Particle Recovery Channel The microchip 10 illustrated in FIG. 16 was fabricated as the particle detection channel in accordance with the above-described Production Example, and a sample was prepared in accordance with the above-described Sample Preparation Example. The 0.1, 0.2, 0.5, 1.0, 2.0-μm standard particles were prepared in 1×PBS solution including 0.05% (v/v) Tween 20 respectively at the concentration of 5 μg/mL. The concentration of the polystyrene particles as a whole included in the sample were, therefore, prepared to be 25 μg/mL.

For each channel of the microchip 10, the height of the channel 13 was 4.5 μm except for the particle detection unit 103a and particle detection unit 103c. Inlets 14a, 14b and outlets 104a. 104a, 104b, 104b', 104c, 104c', 23 (the diameter of each hole was 2 mm) that penetrate through the upper surface of the substrate 11 were provided at the ends of the channel 13. In the channel 13, a branch channel 18a (20 μm in width, 1.5 mm in length), a branch channel 18b (40 μm in width, 500 μm in length), a pinched channel 16 (6 μm in width, 20 μm in length), an expanding channel 17 (the maximum angle 135°, 600 μm in channel width at the maximum expansion, 0.5 mm in length), a drain channel 22 (500 μm in width, 1.7 mm in length), a particle recovery channel 102a (75 μm in width, 4 mm in length), a particle recovery channel 102c (140 μm in width, 7.5 mm in length), and a particle recovery channel 102b (512 μm in width, 3.75 mm in length) were defined. In addition, two apertures of the particle detection unit 102a were both defined as 1 μm in width, 0.4 μm in height, and 10 μm in length; two apertures of the particle detection unit 102c were both defined as 2 μm in width, 0.8 μm in height, and 10 μm in length; and two apertures of the particle detection unit 102b were both defined as 3.5 μm in width, 4.5 μm in height, and 20 μm in length. The shape of each particle detection unit was the same as the shape in FIG. 15, and the k value calculated by equation (1) was defined as 2.6, based on the ratio of the resistance of the aperture to the resistance of the channel between the aperture and the outlet in which the electrode was inserted.

Figure 17:
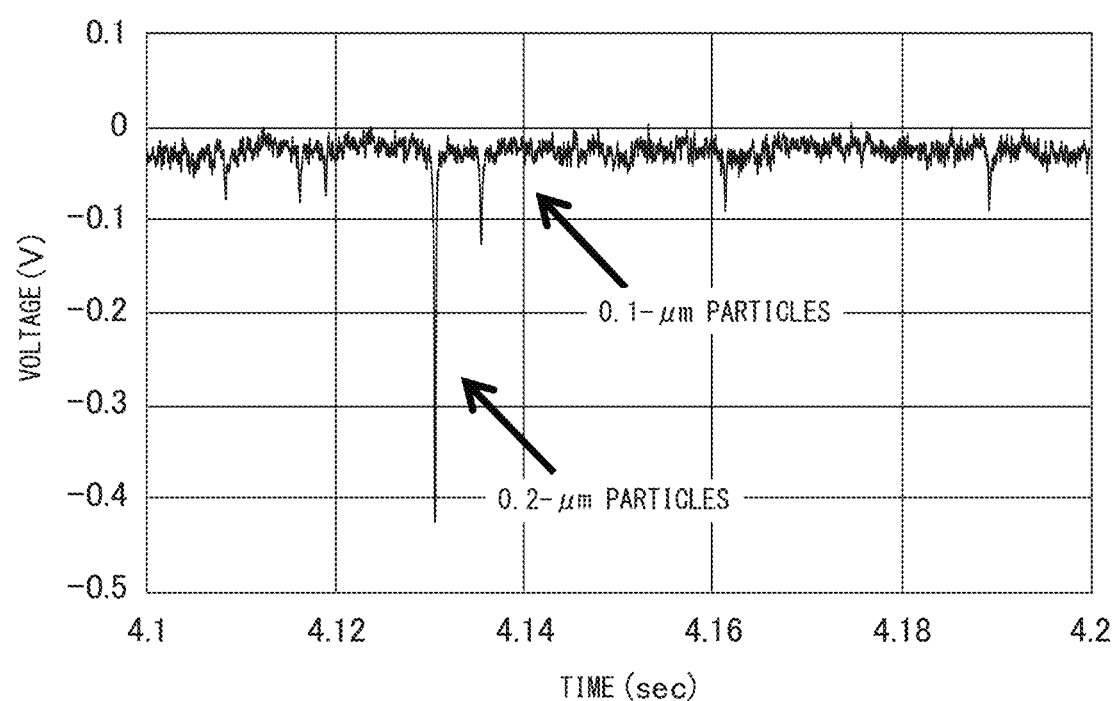
FIG. 17 is a diagram illustrating an example of electric signals of 0.1-μm and 0.2-μm particles, which were detected by the particle detection unit 102a in Example 1.
Figure 18:
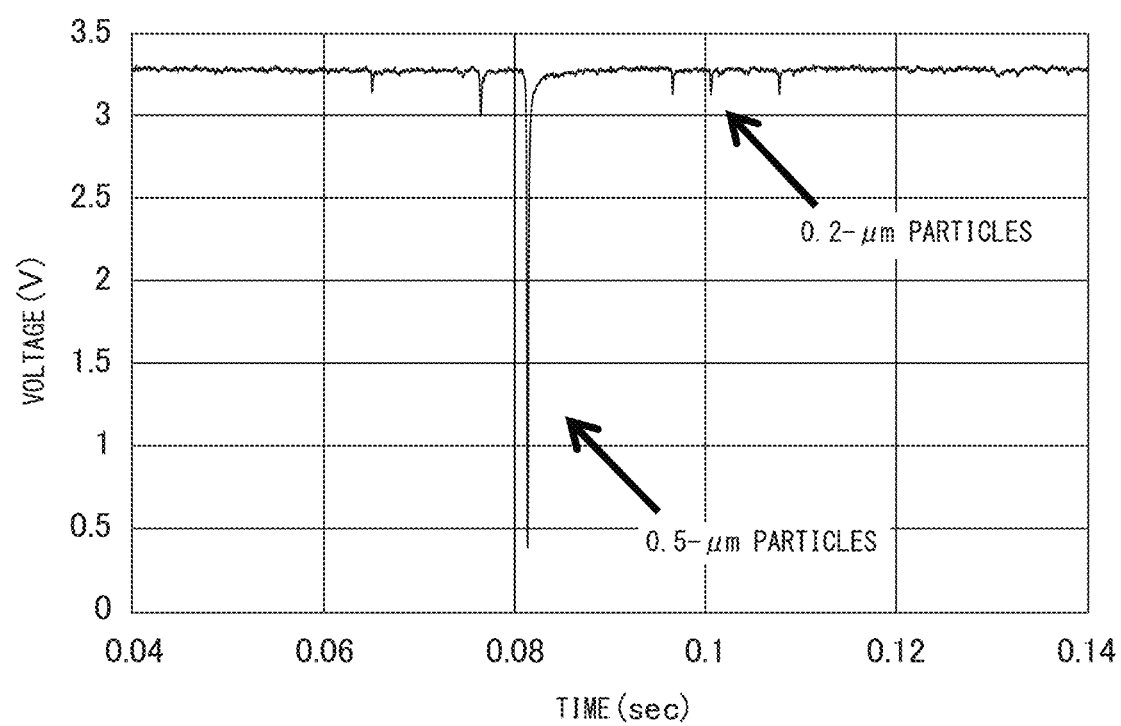
FIG. 18 is a diagram illustrating an example of electric signals of 0.2-μm and 0.5-μm particles, which were detected by the particle detection unit 102c in Example 1.
Figure 19A:
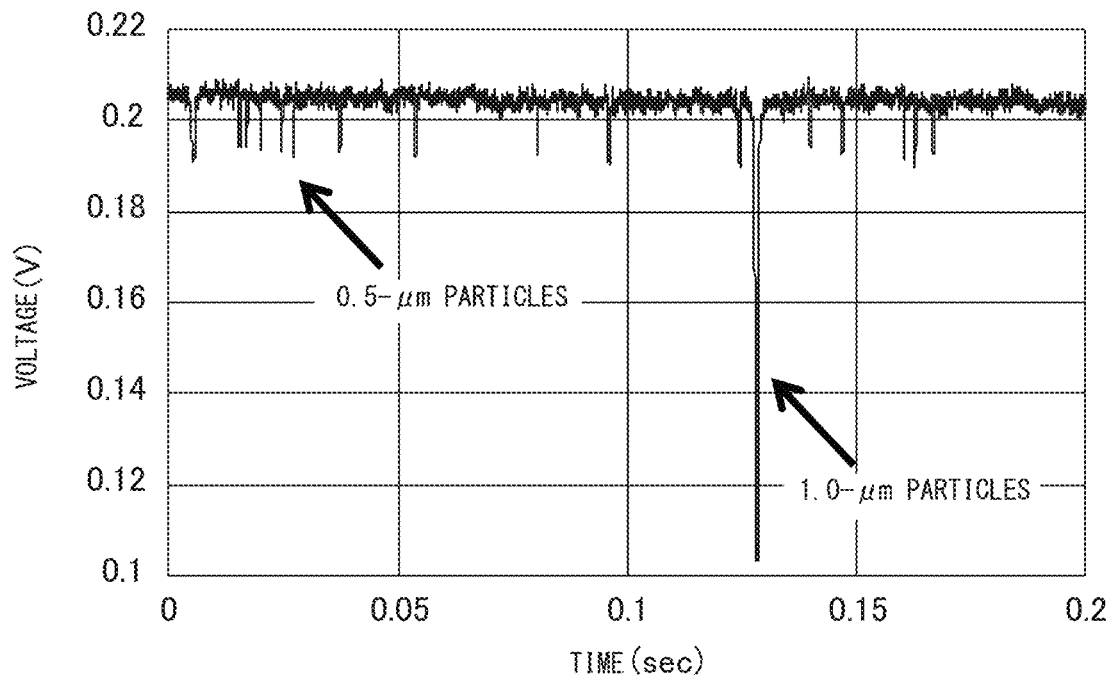
FIGS. 19(a) and 19(b) are diagrams illustrating an example of electric signals of 0.5-μm, 1.0-μm and 2.0-μm particles, which were detected by the particle detection unit 102b in Example 1.
Figure 19B:
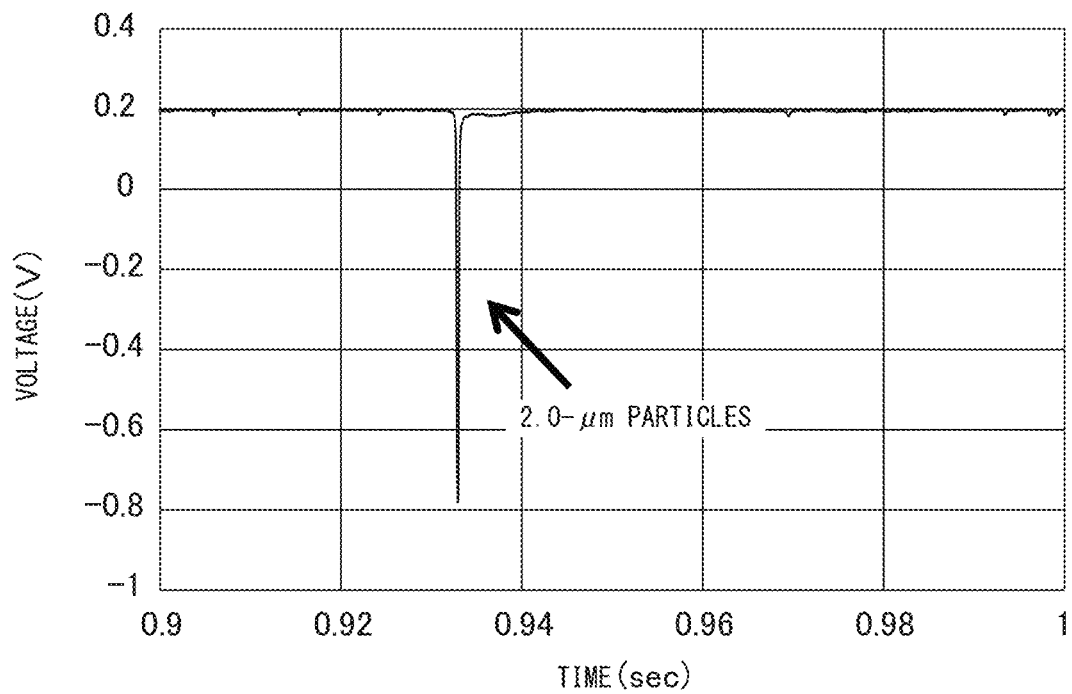

Using the above-described microchip 10, the prepared particle suspension was transferred into the inlet 14a at the flow rate of 2.5 μL/hour, and 1×PBS including 0.05% (v/v) Tween 20 was transferred into the inlet 14b at the flow rate of 10 μL/hour. Next, based on the above-described electrical detection example, particles flowed into each of the three particle recovery channels 102 were detected for 1 minute. FIG. 17 illustrates a part of the measurement of changes in the current values performed by the particle detection unit 103a of the particle recovery channel 102a; FIG. 18 illustrates a part of the measurement of changes in the current values performed by the particle detection unit 103c of the particle recovery channel 102c; FIG. 19 illustrates a part of the measurement of changes in the current values performed by the particle detection unit 103b of the particle recovery channel 102b. In FIG. 17, the particle detection unit 103a detected changes in the current values of 0.1 and 0.2-µm standard particles. In FIG. 18, the particle detection unit 103c detected changes in the current values of 0.2 and 0.5-µm standard particles. In FIG. 19, the particle detection unit 103b detected changes in the current values of 1.0 and 2.0-µm standard particles.

Figure 20:
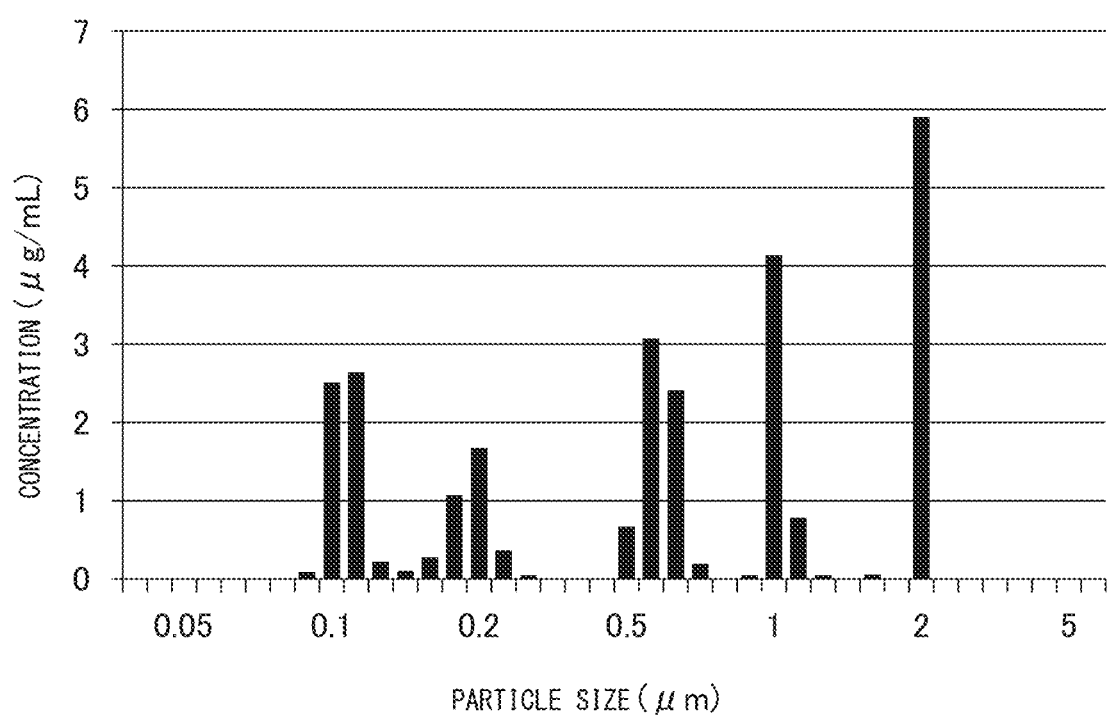
FIG. 20 illustrates a particle size distribution of a mixed particle sample which is created from the measurement result of Example 1.

Moreover, the measurement results were summed in a histogram as illustrated in FIG. 20, where separated peaks were observed even with the mixed particles. Further, the concentration of 0.1-µm standard particles obtained from the measurement results was 5.41 µg/mL, the concentration of 0.2-µm standard particles was 3.52 µg/mL, the concentration of 0.5-µm standard particles was 6.29 µg/mL, the concentration of 1.0-µm standard particles was 5.02 sg/mL, and the concentration of 2.0-µm standard particles was 5.92 µg/mL. Further, the average particle size of 0.1-µm standard particles obtained from the measurement results was 0.107 µm, the average particle size of 0.2-µm standard particles was 0.192 µm, the average particle size of the 0.5-µm standard particles was 0.52 µm, the average particle size of 1.0-µm standard particles was 0.98 µm, and the average particle size of 2.0-µm standard particles was 2.05 µm.

Accordingly, the inventors have confirmed that accurate particle sizes can be measured with a sample with a wide distribution range of 0.1 to 2 µm using a plurality of apertures with different cross section areas, i.e., using particle detection units 103 that have a plurality of detectable particle size ranges.

Comparative Example 1: Detection of a Sample Including a Mixture of 0.1, 0.2, 0.5, 1.0, 2.0-µm Standard Particles Using a Particle Detection Device of a Laser Diffraction Scattering Method (LD)

A mixed particle sample was prepared in the same way as Example 1 and measured by AggregatesSizer (Shimadzu Corporation).

Figure 21:
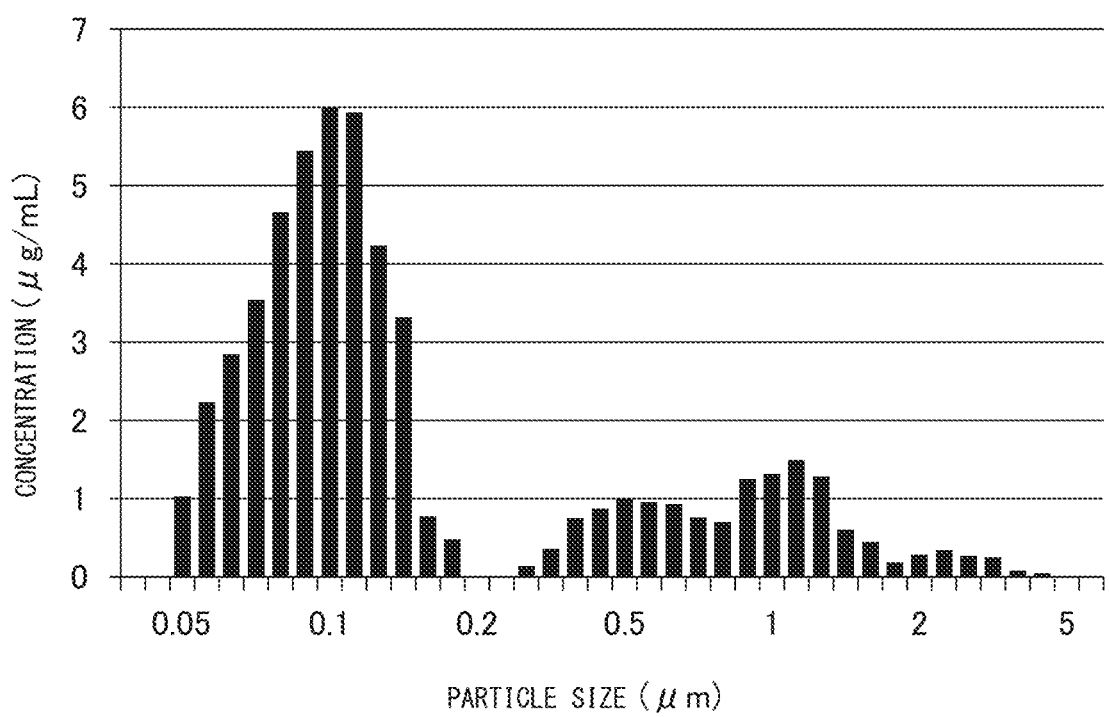
FIG. 21 illustrates a particle size distribution of a mixed particle sample which is created from the measurement result of Comparative Example 1.

As illustrated in the measurement result in FIG. 21, peaks at 0.2 and 2 µm were dissipated, and a peak at 0.1 µm increased, thus, it was found that accurate measurement with the mixed particle sample was difficult.

Example 2: Detection of an Antibody Aggregate Sample after Separation of Particles by AsPFF, by a Particle Detection Device that Detects Particles Using Three Particle Recovery Channels and Two Particle Detection Units Provided for Each Particle Recovery Channel The antibody aggregates that were prepared in accordance with the Sample Preparation Example were similarly measured using the same microchip 10 as Example 1.

Figure 22:
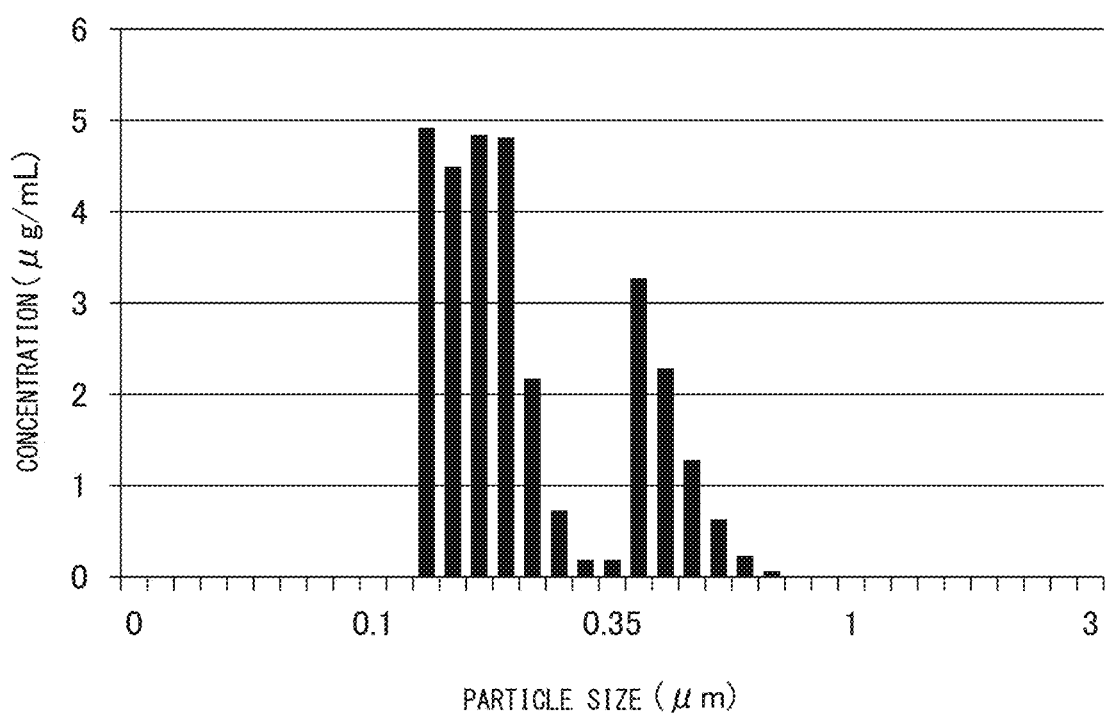
FIG. 22 illustrates a particle size distribution of an antibody aggregate sample which is created from the measurement result of Example 2.

As illustrated in the measurement result in FIG. 22, it was found that measurement can be performed with antibody aggregates.

Figure 23A:
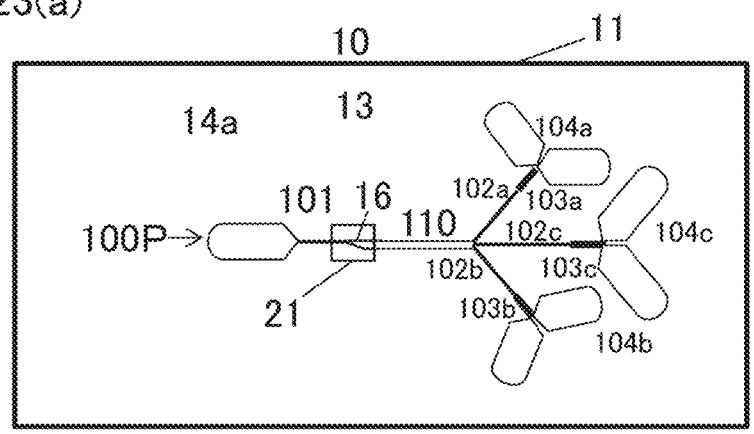
FIG. 23(a) is a diagram illustrating an embodiment of the present invention, illustrating a mode where a particle separation channel 110 has three particle recovery channels and two particle detection units for each particle recovery channel after particle separation by HDF.
Figure 23A:
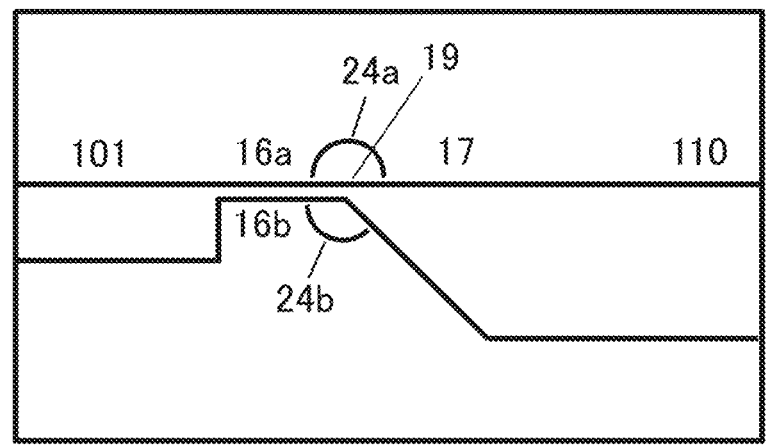

Example 3: Detection of a Sample Including a Mixture of 0.1, 0.5, 2.0-µm Standard Particles after Separation of Particles by HDF, by a Particle Detection Device that Detects Particles Using Three Particle Recovery Channels and Two Particle Detection Units Provided for Each Particle Recovery Channel The microchip illustrated in FIG. 23 was fabricated as a particle detection channel in accordance with the above-described Production Example, and a sample was prepared in accordance with the above-described Sample Preparation Example. The 0.1, 0.5, 2.0-µm standard particles were prepared in 1×PBS solution including 0.05% (v/v) Tween 20 respectively at the concentration of 5 µg/mL. The concentration of the polystyrene particles as a whole included in the sample were, therefore, prepared to be 15 µg/mL.

For each channel of the microchip 10, the height of the channel 13 was all 4.0 µm except for the particle detection unit 103a and particle detection unit 103c. An inlet 14a and outlets 104a, 104a', 104b, 104b', 104c, 104c', 23 (the diameter of each hole was 2 mm) that penetrate through the upper surface of the substrate 11 were provided at the ends of the channel 13. In the channel 13, a particle introduction channel 101 (20 µm in width, 1.5 mm in length), a pinched channel 16 (6 µm in width, 20 µm in length), an expanding channel 17 (the maximum angle 135°, 800 µm in channel width at the maximum expansion, 0.5 mm in length), a particle recovery channel 102a (75 µm in width, 4 mm in length), a particle recovery channel 102c (140 µm in width, 7.5 mm in length), a particle recovery channel 102b (512 µm in width, 3.75 mm in length) were defined. In addition, two apertures of the particle detection unit 102a were both defined as 1 µm in width, 0.4 µm in height, and 5 µm in length; two apertures of the particle detection unit 102c were both defined as 3 µm in width, 1.2 µm in height, and 5 µm in length; and two apertures of the particle detection unit 102b were both defined as 3.5 µm in width, 4.0 µm in height, and 20 µm in length. The shape of each particle detection unit was the same as the shape in FIG. 15, and the k value calculated by equation (1) was defined as 3.0 based on the ratio of the resistance of the aperture to the resistance of the channel between the aperture and the outlet in which the electrode was inserted.

Using the above-described microchip 10, the prepared particle suspension was transferred into the inlet 14a at the flow rate of 2.5 µL/hour, and 1×PBS including 0.05% (v/v) Tween 20 was transferred into the inlet 14b at the flow rate of 4 µL/hour. Next, based on the above-described electrical detection example, particles flowed into each of the three particle recovery channels 102 were detected for 1 minute. As the result of the measurement of changes in the current value by the particle detection unit 103a of the particle recovery channel 102a, 0.1-µm standard particles were observed in the same way as FIG. 17; as result of the measurement of changes in current value by the particle detection unit 103c of the particle recovery channel 102c, 0.5-µm standard particles were observed in the same way as FIG. 18; and, as the result of the measurement of changes in current value by the particle detection unit 103b of the particle recovery channel 102b, 2.0-µm standard particles were observed in the same way as FIGS. 19(a) and 19(b).

Figure 24:
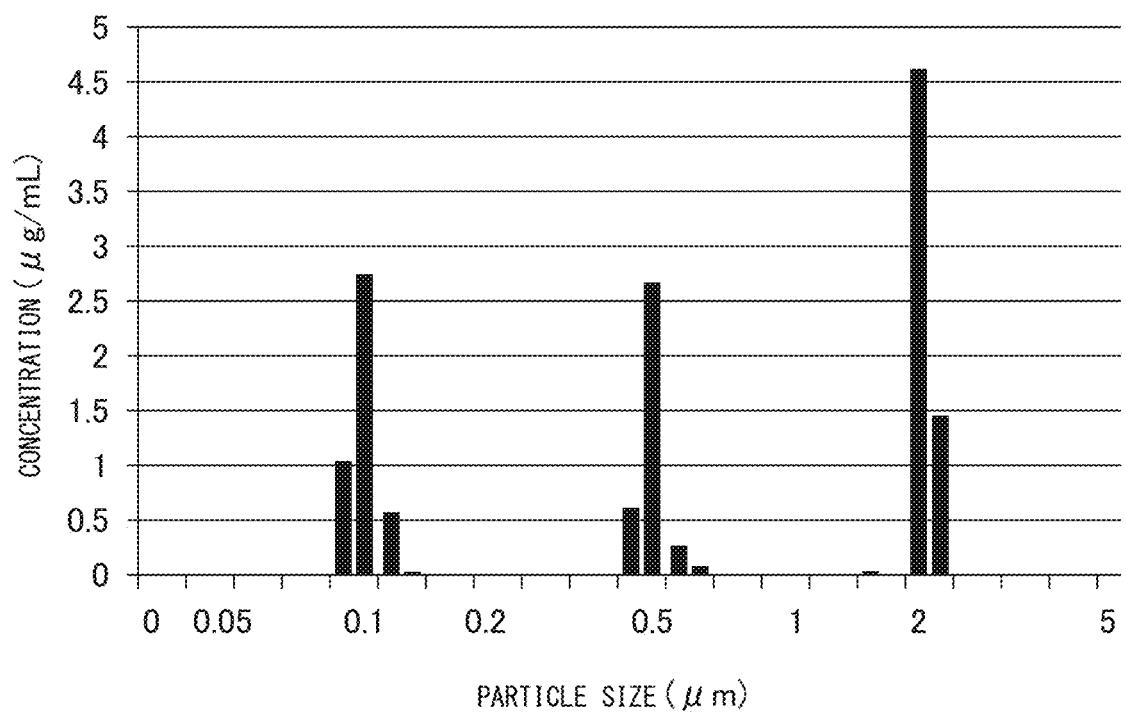
FIG. 24 illustrates a particle size distribution of a mixed particle sample which is created from the measurement result of Example 3.

Moreover, the measurement results were summed in a histogram as illustrated in FIG. 24, where separated peaks were observed even with the mixed particles. Further, the concentration of 0.1-µm standard particles obtained from the measurement results was 4.41 µg/mL, the concentration of 0.5-μm standard particles was 3.66 μg/mL, the concentration of 2.0-μm standard particles was 6.08 sg/mL. Further, the average particle size of 0.1-μm standard particles obtained from the measurement results was 0.112 μm, the average particle size of 0.5-μm standard particles was 0.470 μm, and the average particle size of the 2.0-μm standard particles was 2.09 μm.

Accordingly, we have confirmed that accurate particle sizes can be measured with a sample with a wide distribution range of 0.1 to 2 μm using a plurality of apertures with different cross section areas, i.e., using particle detection units 103 that have a plurality of detectable particle size ranges.

Detection of Articles

Example 4: Detection of a Sample Including a Mixture of 0.5, 1.0, 2.0-μm Standard Particles by a Particle Detection Unit The particle detection units 103a, 103b of the microchip 10 illustrated in FIG. 1 were configured as in FIG. 25 and fabricated in accordance with the above-described Production Example. A sample was prepared in accordance with the above-described Sample Preparation Example. The 0.5, 1.0, 2.0-μm standard particles were prepared in 1×PBS solution including 0.05% (v/v) Tween 20 respectively at the concentration of 5 μg/mL. The concentration of the polystyrene particles as a whole included in the sample were, therefore, prepared to be 15 μg/mL. For each channel of the microchip 10, the height of the channel was defined as all 4.5 μm. An inlet 14a and fluid discharge ports 104a, 104b (the diameter of each hole was 2 mm) that penetrate through the upper surface of the substrate 11 were provided at the ends of the channel. In addition, two apertures of the particle detection unit 102 were both defined as 3.5 μm in width and 20 μm in length. The k value calculated by equation (1) was defined as 2.6, based on the ratio of the resistance of the aperture to the resistance of the channel between the aperture and the outlet in which the electrode was inserted.

Figure 28A:
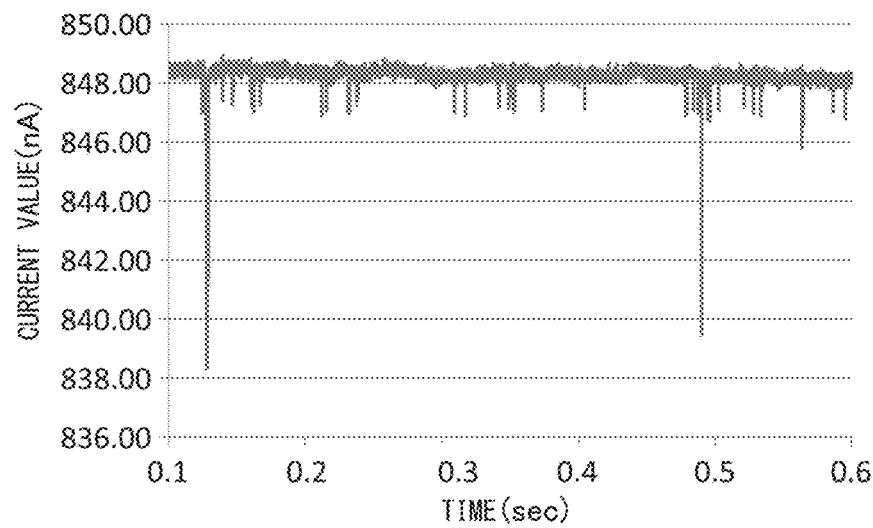
FIG. 28 illustrates a part of measurement of a change in a current value performed by the particle detection unit 103 in Example 4.
Figure 28B:
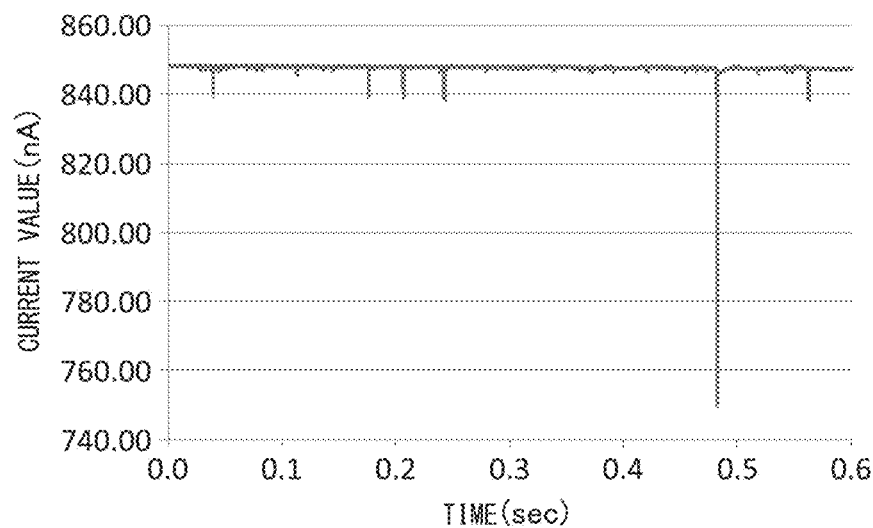

Instead of a pressure pump P-Pump Basic (The Dolomite Centre Ltd.), a syringe pump (KD Scientific Inc) was connected to the inlet 14a, and electrical detection was performed in the same way as described above except that fluid transferring was performed at a constant flow rate. At this time, the prepared particle suspension was transferred at the flow rate of 2.5 μL/hour. Next, based on the above-described electrical detection example, particles flowed into each aperture were detected for 1 minute. FIG. 28 illustrate a part of the measurement of changes in the current values performed by the particle detection unit 103. As in FIG. 28, changes in the current values of 0.5, 1.0, 2.0-μm standard particles were observed.

Figure 29:
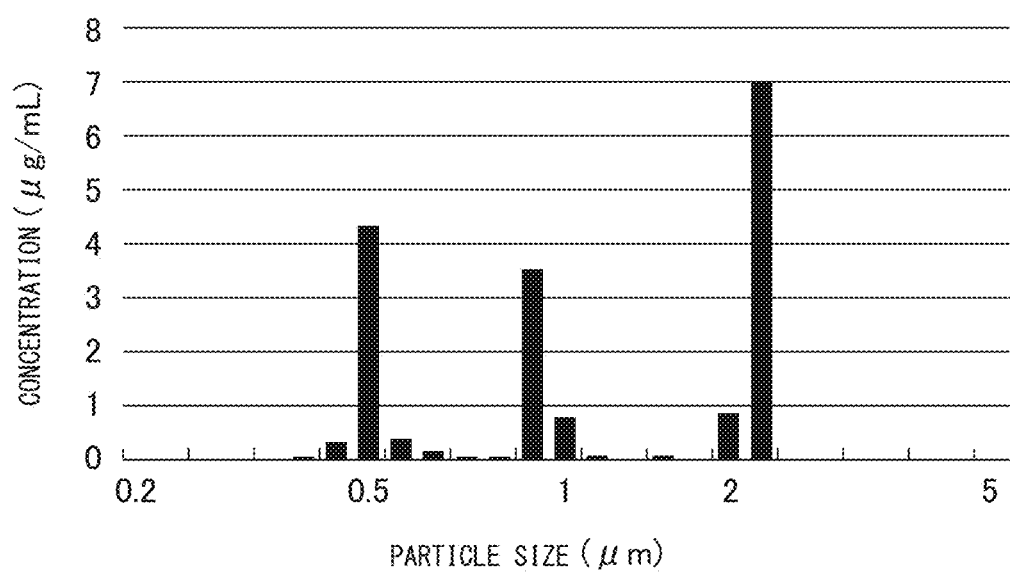
FIG. 29 is a histogram summarizing the measurement results of Example 4.

Moreover, the measurement results were summed in a histogram as illustrated in FIG. 29, where separated peaks were observed even with the mixed particles. Further, the concentration of 0.5-μm standard particles obtained from the measurement results was 5.24 sg/mL, the concentration of 1.0-μm standard particles was 4.38 μg/mL, and the concentration of 2.0-μm standard particles was 7.86 μg/mL. Further, the average particle size of 0.5-μm standard particles obtained from the measurement results was 0.511 μm, the average particle size of 1.0-μm standard particles was 0.991 μm, and the average particle size of 2.0-μm standard particles was 2.145 μm.

Accordingly, we have confirmed that accurate particle sizes can be measured using the present invention without patterning electrodes in the channel.

Influence of Channel Hardness in PFF Particle Separation

Example 5: Durometer Hardness 70

An embodiment of a continuous particle classification method according to the present invention will be described in detail with reference to the drawings of FIG. 30.

The microchip 10 was fabricated using LSR 7070 (Momentive Performance Materials Inc., hardness 70). The microchip 10 has a flat plate structure formed by two flat plate substrates 11 and 12.

A channel 13 was formed on the bottom side 11a of the substrate 11, and the whole length of the entrance side ports 14a, 14b, outlet 15 (the diameter of each hole was 2 mm) and channel 13, i.e., the length from the one end where the inlets 14a, 14b exist to the other end where the outlet 15 exists, was 19 mm.

The channels of branch channels 18a, 18b (100 μm in width, 800 μm in length), pinched channel 16 (20 μm in width, 50 μm in length), expanding channel 17 (500 μm in width, 10 mm in length) were fabricated and the depth of the channels 18 to 17 were all 20 μm.

For the fluid 100P including particles, fluorescent polystyrene-divinyl benzene particles with 2 μm in diameter (Fluoro-Max; Thermo Fisher Scientific Inc.) were diluted in 0.5 wt % Tween 80 solution at 1 μg/mL. For the fluid 100N not including particles, 0.5 wt % Tween 80 solution was used.

The fluid 100P was transferred from the inlet 14a and the fluid 100N was transferred from the inlet 14b respectively at the flow rates of 20 μL/h and 1000 μL/h by adjusting the flow rates by a syringe pump. The trajectory of fluorescent particles that passed through the detection line 20 was taken as a movie by a fluorescence microscope, and the separation ability was evaluated by measuring passing coordinates of a total of 100 particles from the bottom side wall surface of FIG. 30(c). The detection line 20 as the measurement position was at 150 μm from the right end of the pinched channel 16 (expansion start point).

Figure 31:
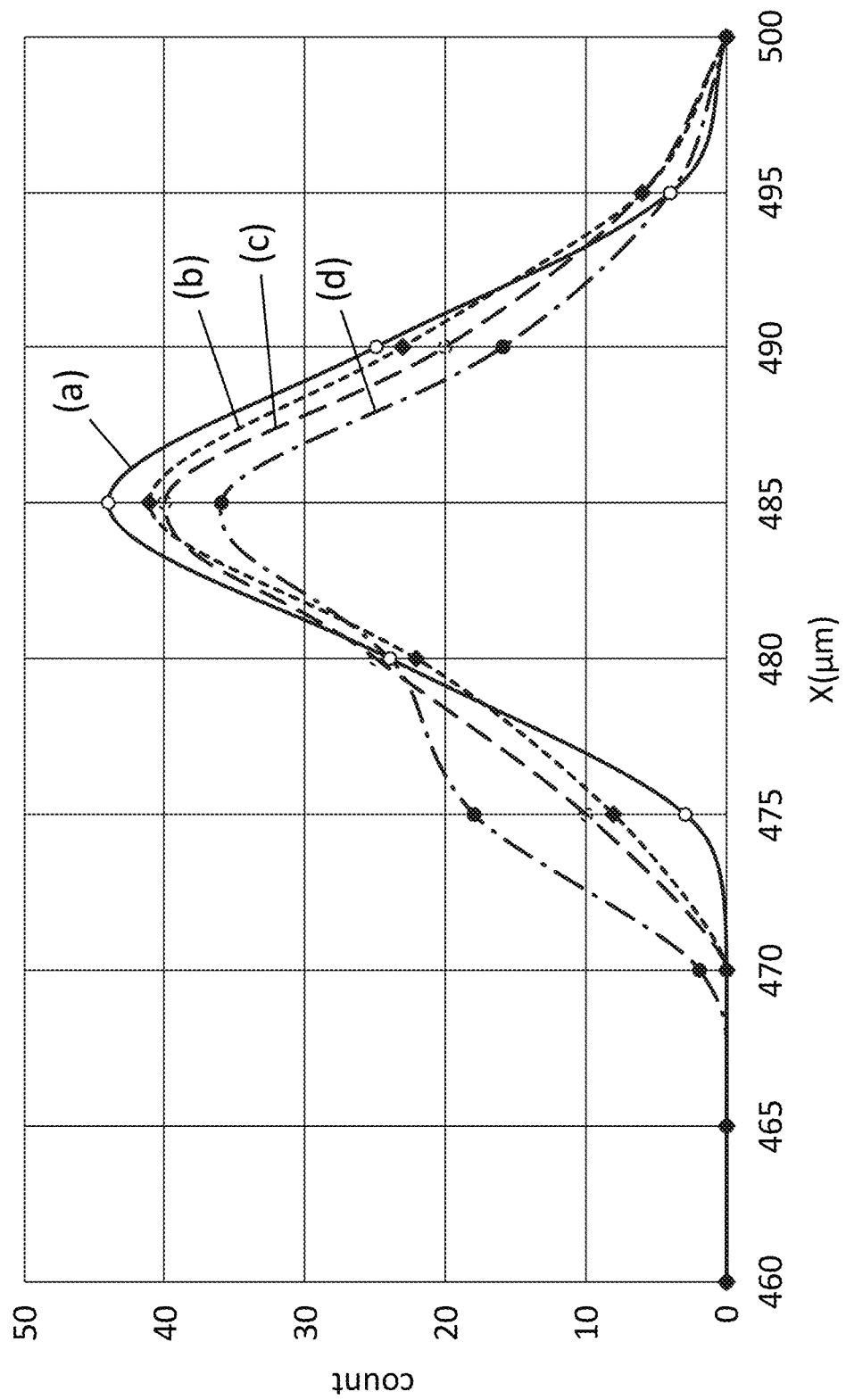
FIG. 31(a) is separation evaluation of 2-μm particles using a microchip 10 made of material of hardness 70 (Example 5).
FIG. 31(b) is separation evaluation of 2-μm particles using a microchip 10 made of material of hardness 60 (Example 6).
FIG. 31(c) is separation evaluation of 2-μm particles using a microchip 10 made of material of hardness 44 (Example 7).
FIG. 31(d) is separation evaluation of 2-μm particles using a microchip 10 made of material of hardness 30 (Comparative Example 2).

FIG. 31(a) illustrates a graph indicating measurement results. The horizontal axis is passing coordinates on the detection line 20 and the vertical axis is a count at each coordinate. It can be seen that the particle distribution is narrower and separation precision is higher compared with Comparative Example 2.

Example 6: Durometer Hardness 60

Particle separation was evaluated in the same way as Example 5 except that the material used for fabricating the microchip 10 was changed to LSR7060 (Momentive Performance Materials Inc., hardness 60). FIG. 31(b) illustrates a graph indicating measurement results. It can be seen that the particle distribution is narrower and separation precision is higher compared with Comparative Example 2.

Example 7: Durometer Hardness 44

Particle separation was evaluated in the same way as Example 5 except that the material used for fabricating the microchip 10 was changed to SILPOT 184 (Toray Industries, Inc., hardness 44). FIG. 31(c) illustrates a graph indicating measurement results. It can be seen that the particle distribution is narrower and separation precision is higher compared with Comparative Example 2.

Comparative Example 2: Durometer Hardness 30

Particle separation was evaluated in the same way as Example 5 except that the material used for fabricating the microchip 10 was changed to LSR 7030 (Momentive Performance Materials Inc., hardness 30). FIG. 31(d) illustrates a graph indicating measurement results. It can be seen that the particle distribution is wider and separation precision is lower compared with Example 5. According to the above results, separation precision can be increased using material of hardness 40 or more.

Particle Separation Observation Example: Separation of Particles and Acquisition of Fluorescent Image Separation was evaluated using particles of 0.2 μm in diameter and 0.5 μm in diameter by a microchip that was fabricated using a mixture of uncured siloxane monomer and polymerization initiator (weight ratio 10:1) that was prepared using Sylgard Silicone Elastomer Kit (Dow Corning Toray Co., Ltd.) instead of LSR 7070 FC (Momentive Performance Materials Inc.), in accordance with the procedure described in the Production Example. Fluorescent polystyrene beads Fluoresbrite DG (Polysciences, Inc.; maximum absorption wavelength: 480 nm, maximum fluorescence wavelength: 520 nm) were used as 0.2 μm-particles, and fluorescent polystyrene bead Fluoresbrite BB (Polysciences, Inc.; maximum absorption wavelength: 360 nm, maximum fluorescence wavelength: 407 nm) were used as 0.5 μm particles. As fluid 100P including particles to be separated, fluorescent polystyrene particles of 0.2 μm in diameter and fluorescent polystyrene particles of 0.5 μm in diameter were prepared in 0.05% (v/v) Tween 20 solution respectively at 3.3 ng/mL and 7.5 ng/mL. As fluid 100N not including particles to be separated, 0.05% (v/v) Tween 20 solution was used. The 0.05% (v/v) Tween 20 solution was used after removing foreign substances using a syringe filter with a 0.45 μm pore size (Merck Millipore Limited) before the test. The flow rate was controlled by a syringe pump (KD Scientific Inc.), the fluid 100P was transferred from the inlet 14a, and the fluid 100N was transferred from the inlet 14b respectively at the flow rates of 5 μL/h and 90 μL/h. Note that each flow rate employs a condition where the two kinds of particles can be well separated. Each fluid was introduced to the microchip 10, and fluorescent images were separately acquired using respective corresponding wavelength light during the introduction. The fluorescent image was acquired by irradiating predetermined excitation light to the observation area by a mercury lamp using an inverted microscope IX71 (Olympus Corporation), and shooting the image acquisition area 30 for 2 seconds by a digital CMOS camera ORCA-FLASH (Hamamatsu Photonics K.K.). After creating the fluorescent image of 0.2-μm particles and the fluorescent image of 0.5-μm particles, the fluorescence profiles at the detection line 20 was analyzed. The horizontal axis of the fluorescence profile is coordinates on the detection line 20, and the vertical axis indicates relative fluorescence intensity at each coordinate. Note that the detection line 20 was set at 200 μm downstream from the branch point 31 toward the outlet 15, where the coordinate 0 was defined on the side of an expanding area wall surface 17a. Further, the image acquisition area 30 was set so that the detection line 20 was within the captured image.

Influence of Channel Structure on PFF Particle Separation

Example 8: A Particle Separation Device where the Channel Width does not Expand Toward the Wall Surface 16a Side Along which Particles Flow Smoothly, Yet, the Channel Width Expands in Steps on the Wall Surface 16b Side Along which Particles do not Flow Smoothly. As Well as, a Drain Channel is Disposed at the Expansion Start Point 19 of the Expanding Channel 17

Figure 32A:
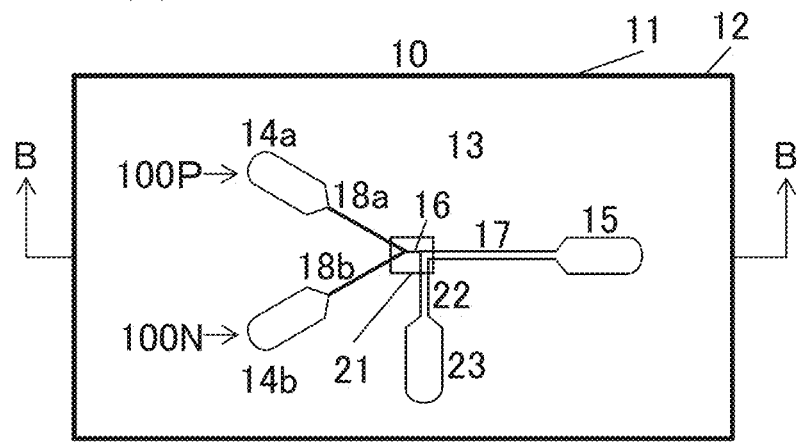
Figure 32B:
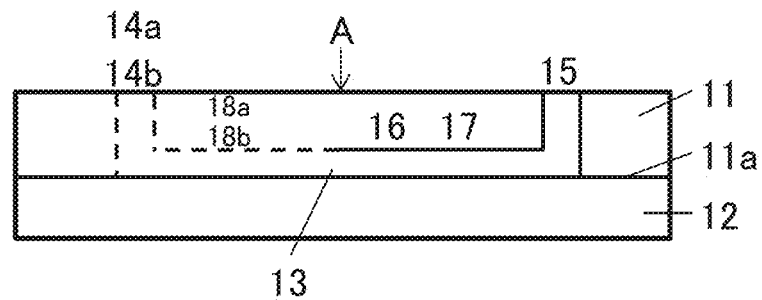
Figure 32B:
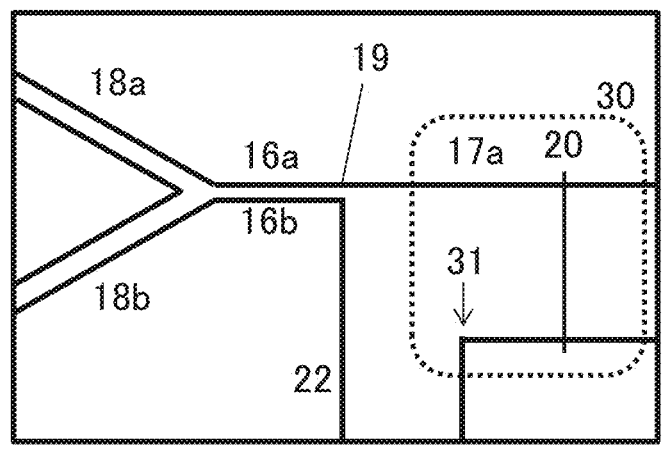

The microchip 10 illustrated in FIGS. 32(a) to 32(c) was fabricated as a particle separation device in accordance with the above-described Production Example. FIG. 32(a) is a top view of the microchip 10 and a detail drawing view from A of FIG. 32(b). FIG. 32(b) is a cross section view along the line B-B in FIG. 32(a). FIG. 32(c) is an enlarged view of the area 21 in FIG. 32(a).

The bottom side 11a of the substrate 11 was processed so that a channel 13 was formed when the substrate 12 was attached thereon. The depth of the channel 13 were all 3.5 μm. Inlets 14a, 14b and outlets 15, 23 (the diameter of each hole was 1.5 mm) that penetrate through the upper surface of the substrate 11 were provided at the ends of the channel 13. Further, the channel 13 was configured by channels of a branch channel 18a (20 μm in width, 1.5 mm in length), a branch channel 18b (40 μm in width, 500 μm in length), a pinched channel 16 (3.3 μm in width, 20 μm in length), an expanding channel 17 (215 μm in width, 6.15 mm in length), and a drain channel 22 (300 μm in width, 1.3 mm in length).

Figure 32D:
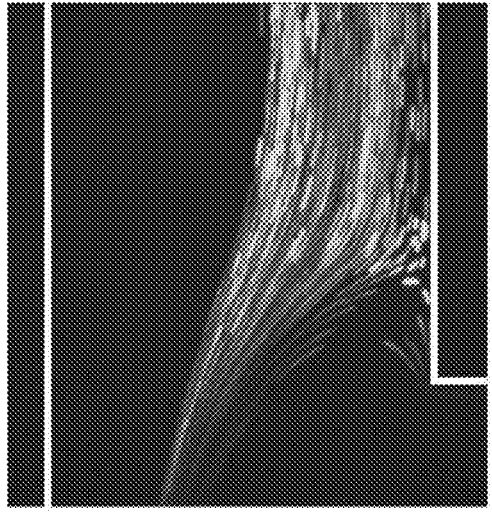
FIGS. 32(d) to 32(g) are diagrams illustrating separation of 0.2-μm fluorescent polystyrene beads and 0.5-μm fluorescent polystyrene beads using the microchip 10 according to the present invention illustrated in FIGS. 32(a) to 32(c).
Figure 32E:
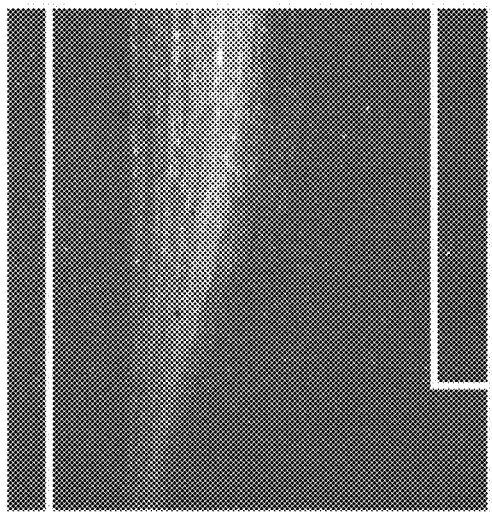
Figure 32F:
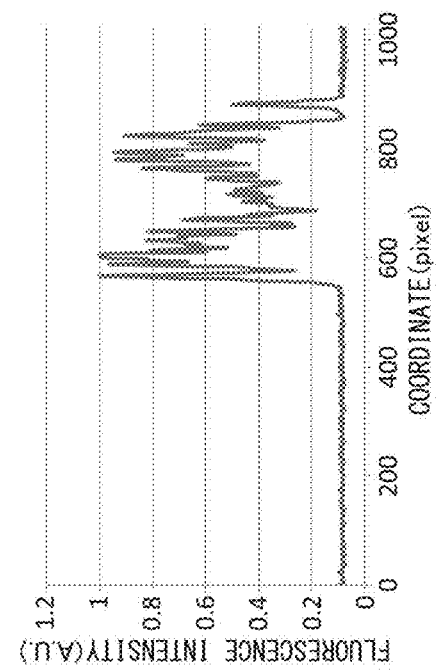
Figure 32G:
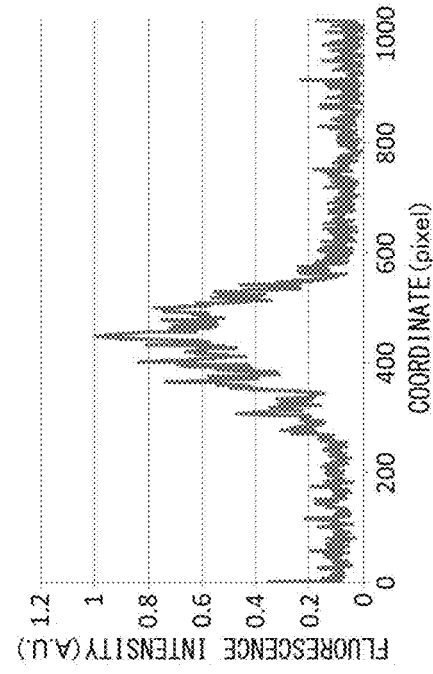

Using the above-described microchip 10 illustrated in FIGS. 32(a) to 32(c), an integrated image of fluorescent polystyrene particles of 0.2 μm in diameter and an integrated image of fluorescent polystyrene particles of 0.5 μm in diameter were obtained (FIGS. 32(d) and 32(e)) in accordance with the separation observation example. FIG. 32(f) and FIG. 32(g) respectively illustrate graphs illustrating a fluorescence profile of the fluorescent polystyrene particles of 0.2 μm in diameter and a fluorescence profile of the fluorescent polystyrene particles of 0.5 μm in diameter at the detection line 20. From these results, it was confirmed that particles of 0.2 μm in diameter and 0.5 μm in diameter were almost completely separated.

Comparative Example 3: A Particle Separation Device where the Channel Width Expands in Steps Toward the Wall Surface 16a Side Along which Particles Flow Smoothly, and the Channel Width Expands in Steps Toward the Wall Surface 16b Side Alone which Particles do not Flow Smoothly. As Well as. A Drain Channel is Disposed at the Expansion Start Point 19 of the Expanding Channel 17

Figure 33A:
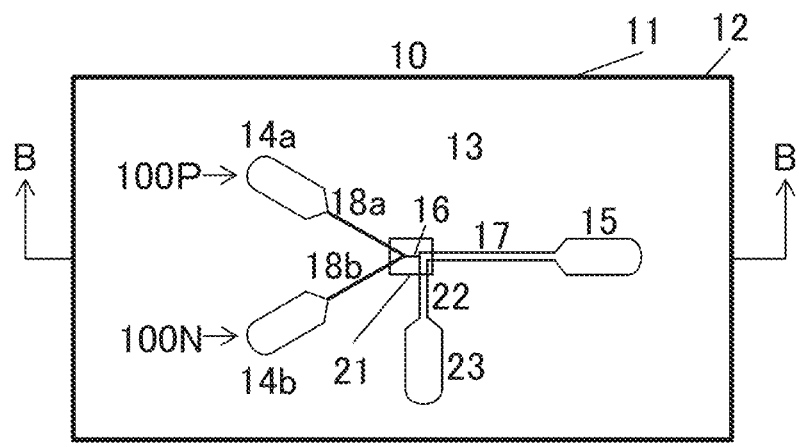
Figure 33B:
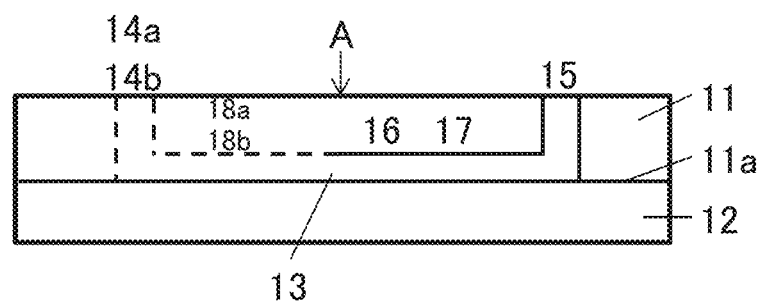
Figure 33B:
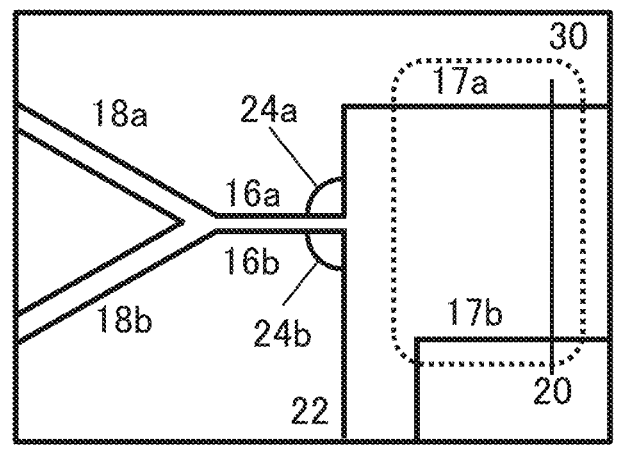
Figure 33D:
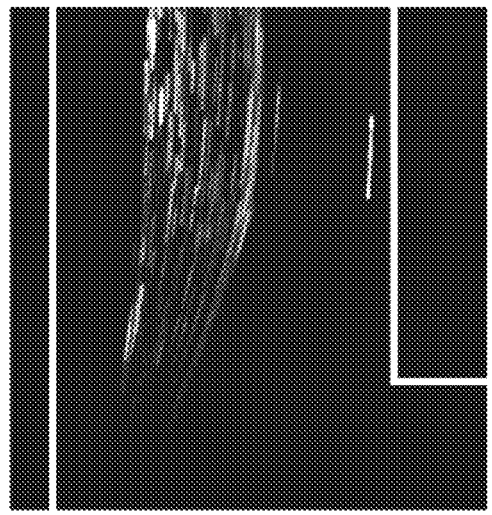
FIGS. 33(d) to 33(g) are diagrams illustrating separation of 0.2-μm fluorescent polystyrene beads and 0.5-μm fluorescent polystyrene beads using the microchip 10 of a conventional technique illustrated in FIGS. 33(a) to 33(c).
Figure 33E:
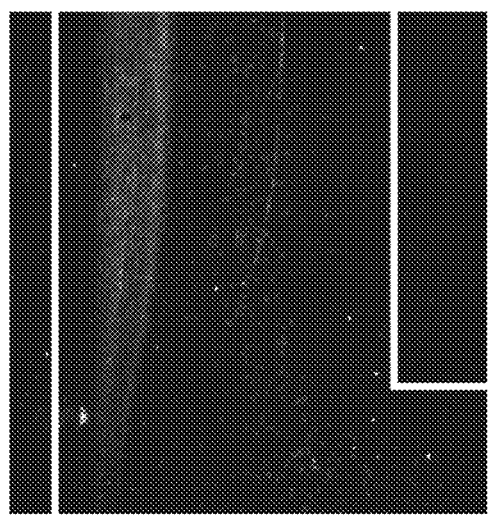
Figure 33F:
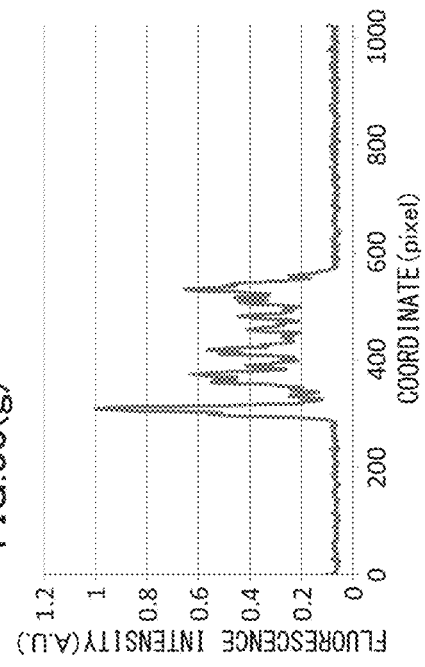
Figure 33G:
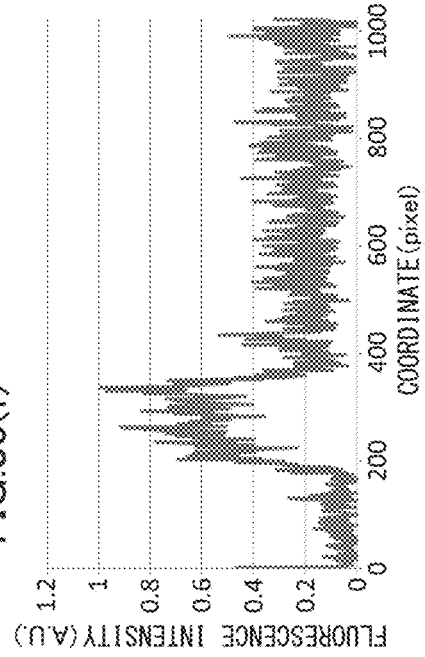
Figure 34A:
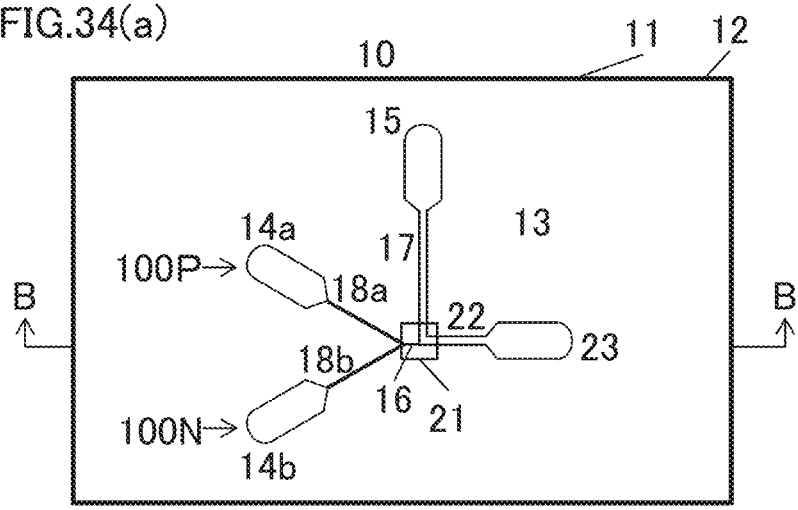
Figure 34B:
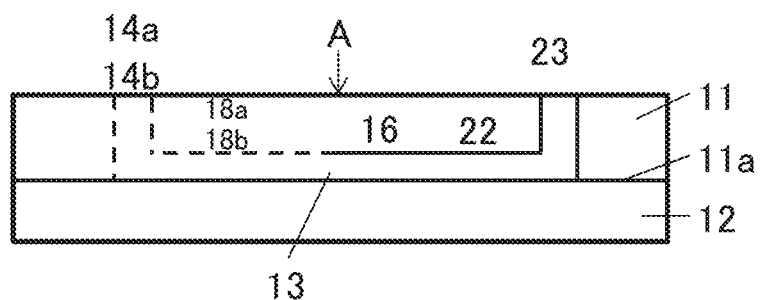
Figure 34B:
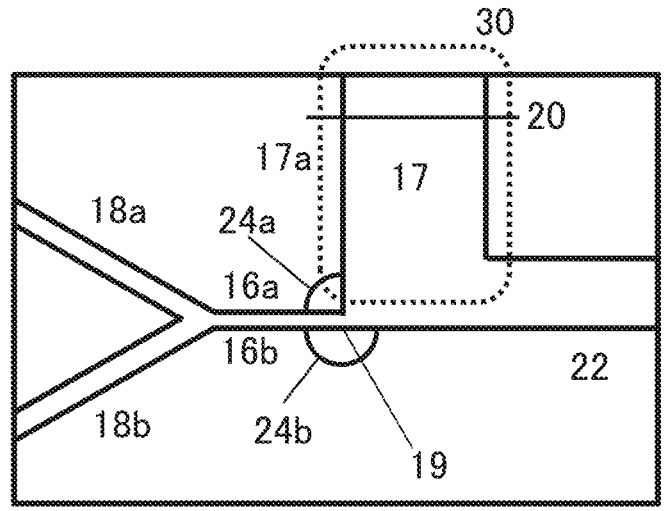
Figure 34E:
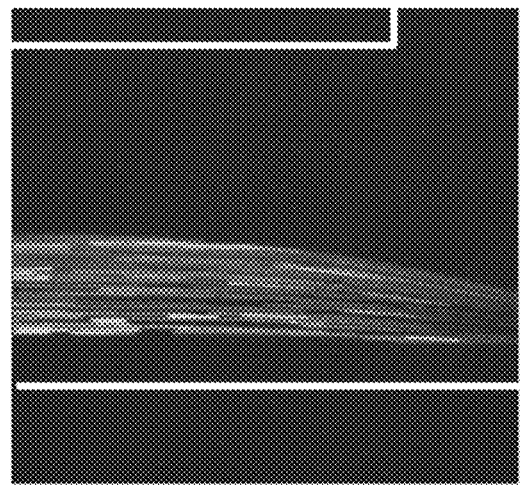
FIGS. 34(d) to 34(g) are diagrams illustrating separation of 0.2-μm fluorescent polystyrene beads and 0.5-μm fluorescent polystyrene beads using the microchip 10 according to the present invention illustrated in FIGS. 34(a) to 34(c).
Figure 34D:
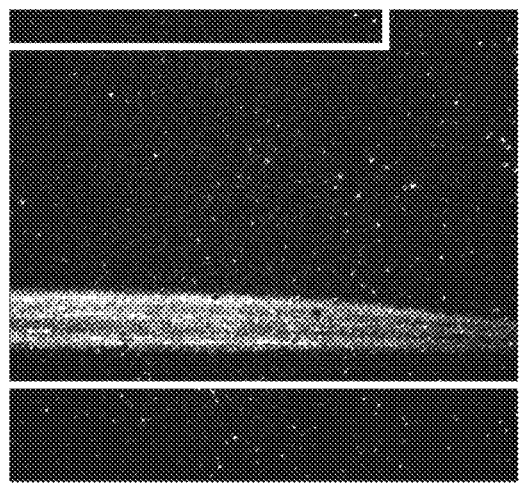
Figure 34G:
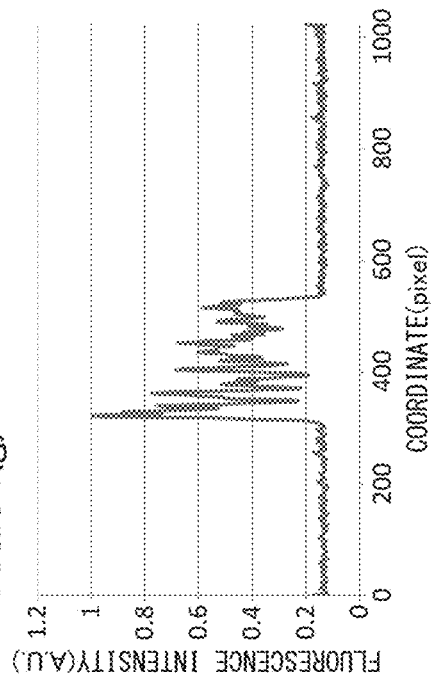
Figure 34F:
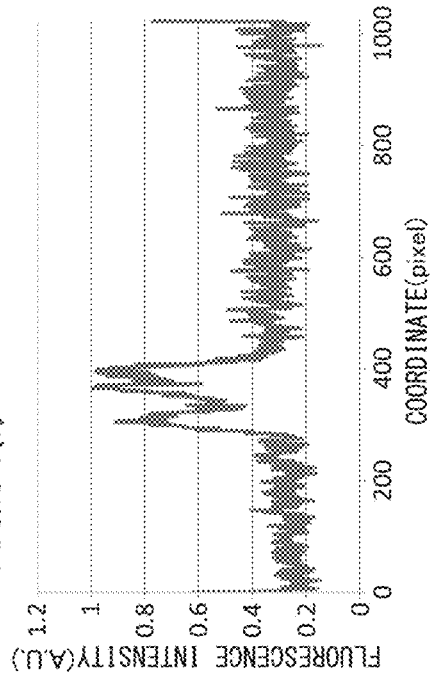
Figure 35A:
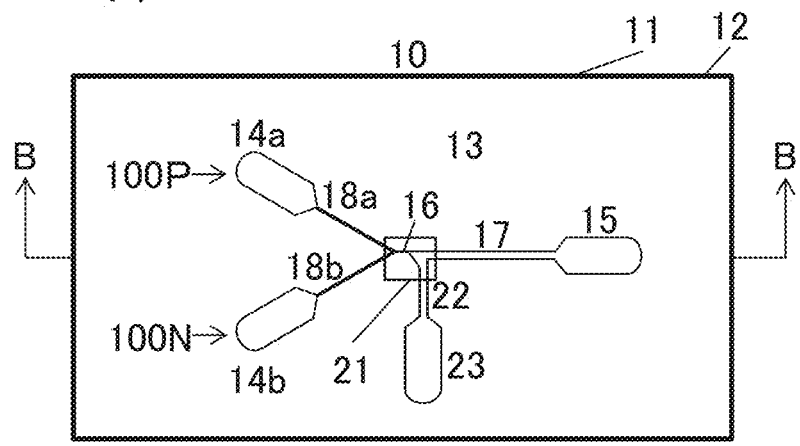
Figure 35B:
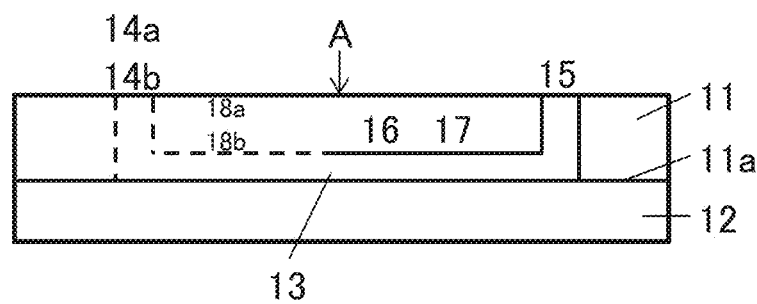
Figure 35B:
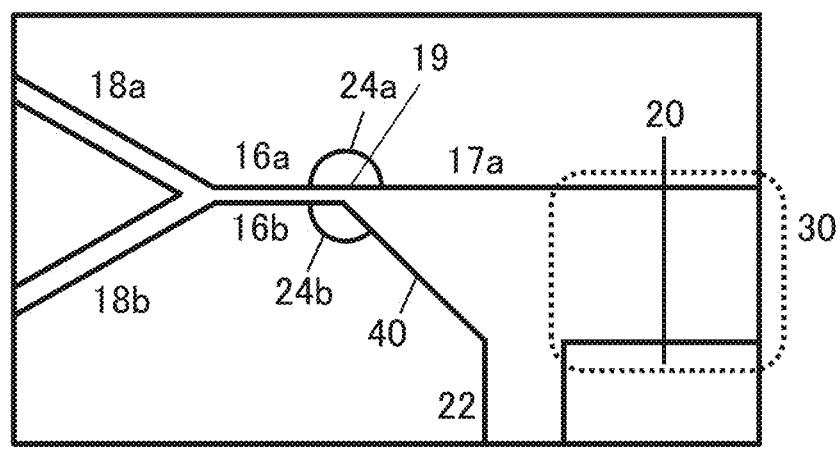
Figure 35D:
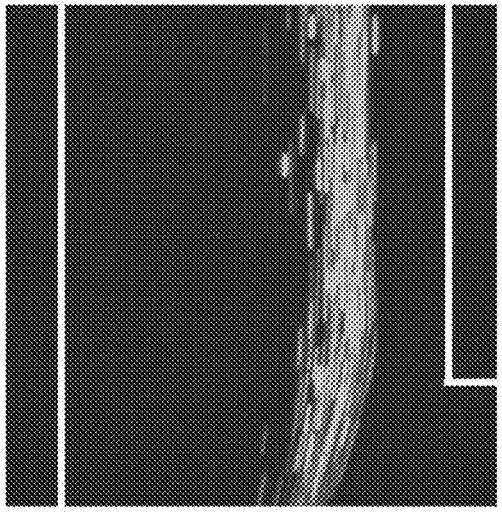
FIGS. 35(d) to 35(g) are diagrams illustrating separation of 0.2-μm fluorescent polystyrene beads and 0.5-μm fluorescent polystyrene beads using the microchip 10 of the present invention illustrated in FIGS. 35(a) to 35(c).
Figure 35E:
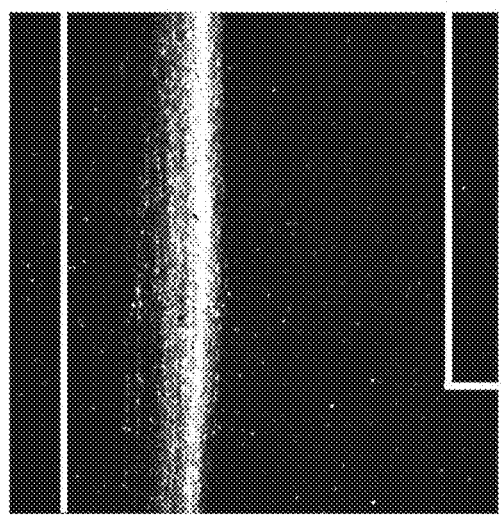
Figure 35F:
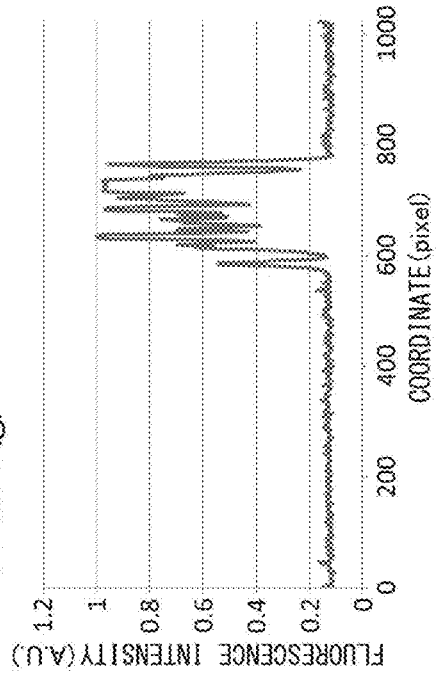
Figure 35G:
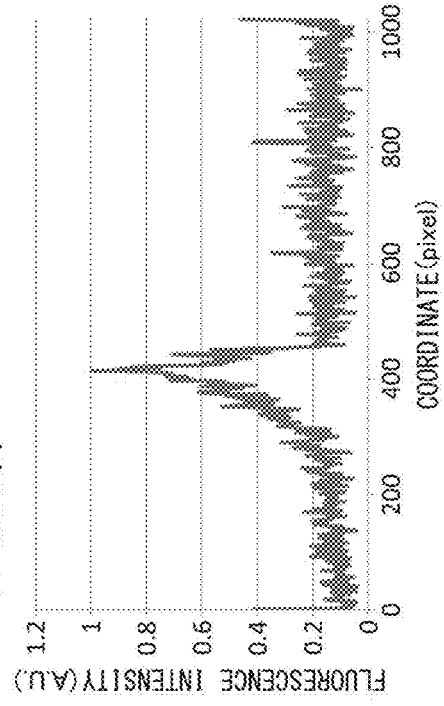

The microchip 10 illustrated in FIGS. 33(a) to 33(c) was fabricated as a particle separation device in accordance with the above-described Production Example. Compared with the microchip 10 of Example 8, the microchip 10 was designed to be different from Example 8 only in that the angles 24a, 24b between the pinched channel 16 and the expanding channel 17 were 900 and the width from the pinched channel wall surface 16a to the expanding channel wall surface 17a was 50 µm, and, under the same test conditions as Example 8 except that the flow rate conditions of the sample liquid and sheath liquid were respectively set as 5 µL/h and 80 µL/h, separation of fluorescent polystyrene particles of 0.2 µm in diameter and 0.5 µm in diameter were examined in the same way as Example 8. Note that, in the same way as Example 8, each flow rate employs a condition where the two kinds of particles can be well separated, which was used to evaluate the separation.

FIG. 33(*d*) and FIG. 33(*e*) respectively illustrate the integrated images of fluorescent polystyrene particles of 0.2 µm in diameter and 0.5 µm in diameter. FIG. 33(*f*) and FIG. 33(*g*) respectively illustrate graphs of fluorescence profiles of fluorescent polystyrene particles of 0.2 µm in diameter and 0.5 µm in diameter at the detection line 20. From these results, a partial overlap is observed in the separation of particles of 0.2 µm in diameter and 0.5 µm in diameter in this Comparative Example, and it is found that the performance is inferior to Example 8.

Comparative Example 4: A Particle Separation Device where the Channel Width Expands in Steps Toward the Wall Surface 16a Side Along which Particles Flow Smoothly, as Well as, a Drain Channel 22 is Disposed at the Expansion Start Point 19 of the Expanding Channel 17. And the Channel Width does not Expand Toward the Wall Surface 16b Side Alone which Particles do not Flow Smoothly The microchip 10 illustrated in FIGS. 34(*a*) to 34(*c*) was fabricated as a particle separation device in accordance with the above-described Production Example. Compared with the microchip 10 of Example 8, the microchip 10 was designed to be different from Example 8 only in that the angle 24a between the pinched channel 16 and the expanding channel 17 was 90° and the angle 24b was 180°, and under the same test conditions as Example 8 except that the flow rate conditions of the sample liquid and sheath liquid were respectively set as 5 µL/h and 80 µL/h, separation of fluorescent polystyrene particles of 0.2 µm in diameter and 0.5 µm in diameter were examined in the same way as Example 8. Note that, in the same way as Example 8, each flow rate employs a condition where the two kinds of particles can be well separated, which was used to evaluate the separation. Further, since the angle 24a was 90° and the angle 24b was 180°, the microchip 10 had a channel structure where the expanding channel 17 was located perpendicular to the pinched channel and the drain channel 22 was located in parallel to the pinched channel. In other words, this Comparative Example serves as a comparison where the connection part structure of the pinched channel 16 and the expanding channel 17 of Example 8 was vertically inverted. When the channel structure was that the expanding channel 17 was arranged in parallel to the pinched channel 22. i.e., in the same direction as the one in Example 8, and the drain channel 22 was arranged in a perpendicular direction to the pinched channel and inverted in a vertical direction relative to the direction in Example 8, particles flowed into the drain channel 22 together with most of the fluid flowed there. As such, the effect of improved separation ability by the drain channel 22 could not be attained with this arrangement. Thus, the channel structure illustrated in FIGS. 34(*a*) to 34(*c*) was employed to have a channel structure having the same particle separation ability as that of Example 8.

FIG. 34(*d*) and FIG. 34(*e*) respectively illustrate the integrated images of fluorescent polystyrene particles of 0.2 µm in diameter and 0.5 µm in diameter. FIG. 34(*f*) and FIG. 34(*g*) respectively illustrate graphs of fluorescence profiles of fluorescent polystyrene particles of 0.2 µm in diameter and 0.5 µm in diameter at the detection line 20. From these results, a partial overlap is observed in the separation of particles of 0.2 µm in diameter and 0.5 µm in diameter in this Comparative Example, and it is found that the performance is greatly inferior to Example 8 and even to Comparative Example 3.

Example 9: A Particle Separation Device where the Channel Width does not Expand Toward the Wall Surface 16a Side Along which Particles Flow Smoothly. Yet, the Channel Width Gradually Expands Toward the Wall Surface 16b Side Along which Particles do not Flow Smoothly, as Well as, a Drain Channel 22 is Disposed at the Expansion End Point of the Expanding Channel 17

The microchip 10 illustrated in FIGS. 35(*a*) to 35(*c*) was fabricated as a particle separation device in accordance with the above-described Production Example. Compared with the microchip 10 of Example 8, the microchip 10 was designed to be different from Example 9 only in that the angle 24a between the pinched channel 16 and the expanding channel 17 was 180° and the angle 24b was 135°, the length of the slope part 40 of the expanding area was 1/√2 mm, and the length of the drain channel was 500 µm so that the ratios of fluid flowing to the outlets 15 and 23 are equivalent to those of Example 8, and, under the same test conditions as Example 8 except that the flow rate conditions of the sample liquid and sheath liquid were respectively set as 3 µL/h and 90 µL/h, separation of fluorescent polystyrene particles of 0.2 µm in diameter and 0.5 µm in diameter were examined in the same way as Example 8. Note that, in the same way as Example 8, each flow rate employs a condition where the two kinds of particles can be well separated, which was used to evaluate the separation.

FIG. 35(*d*) and FIG. 35(*e*) respectively illustrate the integrated images of fluorescent polystyrene particles of 0.2 µm in diameter and 0.5 µm in diameter. FIG. 35(*f*) and FIG. 35(*g*) respectively illustrate graphs of fluorescence profiles of fluorescent polystyrene particles of 0.2 µm in diameter and 0.5 µm in diameter at the detection line 20. From these results, complete separation is observed in the separation of particles of 0.2 µm in diameter and 0.5 µm in diameter in this example, and it is found that the separation ability is superior to Example 8.

Comparative Example 5: A Particle Separation Device where the Channel Width Gradually Expands Toward the Wall Surface 16a Side Alone which Particles Flow Smoothly, as Well as, a Drain Channel 22 is Disposed at the Expansion End Point of the Expanding Channel 17, Vet, the Channel Width does not Expand Toward the Wall Surface 16b Side Along which Particles do not Flow Smoothly The microchip 10 illustrated in FIGS. 36(*a*) to 36(*c*) was fabricated as a particle separation device in accordance with the above-described Production Example. Compared with the microchip 10 of Example 9, the microchip 10 was designed to be different from Example 9 only in that the angle 24a between the pinched channel 16 and the expanding channel 17 was 135° and the angle 24b was 180°, and, under the same test conditions as Example 10 except that the flow rate conditions of the sample liquid and sheath liquid were respectively set as 3 µL/h and 95 µL/h, separation of fluorescent polystyrene particles of 0.2 µm in diameter and 0.5 µm in diameter were examined in the same way as Example 9. Note that, in the same way as Example 9, each flow rate employs a condition where the two kinds of particles can be well separated, which was used to evaluate the separation. Further, since the angle 24a was 135° and the angle 24b was 180°, the microchip 10 had a channel structure where the expanding channel 17 was located perpendicular to the pinched channel 16 and the drain channel 22 was located in parallel to the pinched channel 16. In other words, this Comparative Example serves as a comparison where the connection part structure of the pinched channel 16 and the expanding channel 17 of Example 9 was vertically inverted. When the channel structure was that the expanding channel 17 was arranged in parallel to the pinched channel 22, i.e., in the same direction as the one in Example 9, and the drain channel 22 was arranged in a perpendicular direction to the pinched channel and inverted in a vertical direction relative to the direction in Example 8, particles flowed into the drain channel 22 together with most of the fluid flowed there. As such, the effect of improved separation ability by the drain channel 22 could not be attained with this arrangement. Thus, a channel structure illustrated in FIGS. 36(a) to 36(c) was employed to have a channel structure having the same particle separation ability as that of Example 9.

Figure 36A:
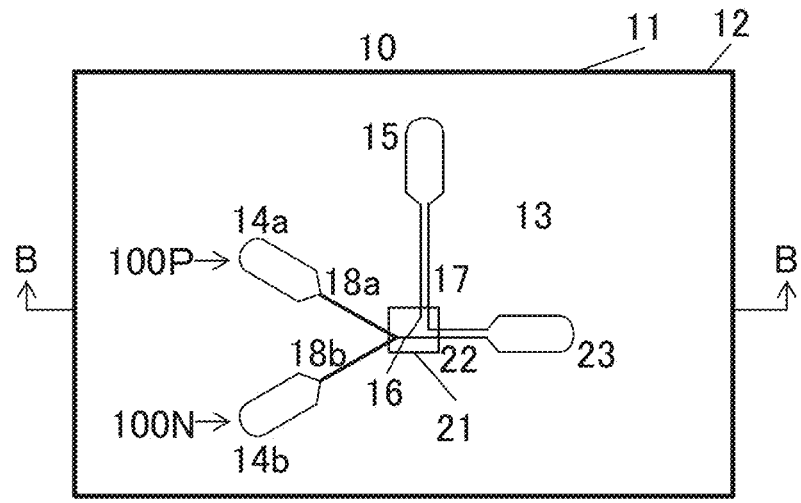
Figure 36B:
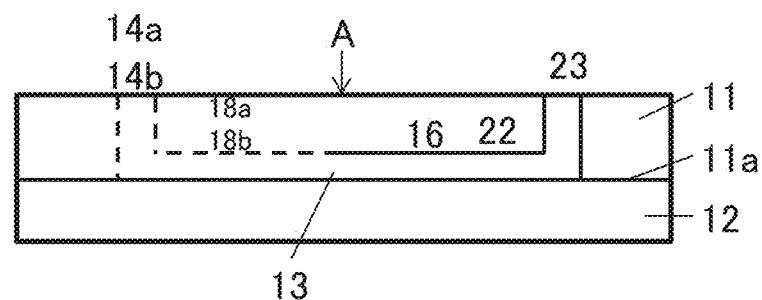
Figure 36B:
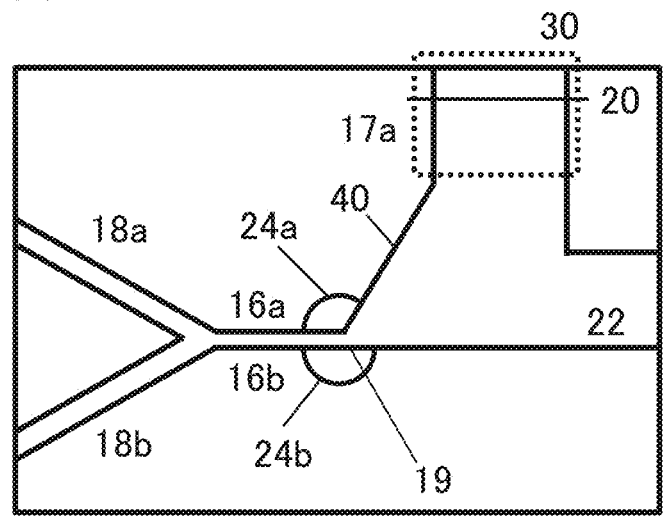
Figure 36D:
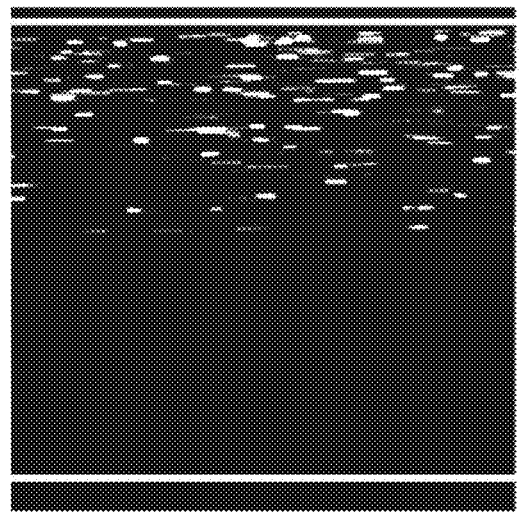
FIGS. 36(d) to 36(g) are diagrams illustrating separation of 0.2-μm fluorescent polystyrene beads and 0.5-μm fluorescent polystyrene beads using the microchip 10 according to the present invention illustrated in FIGS. 36(a) to 36(c).
Figure 36E:
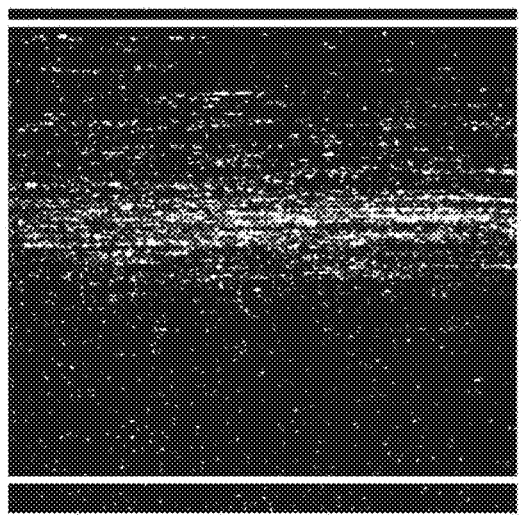
Figure 36F:
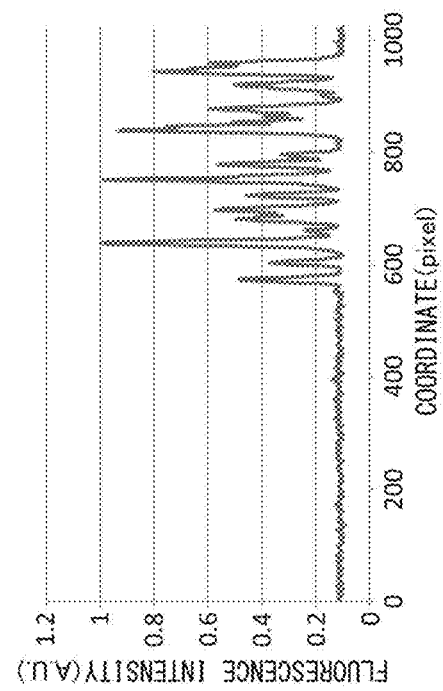
Figure 36G:
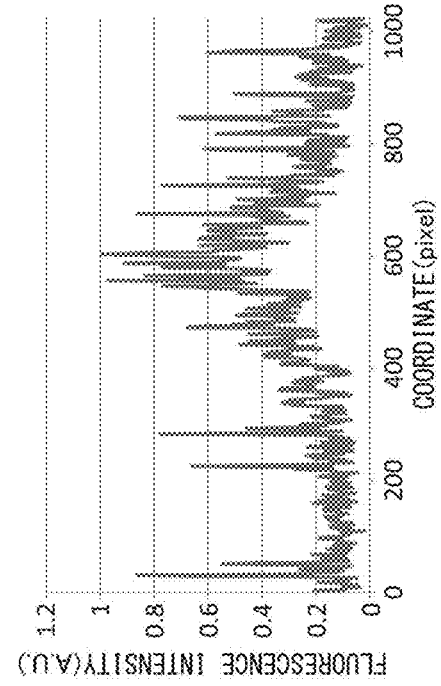

FIG. 36(d) and FIG. 36(e) respectively illustrate the integrated images of fluorescent polystyrene particles of 0.2 µm in diameter and 0.5 µm in diameter. FIG. 36(f) and FIG. 36(g) respectively illustrate graphs of fluorescence profiles of fluorescent polystyrene particles of 0.2 µm in diameter and 0.5 µm in diameter at the detection line 20. From these results, incomplete separation is observed in the separation of particles of 0.2 µm in diameter and 0.5 µm in diameter in this Comparative Example, and it is found that the separation ability is inferior to Example 9.

Example 10: The Particle Separation Device of Example 9 Having a Convex on the Slope Part 40

The microchip 10 illustrated in FIGS. 37(a) to 37(d) was fabricated as a particle separation device in accordance with the above-described Production Example. This microchip 10 has almost the same structure as the one in Example 8 except that a partial convex formed by the channel wall surfaces 41a and 41b (both are 50 µm in length) exists at a part of the slope part 40 of the expanding area between the sheath liquid-side pinched channel wall surface 16b and the slope part 40, as illustrated in FIG. 37(d) indicating an enlarged view of the connection part between the pinched channel 16 and the expanding channel 17, and, under the same test conditions as those of Example 10 except for the convex, separation of fluorescent polystyrene particles of 0.2 µm in diameter and 0.5 µm in diameter were examined. Note that, in the same way as Example 9, each flow rate employs a condition where the two kinds of particles can be well separated, which was used to evaluate the separation.

Figure 37E:
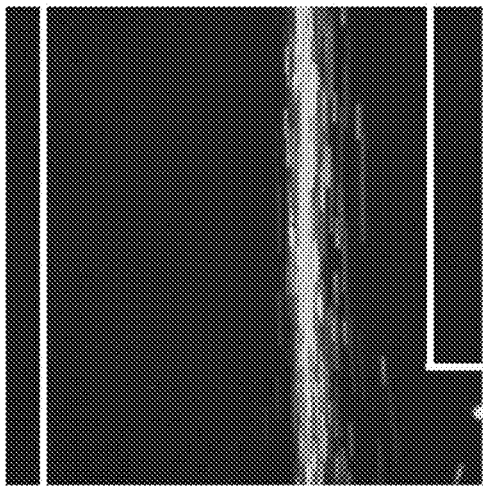
FIGS. 37(e) to 37(h) are diagrams illustrating separation of 0.2-μm fluorescent polystyrene beads and 0.5-μm fluorescent polystyrene beads using the microchip 10 according to the present invention illustrated in FIGS. 37(a) to 37(d).
Figure 37F:
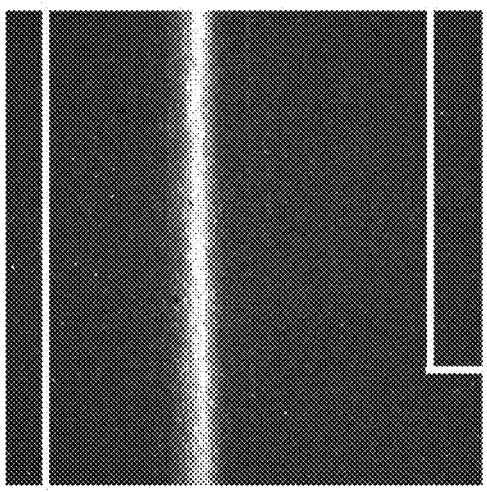
Figure 37G:
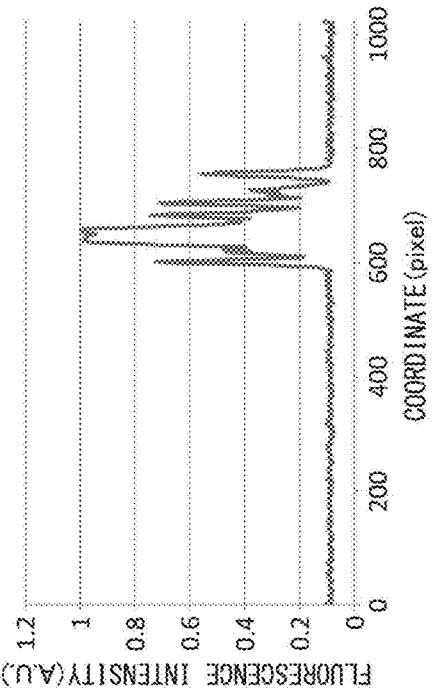
Figure 37H:
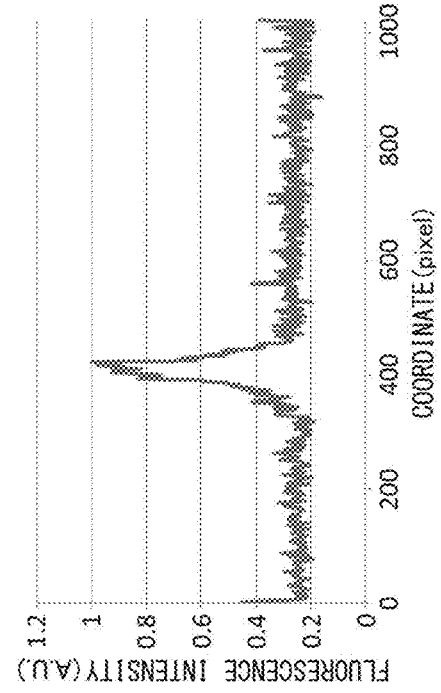

FIG. 37(e) and FIG. 37(f) respectively illustrate the integrated images of fluorescent polystyrene particles of 0.2 µm in diameter and 0.5 µm in diameter. FIG. 37(g) and FIG. 37(h) respectively illustrate graphs illustrating the fluorescence profiles of fluorescent polystyrene particles of 0.2 µm in diameter and 0.5 µm in diameter at the detection line 20. From these results, complete separation is observed in the separation of particles of 0.2 µm in diameter and 0.5 µm in diameter in this Comparative Example, and it is found that the separation ability is nearly equivalent to Example 9.

From the above-described results, it can be said that the angle 24b between the sheath liquid-side pinched channel wall surface 16b and the expanding channel wall surface 17b is preferably larger than 90°. However, even if the angle is 90° or less, as long as the angle is a partial convex structure and the convex structure is smaller than the width of the expanding channel or drain channel, in terms of particle separation by PFF, the flow of fluid is substantially almost equivalent to the flow when there is only a slope part 40 downstream of the sheath liquid-side pinched channel wall surface 16b, and it can be said that such a structure can also provide equivalent separation ability.

Example 11: The Particle Separation Device of Example 9 Having a Different Width in the Pinched Channel and a Different Depth in the Channel 13

The microchip 10 that has the same structure except that the width of the pinched channel 16 was changed to 2 µm and the depth of the channel 13 was changed to 2 µm was fabricated as a particle separation device in accordance with the above-described Production Example. Using this microchip 10, separation of 0.1-µm and 0.2-µm particles were examined. As particles to be separated, fluorescent polystyrene beads Fluoresbrite DG of 0.2 µm in diameter (Polysciences, Inc.; maximum absorption wavelength: 480 nm, maximum fluorescence wavelength: 520 nm) and fluorescent polystyrene beads Fluoresbrite BB of 0.1 µm in diameter (Polysciences, Inc.; maximum absorption wavelength: 360 nm, maximum fluorescence wavelength: 407 nm) were used. The fluorescent polystyrene particles of 0.2 µm in diameter were diluted at 3.3 ng/mL, and the fluorescent polystyrene particles of 0.1 µm in diameter were diluted at 67 ng/mL and were used in the test. The flow rate conditions of the sample liquid and the sheath liquid were respectively set as 0.5 µL/h and 75 µL/h. Note that, in the same way as Example 9, each flow rate employs a condition where the two kinds of particles can be well separated, which was used to evaluate the separation.

Figure 38A:
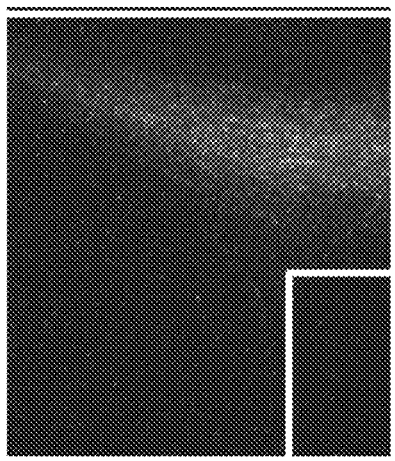
FIG. 38(a) is an integrated fluorescence image of separated 0.1-μm fluorescent polystyrene beads.
Figure 38B:
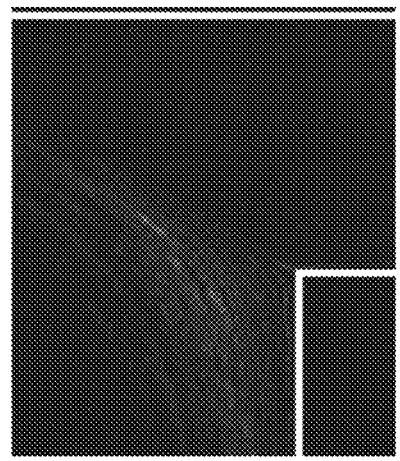
FIG. 38(b) is an integrated fluorescence image of separated 0.2-μm fluorescent polystyrene beads.

FIG. 38(a) and FIG. 38(b) respectively illustrate the integrated images of fluorescent polystyrene particles of 0.1 µm in diameter and 0.2 µm in diameter. It was observed that the particles of 0.1 µm in diameter flowed into the expanding channel 17 that leads to the outlet 15, and 0.2-µm particles flowed into the drain channel 22 that leads to the outlet 23. Thus, it was confirmed that even minute particles of approximately 100 nm can be separated and recovered according to the content described in the present invention.

Example 12: A Particle Separation Device where the Expanding Channel Wall Surface 17a Shrinks Toward 17b and the Channel Width Expands in Steps Toward the Wall Surface 16b Side Along which Particles do not Flow Smoothly, as Well as, a Drain Channel is Disposed at the Expansion Start Point 19 of the Expanding Channel 17

Figure 41A:
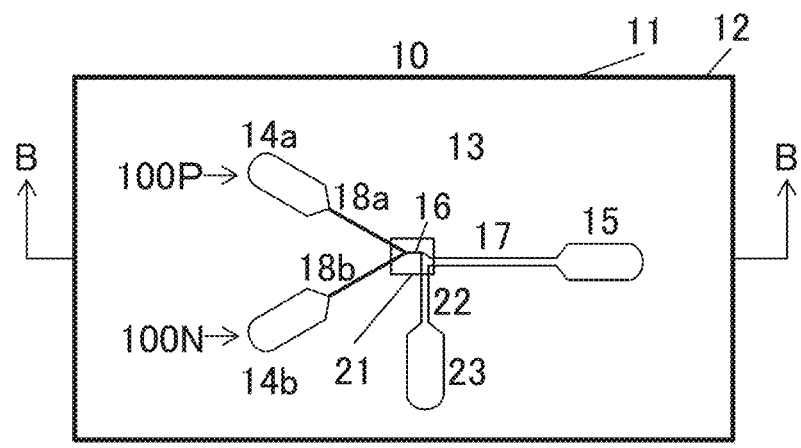
Figure 41B:
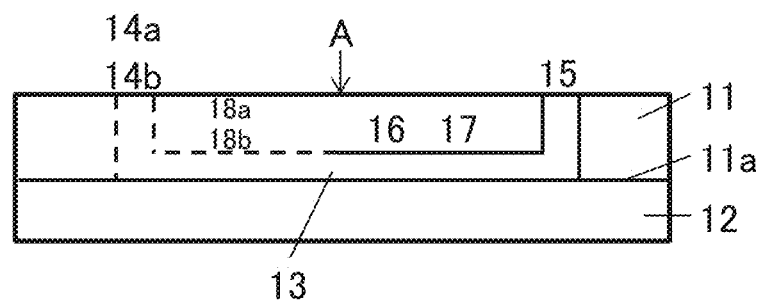
Figure 41B:
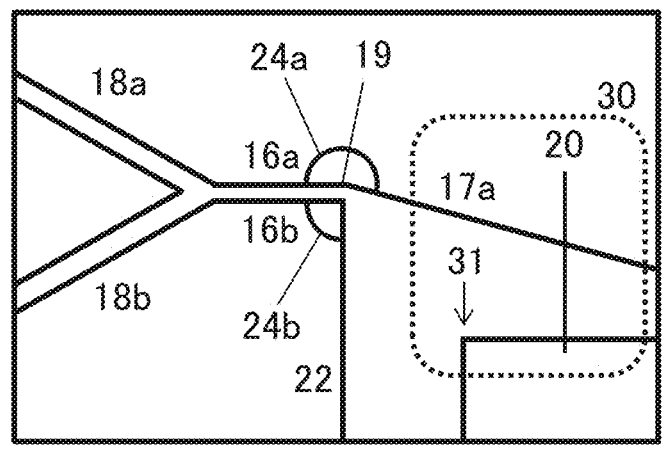

The microchip 10 illustrated in FIGS. 41(a) to 41(c) was fabricated as a particle separation device in accordance with the above-described Production Example. Compared with the microchip 10 of Example 8, the microchip 10 was designed to be different from Example 8 only in that the angle 24a between the pinched channel 16 and the expanding channel 17 was 2100 and the angle 24b was 90°, and, under the same test conditions as Example 8 except that a pressure pump P-Pump Basic (The Dolomite Centre Ltd.) was used as a liquid transferring pump and the flow rate conditions of the sample liquid and sheath liquid were respectively set as 1090 mbar and 1200 mbar, separation of fluorescent polystyrene particles of 0.2 µm in diameter and 0.5 µm in diameter were examined in the same way as Example 8. Note that, in the same way as Example 8, each flow rate employs a condition where the two kinds of particles can be well separated, which was used to evaluate the separation.

Figure 41D:
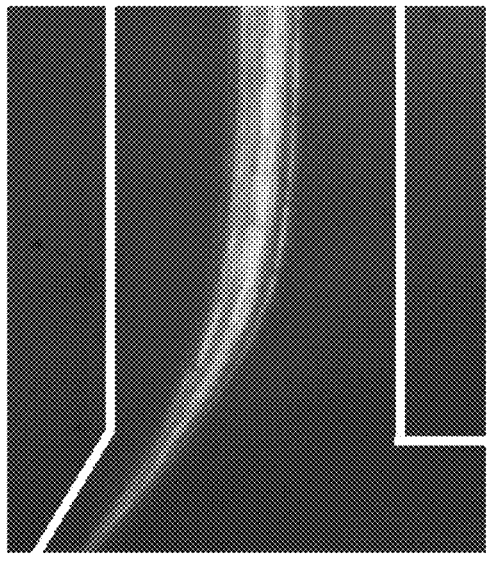
FIGS. 41(d) to 41(g) are diagrams illustrating separation of 0.2-μm fluorescent polystyrene beads and 0.5-μm fluorescent polystyrene beads using the microchip 10 according to the present invention illustrated in FIGS. 41(a) to 41(c).
Figure 41E:
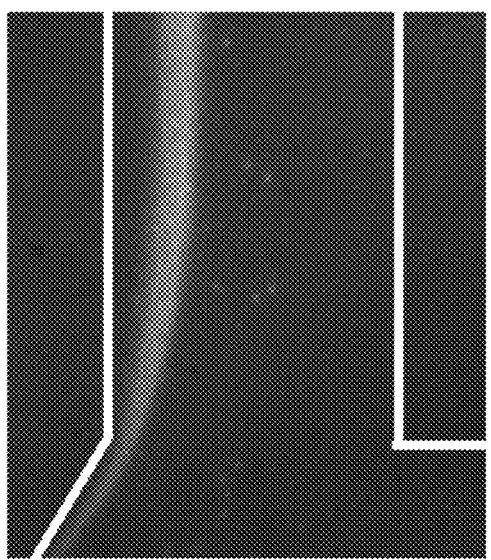
Figure 41F:
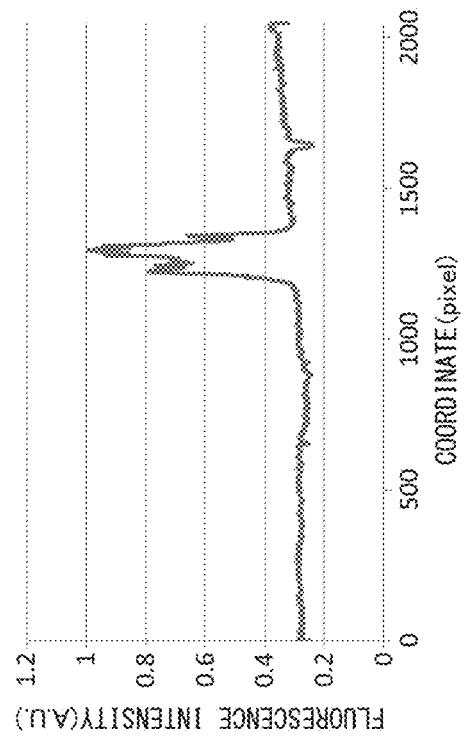
Figure 41G:
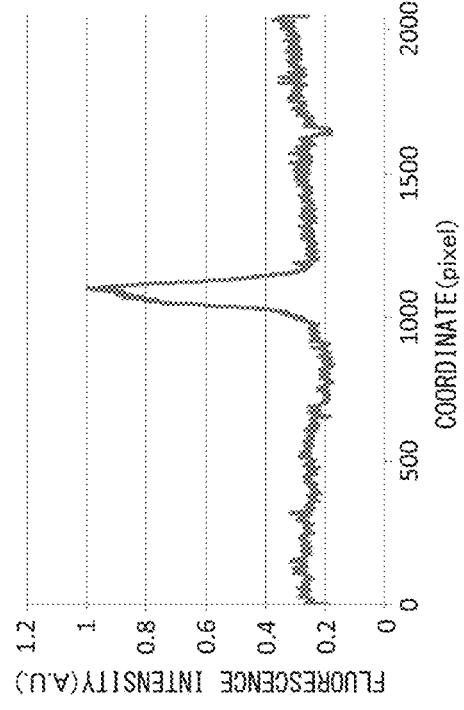

FIG. 41(d) and FIG. 41(e) respectively illustrate the integrated images of fluorescent polystyrene particles of 0.2 µm in diameter and 0.5 µm in diameter. FIG. 41(f) and FIG. 41(g) respectively illustrate graphs of fluorescence profiles of fluorescent polystyrene particles of 0.2 µm in diameter and 0.5 µm in diameter at the detection line 20. From these results, it was confirmed that particles of 0.2 µm in diameter and 0.5 µm in diameter can be separated in this Comparative Example. This result suggests that the expanding channel wall surface 17a is preferably not to be expanded.

Comparative Example 6: A Particle Separation Device where Both Expanding Channel Wall Surfaces 17a and 17b Expand, as Well as, a Drain Channel 22 is Disposed at the Expansion End Point of the Expanding Channel 17

Figure 42A:
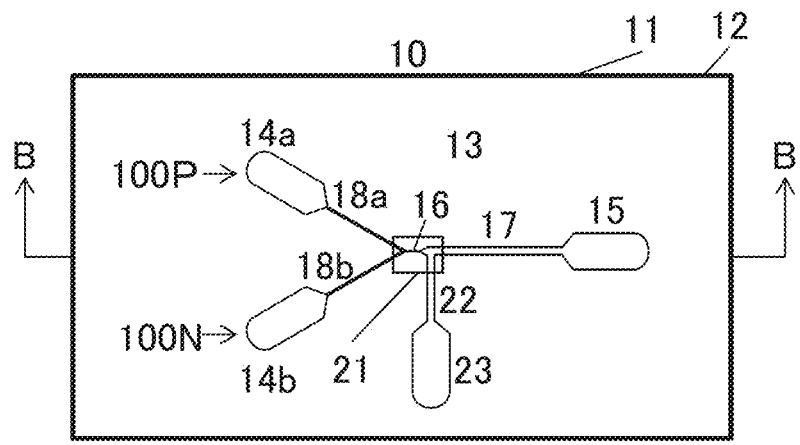
Figure 42B:
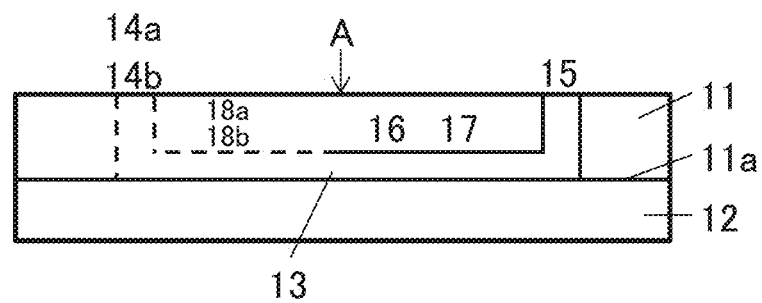
Figure 42B:
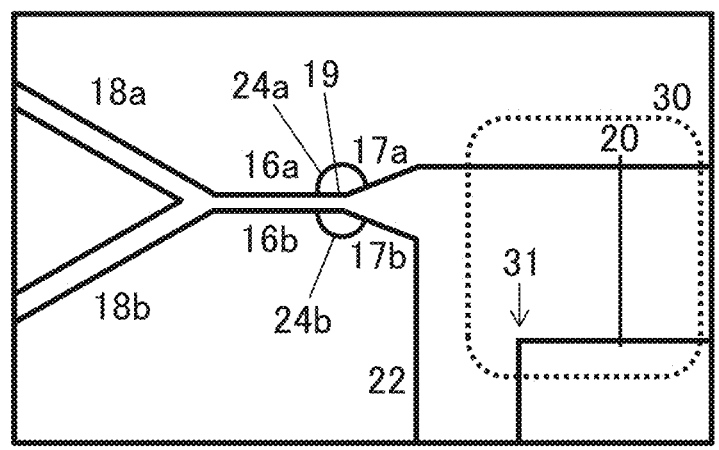

The microchip 10 illustrated in FIGS. 42(a) to 42(c) was fabricated as a particle separation device in accordance with the above-described Production Example. Compared with the microchip 10 of Example 8, the microchip 10 was designed to be different from Example 8 only in that the angles 24a and 24b between the pinched channel 16 and the expanding channel 17 were respectively 165°, and, under the same test conditions as Example 8 except that a pressure pump was used as a liquid transferring pump and the flow rate conditions of the sample liquid and sheath liquid were respectively set as 1070 mbar and 1200 mbar, separation of fluorescent polystyrene particles of 0.2 µm in diameter and 0.5 µm in diameter were examined in the same way as Example 8. Note that, in the same way as Example 8, each flow rate employed a condition where the two kinds of particles can be well separated, which was used to evaluate the separation.

Figure 42D:
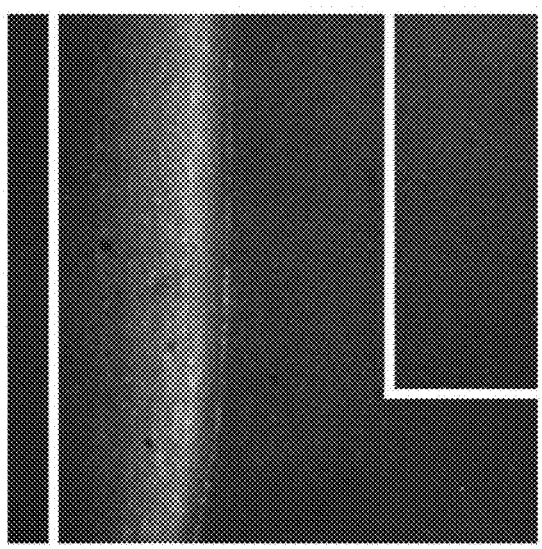
FIGS. 42(d) to 42(g) are diagrams illustrating separation of 0.2-μm fluorescent polystyrene beads and 0.5-μm fluorescent polystyrene beads using the microchip 10 according to the present invention illustrated in FIGS. 42(a) to 42(c).
Figure 42E:
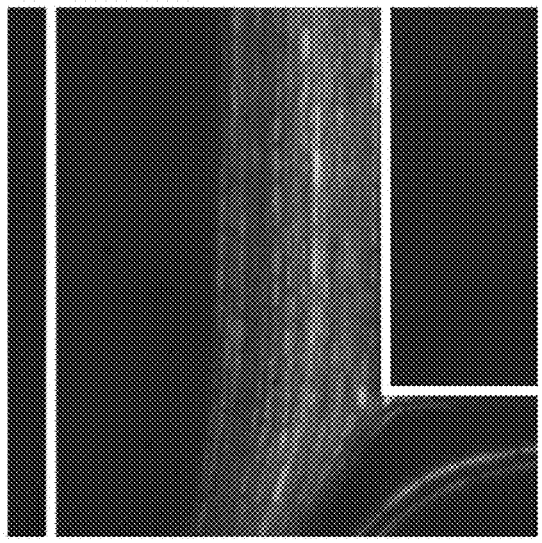
Figure 42F:
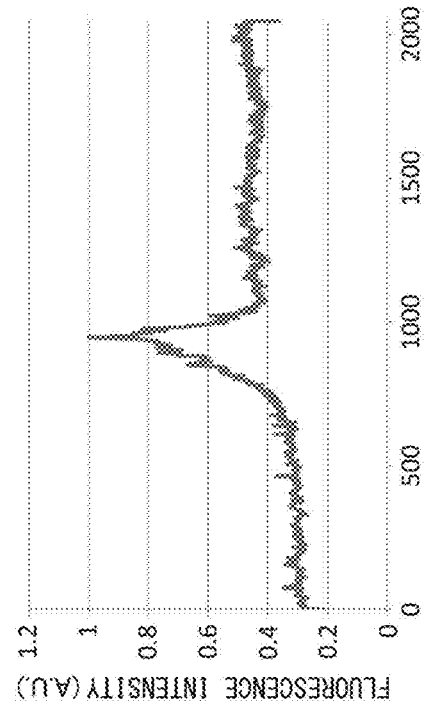
Figure 42G:
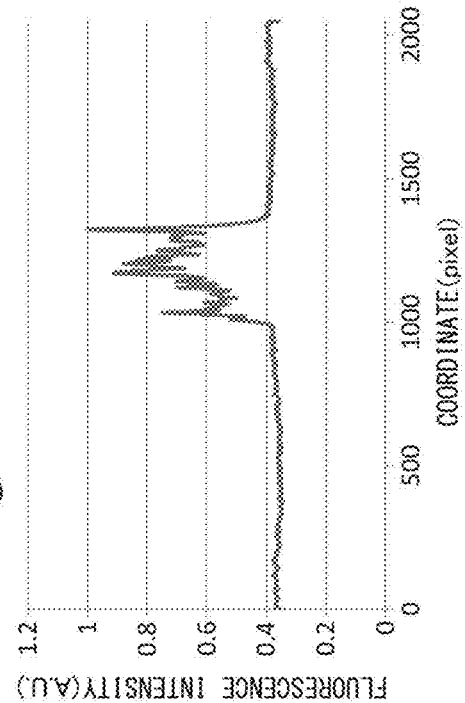

FIG. 42(d) and FIG. 42(e) respectively illustrate the integrated images of fluorescent polystyrene particles of 0.2 µm in diameter and 0.5 µm in diameter. FIG. 42(f) and FIG. 42(g) respectively illustrate graphs of fluorescence profiles of fluorescent polystyrene particles of 0.2 µm in diameter and 0.5 µm in diameter at the detection line 20. From these results, it was confirmed that the separation of particles of 0.2 µm in diameter and 0.5 µm in diameter were incomplete in this Comparative Example. This result also suggests that the expanding channel wall surface 17a is preferably not to be expanded.

REFERENCE SIGNS LIST

10 Microchip
11 Substrate
11a Bottom side
12 Bottom side substrate
13 Channel
14, 14a. 14b Inlet
15, 15a, 15b, 15c Outlet
16 Pinched channel
16a Sample liquid-side pinched channel wall surface
16a Inner wall of pinched channel 16
16b Sheath liquid-side pinched channel wall surface
17 Expanding channel
17a Sample liquid-side expanding channel wall surface
17b Sheath liquid-side expanding channel wall surface
18a, 18b Branch channel
19 Expansion start point
20 Detection line
21 Area
22 Drain channel
23 Outlet
24a, 24b Angle
30 Image acquisition area
31 Branch point
40 Slope part
41a. 41b Channel wall surface
50 Particles
51 Particle flowing direction
52 Aperture forming structure
53, 53', 53" Aperture
54, 54a, 54b, 54a', 54b', 54a", 54b" Electrode
55 Conductor
56 Electrical measuring equipment
57 Power supply
58 Conductive solution
59 Electrode insertion port
60 Relay channel
61 Analysis unit
62 Particle detection channel
100 Fluid
100P Fluid including particles
100N Fluid not including particles
101 Particle introduction channel
101d Branch channel
102a to 102c Particle recovery channel
102a' to 102c' Branch channel
103a to 103c Particle detection unit
103a' to 103c' Particle detection unit
104a to 104c Outlet
105 Branch channel
110 Particle separation channel
110A Branch part
110B Particle diffusion channel
120 Branch Part
190 Area
200 Streamline profile
210a, 210b Vector
300a, 300b Particle

The invention claimed is:
1. A particle detection device comprising:
a particle separation channel through which particles are separated according to particle sizes in a perpendicular direction to the flow of fluid; and
two or more particle recovery channels that are connected to and branched from the particle separation channel,
wherein the particle separation channel comprises a particle diffusion channel or an expanding channel which has a structure where the width or height of the channel or both of them expand from the fluidly upstream side toward the fluidly downstream side, wherein each of the particle recovery channels comprises a particle detection unit that includes an aperture and an electric detector,
wherein the cross section areas, volumes, or the cross section areas and the volumes of the apertures of the particle detection units in each particle recovery channel are different from one another.

2. The particle detection device according to claim 1, wherein a particle size range that can be detected by the aperture of the particle detection unit in each particle recovery channel is different from one another.

3. The particle detection device according to claim 1, wherein a part of the particle size range that can be detected by the aperture of the particle detection unit in each particle recovery channel overlaps one another.

4. The particle detection device according to claim 1, wherein at least one parameter among the number, the shape of a branch part, width, height, and length of the particle recovery channels is adjusted to form a channel structure where particles of a certain size or more are not mixed therein.

5. The particle detection device according to claim 1, wherein the particle separation channel includes: two or more branch channels that each comprises a fluid introduction port on one end; and a channel that is formed by joining the branch channels, wherein fluid that includes particles to be separated is introduced from the fluid introduction port of at least one of the branch channels.

6. A method for detecting particles included in fluid using the particle detection device according to claim 1, comprising:
separating the particles according to particle sizes in a perpendicular direction to the flow of the fluid;
dividing the separated particles into two or more channels; and
detecting the particles by an electric detector including electrodes that are disposed on both sides of an aperture equipped in the channel.

7. The method according to claim 6, wherein a particle size range that can be detected by the electric detector differs depending on a channel on which the electric detector is installed.

8. The method according to claim 6, wherein a part of the particle size range that can be detected by electric detector overlaps one another depending on a channel on which the electric detector is installed.

9. The method according to claim 6, wherein at least one parameter among the number, the shape of a branch part, width, height, and length of the channels is adjusted to form a channel structure where particles of a certain size or more are not mixed therein.

10. The method according to claim 6, wherein the particle separation channel includes: two or more branch channels that each comprises a fluid introduction port on one end; and a channel that is formed by joining the branch channels, wherein fluid that includes particles to be separated is introduced from the fluid introduction port of at least one of the branch channels.

11. The method according to claim 10, wherein the flow rate of fluid including particles to be separated is smaller than the flow rate of other fluid.

12. The method according to claim 10, wherein, in a channel formed by joining fluid including particles to be separated and fluid that was introduced to another branch channel, the joined fluid makes a laminar flow.

13. The method according to claim 10, wherein the particles are separated under a condition where occurrence of a swirling flow and particle diffusion is suppressed on the wall surface side along which the particles flow smoothly.

14. The method according to claim 6, wherein, in the particle separation channel, particles are separated under a condition where the wall of the channel does not easily expand outward.

15. The particle detection device according to claim 1, further comprising:
a fluid discharge port provided downstream of the particle detection unit,
wherein an electrode of the electric detector is provided at the fluid discharge port.

16. The particle detection device according to claim 1, wherein, in the particle separation channel, the wall of the channel is made of material that does not easily expand outward.

17. The particle separation device according to claim 16, wherein the material has 40 durometer hardness or more.

18. The particle detection device according to claim 1, wherein
the particle separation channel comprises:
two or more branch channels that each includes a fluid introduction port on one end side and joins the other branch channels on the other end side;
a pinched channel that is formed by joining the two or more branch channels; and
an expanding channel that is connected to the other end of the pinched channel and has an expanded channel width,
wherein the two or more particle recovery channels are connected to the expanding channel, and, when fluid that includes particles to be separated is introduced from the fluid introduction port of one of the branch channels and fluid that does not include the particles to be separated is introduced from the fluid introduction port of another one of the branch channels, particles flow smoothly along the wall surface of the pinched channel, and the channel width of the expanding channel does not expand toward the wall surface side along which the particles flow smoothly, yet, expands toward the wall surface side along which the particles do not flow smoothly.

19. The particle separation device according to claim 18, wherein the channel width gradually expands toward the wall surface side along which the particles do not flow smoothly.

20. The particle separation device according to claim 18, wherein the channel width of the expanding channel gradually expands toward the wall surface side along which the particles do not flow smoothly, and an angle between the wall surface of the pinched channel and the wall surface of the expanding channel forms 90° or more.

21. The particle separation device according to claim 20, wherein the channel width of the expanding channel gradually expands toward the wall surface side along which the particles do not flow smoothly, and the expanding angle between the wall surface of the pinched channel and the wall surface of the expanding channel forms 135° or more.

22. The particle detection device according to claim 1, wherein the particle separation channel comprises:
two or more branch channels that each includes a fluid introduction port on one end side and joins the other branch channels on the other end side;
a pinched channel that is formed by joining the two or more branch channels; and an expanding channel that is connected to the other end of the pinched channel and has an expanded channel width, wherein the two or more particle recovery channels are connected to the expanding channel, and, when fluid that includes particles to be separated is introduced from the fluid introduction port of one of the branch channels and fluid that does not include the particles to be separated is introduced from the fluid introduction port of another one of the branch channels, particles flow smoothly along the wall surface of the pinched channel.

* * * * *